United States Patent
Nakajima et al.

(10) Patent No.: US 10,569,571 B2
(45) Date of Patent: **\*Feb. 25, 2020**

(54) INK JET RECORDING METHOD, ULTRAVIOLET CURABLE INK, AND INK JET RECORDING APPARATUS

(71) Applicant: Seiko Epson Corporation, Tokyo (JP)

(72) Inventors: Mikito Nakajima, Ina (JP); Keitaro Nakano, Matsumoto (JP); Mitsuaki Yoshizawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,316

(22) Filed: May 29, 2018

(65) Prior Publication Data

US 2018/0319177 A1 Nov. 8, 2018

Related U.S. Application Data

(62) Division of application No. 15/373,390, filed on Dec. 8, 2016, now Pat. No. 9,981,486, which is a division (Continued)

(30) Foreign Application Priority Data

Mar. 28, 2012 (JP) ................. 2012-074293
Mar. 28, 2012 (JP) ................. 2012-074298

(51) Int. Cl.
*B41J 11/00* (2006.01)
*B41J 2/21* (2006.01)
(Continued)

(52) U.S. Cl.
CPC ............... *B41J 11/002* (2013.01); *B41J 2/01* (2013.01); *B41J 2/2107* (2013.01); *B41J 11/00* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 2,692,256 A 10/1954 Bauer
4,303,924 A 12/1981 Young, Jr.
(Continued)

FOREIGN PATENT DOCUMENTS

CN 102381023 A 3/2012
EP 0 997 508 A1 5/2000
(Continued)

OTHER PUBLICATIONS

U.S. Appl. No. 13/234,666, filed Sep. 16, 2011, Ultraviolet-Curable Ink Jet Ink Composition.

(Continued)

*Primary Examiner* — Manish S Shah
(74) *Attorney, Agent, or Firm* — Workman Nydegger

(57) ABSTRACT

Provided is an ink jet recording method including: discharging first ultraviolet curable ink of a radical polymerization reaction type which contains a radical photopolymerization initiator and a radical polymerization compound and in which transmittance at a wavelength of 395 nm is equal to or less than 1%, onto a recording medium; and curing the first ultraviolet curable ink which is landed on the recording medium by irradiating the ink with ultraviolet light, in which a light source which initially emits the ultraviolet light in the curing of the ink is an ultraviolet light emitting diode in which peak intensity of the irradiated ultraviolet light is equal to or more than 800 mW/cm$^2$.

14 Claims, 4 Drawing Sheets

Related U.S. Application Data of application No. 13/851,627, filed on Mar. 27, 2013, now Pat. No. 9,925,801.

(51) Int. Cl.

| | | |
|---|---|---|
| *B41J 2/01* | (2006.01) | |
| *C09D 11/30* | (2014.01) | |
| *C09D 11/322* | (2014.01) | |
| *C09D 11/40* | (2014.01) | |
| *B41M 7/00* | (2006.01) | |
| *C09D 11/101* | (2014.01) | |

(52) U.S. Cl.
  CPC ......... *B41M 7/0081* (2013.01); *C09D 11/101* (2013.01); *C09D 11/30* (2013.01); *C09D 11/322* (2013.01); *C09D 11/40* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
  See application file for complete search history.

(56) References Cited

U.S. PATENT DOCUMENTS

| | | | |
|---|---|---|---|
| 4,577,205 A | 3/1986 | Shibata et al. | |
| 5,266,106 A | 11/1993 | Breton | |
| 5,275,646 A | 1/1994 | Marshall et al. | |
| 5,596,027 A | 1/1997 | Mead et al. | |
| 5,641,346 A | 6/1997 | Mantell et al. | |
| 5,889,084 A | 3/1999 | Roth | |
| 5,897,695 A | 4/1999 | Mayo et al. | |
| 6,187,897 B1 | 2/2001 | Kawashima et al. | |
| 6,310,115 B1 | 10/2001 | Vanmaele et al. | |
| 7,963,625 B2 | 6/2011 | Okada | |
| 8,227,047 B2 | 7/2012 | Loccufier et al. | |
| 8,664,291 B2 | 3/2014 | Kida et al. | |
| 9,034,940 B2 | 5/2015 | Kida et al. | |
| 9,056,986 B2 | 6/2015 | Kagose et al. | |
| 9,458,338 B2 | 10/2016 | Kagose et al. | |
| 9,493,667 B2 | 11/2016 | Kida et al. | |
| 9,782,982 B2 | 10/2017 | Yoshida et al. | |
| 9,796,193 B2 | 10/2017 | Yoshida et al. | |
| 9,827,760 B2 | 11/2017 | Fukumoto et al. | |
| 9,837,788 B2 | 12/2017 | Akasaka et al. | |
| 9,873,808 B2 | 1/2018 | Kida et al. | |
| 9,884,487 B2 | 2/2018 | Kobayashi et al. | |
| 9,925,801 B2 | 3/2018 | Nakajima et al. | |
| 9,981,486 B2 | 5/2018 | Nakajima et al. | |
| 10,029,483 B2 | 7/2018 | Kobayashi et al. | |
| 2001/0036978 A1 | 11/2001 | Kohler et al. | |
| 2003/0162868 A1 | 8/2003 | Stretanski et al. | |
| 2004/0075726 A1 | 4/2004 | Hirai | |
| 2004/0106700 A1 | 6/2004 | Yamanouchi et al. | |
| 2004/0132862 A1* | 7/2004 | Woudenberg ........ | C09D 11/101 523/160 |
| 2006/0050116 A1 | 3/2006 | Nakajima | |
| 2006/0203024 A1 | 9/2006 | Kusunoki | |
| 2007/0035594 A1 | 2/2007 | Brooks et al. | |
| 2007/0229612 A1 | 10/2007 | Oyanagi et al. | |
| 2008/0079792 A1 | 4/2008 | Hirato | |
| 2008/0165237 A1 | 7/2008 | Yamauchi et al. | |
| 2008/0166495 A1 | 7/2008 | Maeno et al. | |
| 2008/0199631 A1 | 8/2008 | Makuta et al. | |
| 2008/0218574 A1 | 9/2008 | Furuno et al. | |
| 2008/0238980 A1 | 10/2008 | Nagashima et al. | |
| 2008/0239045 A1 | 10/2008 | Umebayashi et al. | |
| 2008/0249795 A1 | 10/2008 | Walker | |
| 2008/0254234 A1 | 10/2008 | Fink et al. | |
| 2009/0000508 A1 | 1/2009 | Edison et al. | |
| 2009/0040249 A1 | 2/2009 | Wouters et al. | |
| 2009/0041946 A1 | 2/2009 | Fukumoto et al. | |
| 2009/0053484 A1 | 2/2009 | Yoshihiro et al. | |
| 2009/0068418 A1 | 3/2009 | Iwase et al. | |
| 2009/0099277 A1 | 4/2009 | Nagvekar et al. | |
| 2009/0118388 A1 | 5/2009 | Naruse et al. | |
| 2009/0145638 A1 | 6/2009 | Toyoda et al. | |
| 2009/0169834 A1 | 7/2009 | Sano et al. | |
| 2009/0197988 A1 | 8/2009 | Kito et al. | |
| 2009/0208651 A1 | 8/2009 | Oyanagi et al. | |
| 2009/0280302 A1 | 11/2009 | Fukumoto et al. | |
| 2009/0289999 A1 | 11/2009 | Takahashi et al. | |
| 2009/0303304 A1 | 12/2009 | Oyanagi et al. | |
| 2010/0036978 A1 | 2/2010 | Candelaria et al. | |
| 2010/0073437 A1 | 3/2010 | Shibata et al. | |
| 2010/0079566 A1 | 4/2010 | Ishikawa | |
| 2010/0080925 A1 | 4/2010 | Araki et al. | |
| 2010/0112497 A1 | 5/2010 | Takabayashi et al. | |
| 2010/0313782 A1 | 12/2010 | Loccufier et al. | |
| 2010/0330296 A1 | 12/2010 | Loccufier et al. | |
| 2011/0015294 A1 | 1/2011 | Kito et al. | |
| 2011/0024392 A1 | 2/2011 | Sato et al. | |
| 2011/0028586 A1 | 2/2011 | Kito et al. | |
| 2011/0085013 A1 | 4/2011 | Onishi et al. | |
| 2011/0091790 A1 | 4/2011 | Bamwell et al. | |
| 2011/0124768 A1 | 5/2011 | Claes et al. | |
| 2011/0165387 A1 | 7/2011 | Kondo | |
| 2011/0234680 A1 | 9/2011 | Aoyama et al. | |
| 2011/0241264 A1 | 10/2011 | Yokoi | |
| 2012/0014005 A1 | 1/2012 | Kliem | |
| 2012/0026236 A1 | 2/2012 | Fujii | |
| 2012/0075394 A1 | 3/2012 | Ohnishi | |
| 2012/0083545 A1 | 4/2012 | Kida et al. | |
| 2012/0113201 A1 | 5/2012 | Kagose et al. | |
| 2012/0127249 A1 | 5/2012 | Mizutaki et al. | |
| 2012/0128890 A1 | 5/2012 | Mirchev | |
| 2012/0140005 A1 | 6/2012 | De Voeght et al. | |
| 2012/0147095 A1 | 6/2012 | Miura et al. | |
| 2012/0235414 A1 | 9/2012 | Levy | |
| 2012/0252919 A1 | 10/2012 | Suzuki et al. | |
| 2012/0274717 A1 | 11/2012 | Nakano et al. | |
| 2013/0002773 A1 | 1/2013 | Fujii et al. | |
| 2013/0010039 A1 | 1/2013 | Kida et al. | |
| 2013/0063535 A1 | 3/2013 | Yoda et al. | |
| 2013/0236654 A1 | 9/2013 | Claes et al. | |
| 2013/0250019 A1 | 9/2013 | Sato et al. | |
| 2013/0258016 A1 | 10/2013 | Yoshida et al. | |
| 2013/0258018 A1 | 10/2013 | Nakajima et al. | |
| 2013/0286120 A1 | 10/2013 | Kobayashi et al. | |
| 2013/0286121 A1 | 10/2013 | Fukumoto et al. | |
| 2014/0022321 A1 | 1/2014 | Komatsu | |
| 2014/0053753 A1 | 2/2014 | Suzuki et al. | |
| 2014/0063154 A1 | 3/2014 | Gould et al. | |
| 2014/0104356 A1 | 4/2014 | Kitade et al. | |
| 2014/0128496 A1 | 5/2014 | Kida et al. | |
| 2014/0132682 A1 | 5/2014 | Kida et al. | |
| 2014/0212634 A1 | 7/2014 | Kameyama et al. | |
| 2015/0050427 A1 | 2/2015 | Claes et al. | |
| 2015/0225581 A1 | 8/2015 | Kida et al. | |
| 2015/0240094 A1 | 8/2015 | Kagose et al. | |
| 2016/0001578 A1 | 1/2016 | Kobayashi et al. | |
| 2016/0046134 A1 | 2/2016 | Fukumoto et al. | |
| 2016/0152044 A1 | 6/2016 | Yoshida et al. | |
| 2017/0002221 A1 | 1/2017 | Kida et al. | |
| 2017/0087876 A1 | 3/2017 | Nakajima et al. | |
| 2018/0072047 A1 | 3/2018 | Fukumoto et al. | |
| 2018/0154658 A1 | 6/2018 | Kobayashi et al. | |

(56) References Cited

U.S. PATENT DOCUMENTS

FOREIGN PATENT DOCUMENTS

| | | |
|---|---|---|
| EP | 2 017 311 A1 | 1/2009 |
| EP | 2 266 812 A2 | 12/2010 |
| EP | 2 305 762 A1 | 4/2011 |
| EP | 2 335 940 A1 | 6/2011 |
| EP | 2 399 965 A1 | 12/2011 |
| EP | 2 399 966 A1 | 12/2011 |
| EP | 2 412 765 A1 | 2/2012 |
| EP | 2 543 707 A1 | 1/2013 |
| EP | 2 568 022 A2 | 3/2013 |
| JP | 60-208317 A | 10/1985 |
| JP | 60-210678 A | 10/1985 |
| JP | 2000-052596 A | 2/2000 |
| JP | 2000-169511 A | 6/2000 |
| JP | 2002-326976 A | 11/2002 |
| JP | 2003-089198 A | 3/2003 |
| JP | 2003-191593 A | 7/2003 |
| JP | 2003-200559 A | 7/2003 |
| JP | 2003-292855 A | 10/2003 |
| JP | 3461501 B1 | 10/2003 |
| JP | 2004-067991 A | 3/2004 |
| JP | 2004-098553 A | 4/2004 |
| JP | 2004-167873 A | 6/2004 |
| JP | 2004-182930 A | 7/2004 |
| JP | 2004-196936 A | 7/2004 |
| JP | 2004-224841 A | 8/2004 |
| JP | 2005-103854 A | 4/2005 |
| JP | 2005-170039 A | 6/2005 |
| JP | 2005-212412 A | 8/2005 |
| JP | 2005-214395 A | 8/2005 |
| JP | 2006-069025 A | 3/2006 |
| JP | 2006-152064 A | 6/2006 |
| JP | 2006-219625 A | 8/2006 |
| JP | 2006-231795 A | 9/2006 |
| JP | 2006-248042 A | 9/2006 |
| JP | 2006-257350 A | 9/2006 |
| JP | 2007-118409 A | 5/2007 |
| JP | 2007-136766 A | 6/2007 |
| JP | 2007-138070 A | 6/2007 |
| JP | 2007-185852 A | 7/2007 |
| JP | 2007-245630 A | 9/2007 |
| JP | 2007-283753 A | 11/2007 |
| JP | 2008-001003 A | 1/2008 |
| JP | 2008-001849 A | 1/2008 |
| JP | 2008-007687 A | 1/2008 |
| JP | 2008-055716 A | 3/2008 |
| JP | 2008-507598 A | 3/2008 |
| JP | 2008050600 | 3/2008 |
| JP | 2008-163080 A | 7/2008 |
| JP | 2008-179136 A | 8/2008 |
| JP | 2008-207425 A | 9/2008 |
| JP | 2008-246832 A | 10/2008 |
| JP | 2008-254196 A | 10/2008 |
| JP | 2008-254312 A | 10/2008 |
| JP | 2008-280383 A | 11/2008 |
| JP | 2008280383 A * | 11/2008 ............... B41J 2/01 |
| JP | 2009-000961 A | 1/2009 |
| JP | 4204333 B2 | 1/2009 |
| JP | 2009-035650 A | 2/2009 |
| JP | 2009-040880 A | 2/2009 |
| JP | 2009-057548 A | 3/2009 |
| JP | 2009-073945 A | 4/2009 |
| JP | 2009-096043 A | 5/2009 |
| JP | 2009-096910 A | 5/2009 |
| JP | 2009-146624 A | 7/2009 |
| JP | 2009-185157 A | 8/2009 |
| JP | 2009-191183 A | 8/2009 |
| JP | 4321050 B2 | 8/2009 |
| JP | 2009173853 | 8/2009 |
| JP | 4335955 B1 | 9/2009 |
| JP | 2009-235272 A | 10/2009 |
| JP | 2009-279830 A | 12/2009 |
| JP | 2009-279848 A | 12/2009 |
| JP | 2009-285853 A | 12/2009 |
| JP | 2009-292091 A | 12/2009 |
| JP | 2009-299057 A | 12/2009 |
| JP | 2010-012629 A | 1/2010 |
| JP | 2010-023285 A | 2/2010 |
| JP | 2010030110 | 2/2010 |
| JP | 2010-100833 A | 5/2010 |
| JP | 2010-131975 A | 6/2010 |
| JP | 2010-138315 A | 6/2010 |
| JP | 2010-143974 A | 7/2010 |
| JP | 2010-143982 A | 7/2010 |
| JP | 2010-167677 A | 8/2010 |
| JP | 2010-269471 A | 12/2010 |
| JP | 2010-280828 A | 12/2010 |
| JP | 2011-502188 A | 1/2011 |
| JP | 2011-025684 A | 2/2011 |
| JP | 2011-051107 A | 3/2011 |
| JP | 2011063778 | 3/2011 |
| JP | 2011-068013 A | 4/2011 |
| JP | 2011-083916 A | 4/2011 |
| JP | 2011-093156 A | 5/2011 |
| JP | 2011-098455 A | 5/2011 |
| JP | 2011-126269 A | 6/2011 |
| JP | 2011-132349 A | 7/2011 |
| JP | 2011-140197 | 7/2011 |
| JP | 2011-143344 A | 7/2011 |
| JP | 2011-523370 A | 8/2011 |
| JP | 2011-184609 A | 9/2011 |
| JP | 2011-0184610 A | 9/2011 |
| JP | 2011-208018 A | 10/2011 |
| JP | 2011-213933 A | 10/2011 |
| JP | 2011-213934 A | 10/2011 |
| JP | 2011-219648 A | 11/2011 |
| JP | 2011-225848 A | 11/2011 |
| JP | 2011-235566 A | 11/2011 |
| JP | 2011-240565 A | 12/2011 |
| JP | 2012-000883 A | 1/2012 |
| JP | 2012-012478 A | 1/2012 |
| JP | 2012-020481 A | 2/2012 |
| JP | 2012025124 | 2/2012 |
| JP | 2012-046724 A | 3/2012 |
| JP | 2012046719 | 3/2012 |
| JP | 2012-072271 A | 4/2012 |
| JP | 2012-077221 A | 4/2012 |
| JP | 2012-077222 A | 4/2012 |
| JP | 2012-092291 A | 5/2012 |
| JP | 2012-126122 A | 7/2012 |
| JP | 2012-207084 A | 10/2012 |
| JP | 2013-010832 A | 1/2013 |
| JP | 2013-047305 A | 3/2013 |
| JP | 2013-053208 A | 3/2013 |
| JP | 5772032 B2 | 9/2015 |
| WO | 2006/085992 A2 | 8/2006 |
| WO | 2006/129476 A1 | 12/2006 |
| WO | 2007-083473 A1 | 7/2007 |
| WO | 2007/094446 A1 | 8/2007 |
| WO | 2007/126103 A1 | 11/2007 |
| WO | 2009/053305 A1 | 4/2009 |
| WO | 2010/029017 A1 | 3/2010 |
| WO | 2010/069758 A1 | 6/2010 |
| WO | 2011/039081 A1 | 4/2011 |
| WO | 2011/076703 A1 | 6/2011 |
| WO | 2012133694 | 10/2012 |
| WO | 2012/172973 A1 | 12/2012 |

OTHER PUBLICATIONS

U.S. Appl. No. 13/292,219, filed Nov. 9, 2011, Ultraviolet Curable Type Ink-Jet Ink Composition, Recording Method and Recording Apparatus Usisng Same.
U.S. Appl. No. 13/851,426, filed Mar. 27, 2013, Ink Jet Recording Method, Ultraviolet Curable Ink and Ink Jet Recording Apparatus.
U.S. Appl. No. 13/851,627, filed Mar. 27, 2013, Ink Jet Recording Method, Ultraviolet Curable Ink, and Ink Jet Recording Apparatus.
U.S. Appl. No. 13/853,120, filed Mar. 29, 2013, Ink Jet Recording Method, Ultraviolet-Ray Curable Ink, and Ink Jet Recording Apparatus.
U.S. Appl. No. 13/853,185, filed Mar. 29, 2013, Ink Jet Recording Method and Ink Jet Recording Apparatus.

(56) References Cited

OTHER PUBLICATIONS

U.S. Appl. No. 14/081,281, filed Nov. 15, 2013, UV Curable Ink Jet Recording Ink Composition, Ink Container and Ink Jet Recording Apparatus.

U.S. Appl. No. 14/155,588, filed Jan. 15, 2014, Ultraviolet-Curable Ink Jet Ink Composition.

U.S. Appl. No. 14/689,502, filed Apr. 17, 2015, Ultraviolet-Curable Ink Jet Ink Composition.

U.S. Appl. No. 14/708,325, filed May 11, 2015, Ultraviolet Curable Type Ink-Jet Ink Composition, Recording Method and Recording Apparatus Using the Same.

U.S. Appl. No. 14/856,092, filed Sep. 16, 2015, Ink Jet Recording Method, Ultraviolet-Ray Curable Ink, and Ink Jet Recording Apparatus.

U.S. Appl. No. 14/920,966, filed Oct. 23, 2015, Ink Jet Recording Method and Ink Jet Recording Apparatus.

U.S. Appl. No. 15/014,361, filed Feb. 3, 2016, Ink Jet Recording Method, Ultraviolet Curable Ink and Ink Jet Recording Apparatus.

U.S. Appl. No. 15/269,319, filed Sep. 19, 2016, UV Curable Ink Jet Recording Ink Composition, Ink Container and Ink Jet Recording Apparatus.

U.S. Appl. No. 15/373,390, filed Dec. 8, 2016, Ink Jet Recording Method, Ultraviolet Curable Ink, and Ink Jet Recording Apparatus.

U.S. Appl. No. 15/821,561, filed Nov. 22, 2017, Ink Jet Recording Method and Ink Jet Recording Apparatus.

U.S. Appl. No. 15/886,407, filed Feb. 1, 2018, Ink Jet Recording Method, Ultraviolet-Ray Curable Ink, and Ink Jet Recording Apparatus.

\*\*Keskin et al., "2-Mercaptothioxanthone as sensitizers and coinitiators for acylphosphine oxide photoinitiators for free radical polymerization," Macromolecules, 2008, v. 41, pp. 4631-4634.

\*\*Green, W.A., Commercial photoinitiators, Chapter 4, Industrial Photoinitiators, A Technical Guide. CRC Press, Taylor & Francis Group, 2010, pp. 75-114.

\*\*[No Author Listed] BASF Product Brochure (no date available), Coatings that stay looking good: BASF performance additive. (online) Jun. 26, 2014 <URL: http://www.basf.com/group/corporate/us/en/literature-document:Brand+Chimassorb-Brochure—Coatings+that+stay+looking+good+BASF+performance+additives-English.pdf>, 32 pages.

\* cited by examiner

INK JET RECORDING METHOD, ULTRAVIOLET CURABLE INK, AND INK JET RECORDING APPARATUS

CROSS REFERENCES TO RELATED APPLICATIONS

The present application is a continuation of U.S. application Ser. No. 15/373,390, filed on Dec. 8, 2016, which is a continuation of U.S. application Ser. No. 13/851,627, filed on Mar. 27, 2013, now U.S. Pat. No. 9,925,801, which claims priority under 35 U.S.C. § 119 to Japanese Patent Application No. 2012-074298, filed Mar. 28, 2012 and 2012-074293, filed Mar. 28, 2012, which are expressly incorporated by reference herein.

BACKGROUND

1. Technical Field

The present invention relates to an ink jet recording method, an ultraviolet curable ink and an ink jet recording apparatus.

2. Related Art

In the related art, as a recording method for forming an image based on an image data signal on a recording medium such as paper, various methods have been used. Among them, since an ink jet method is used with an apparatus with a low cost which discharges ink only to a necessary image unit and performs direct image formation on a recording medium, it is possible efficiently to use the ink and to keep the running cost is low. Furthermore, since noises are small in the ink jet method, the ink jet method is excellent as a recording method.

In recent years, in order to form an image having excellent water resistance, solvent resistance, rub fastness and the like on a surface of a recording medium, an ink jet recording method using ultraviolet curable ink which is cured when being irradiated with ultraviolet light has been used.

For example, JP-A-2010-131975 discloses a line recording type image forming method of discharging a photoacid generator solution PI-1 (CPI-100P manufactured by San-Apro Ltd., a photoacid generator solution of sulfonium salt which is dissolved in propylene carbonate) onto a recording material in advance, subsequently irradiating the photoacid generator solution which is landed onto the recording material with ultraviolet light from a metal halide lamp (VZero270 manufactured by Integration Technology, the maximum illumination of 400 $mW/cm^2$), discharging cationic polymerization-based active light curable ink (in order of black, cyan, magenta, yellow and white) formed of a photoacid generator (photo radical generator is not used), a cationic polymerization compound, a pigment dispersion, a surfactant and a sensitizer, each of which has predetermined types and amounts sequentially, to form an image, and then, performing irradiation with active light from an LED (manufactured by Nichia Corporation, 365 nm-multi chip array, a water cooling type, the maximum illumination of 1,500 $mW/cm^2$) to fix an image (Paragraphs [0028], [0088], [0094] to [0097], [0099] to [0101] (Table 1), and [0106], Sample No. 1 in Table 5 in [0107], FIG. 1, and Paragraph [0112] in JP-A-2010-131975).

In addition, for example, International Publication No. WO 2011/039081 discloses a recording method of discharging ultraviolet curable ink jet ink consisting of 15% by weight of a dispersion liquid including C.I. Pigment Blue 15:4 which is a pigment, 62.55% by weight of propoxylated neopentyl glycol diacrylate (SR9003), 13% by weight of 2-(2-vinyloxy ethoxy) ethyl acrylate (VEEA), 0.83% by weight of a polymerization inhibitor, 6% by weight of a photopolymerization initiator, 2.5% by weight of ethyl-4-(dimethylamino) benzoate, and 0.1% by weight of polyether-modified polydimethylsiloxane which is a wetting agent from a print head in which density of nozzles and an outer diameter thereof are set as the predetermined values, and performing irradiation with ultraviolet light (Example 1 in International Publication No. WO 2011/039081).

However, when manufacturing a cured film, that is, a coating film of cured ink, from ultraviolet curable ink jet ink using the image forming method which is disclosed in JP-A-2010-131975, the following problems occur.

When a coating film of ink is irradiated with ultraviolet light, a pigment strongly tends to absorb a part of ultraviolet light, and accordingly, although irradiation is performed with the ultraviolet light, an energy necessary for the complete curing of the coating film which is discharged onto a recording medium, is insufficient, and thus the vicinity of the surface of the coating film is initially cured, and thus, the inner portion of the coating film is incompletely cured or more time is necessary for the curing, in some cases. In addition, when the uncured ink existing in the inner portion of the coating film is cured, wrinkles are generated on the vicinity of the surface of the coating film which is initially cured, or by irregular flow of the ink before the ink in the inner portion of the coating film is cured, wrinkles (hereinafter, referred to as "cured wrinkles") are generated on the surface of the coating film after the curing. Due to the cured wrinkles, problems of degradation of various kinds of film properties on the coating film occur. The thicker the film thickness of a cured film, the stronger such a tendency is.

In addition, when a cured film, in other words, a coating film of an ink which is cured, from an ultraviolet curable ink jet ink using a recording method which is disclosed in International Publication No. WO 2011/039081, is attempted to be formed, problems occur as below.

Firstly, in a case where the film thickness of a cured film is relatively thin, the hardenability is inferior due to the affects of oxygen inhibition in a case of a radical polymerization reaction system. Therefore, the film has to be thickened in excess to the extent in which oxygen inhibition does not occur when printing and a problem of the printed image quality occurs where the image becomes very poor. On the other hand, in a case where the film thickness of a cured film is relatively thick, there is a strong tendency that a pigment absorbs a part of ultraviolet light, and then, even if ultraviolet light is irradiated, the energy which is needed for completely curing the coating film which is discharged onto a recording medium, becomes insufficient, therefore, there is a case where the curing of the inside of the coating film becomes incomplete due to the vicinity of the surface of the coating film being cured in first or there is a need to take time for curing. Further, due to the vicinity of the surface which has been cured before wrinkles when an uncured ink which is present inside the coating film is cured or an ink irregularly flowing before an ink inside the coating film is cured, wrinkles (hereinafter also referred to as "cured wrinkles") occur on the surface of the film coating after curing. Due to the cured wrinkles, problems occur wherein film characteristics on the coating film are inferior.

SUMMARY

Here, an advantage of some aspects of the invention is to provide an ink jet recording method capable of preventing generation of cured wrinkles.

In addition, another advantage of some aspects of the invention is to further provide ultraviolet curable ink which is used in the recording method and an ink jet recording apparatus using the recording method.

Here, an advantage of some aspects of the invention is to provide an ink jet recording method which has excellent hardenability and in which it is possible to prevent the occurrence of cured wrinkles.

In addition, an advantage of some aspects of the invention is further to provide an ultraviolet curable ink which is used in the recording method and an ink jet recording apparatus using the recording method.

The present inventors have found that, when radical polymerization reaction type ultraviolet curable ink (hereinafter also referred to as "first ultraviolet curable ink") in which transmittance at a wavelength of 395 nm is equal to or less than 1%, is discharged onto a recording medium and then, the ink is cured, by setting a light source which initially irradiates with ultraviolet light (first ultraviolet irradiation) as an ultraviolet light emitting diode in which peak intensity (hereinafter also referred to as "irradiation peak intensity") of the irradiated ultraviolet light is equal to or more than 800 mW/cm$^2$, cured wrinkles can be efficiently prevented.

That is, a first invention is as described below.

[1] According to an aspect of the invention, there is provided an ink jet recording method, including: is charging first ultraviolet curable ink of a radical polymerization reaction type which contains a radical photopolymerization initiator and a radical polymerization compound and in which transmittance at a wavelength of 395 nm is equal to or less than 1%, onto a recording medium; and curing the first ultraviolet curable ink which is landed on the recording medium by irradiating the ink with ultraviolet light, wherein a light source which initially emits the ultraviolet light in the curing of the ink is an ultraviolet light emitting diode in which peak intensity of the irradiated ultraviolet light is equal to or more than 800 mW/cm$^2$.

[2] The ink jet recording method according to [1], wherein an irradiation energy of the ultraviolet light emitted from the ultraviolet light emitting diode which initially emits ultraviolet light is 100 mJ/cm$^2$ to 600 mJ/cm$^2$.

[3] The ink jet recording method according to [1] or [2], further including further emitting ultraviolet light, after emitting ultraviolet light from the ultraviolet light emitting diode which is a light source which initially emits the ultraviolet light.

[4] The ink jet recording method according to any one of [1] to [3], wherein the irradiation from the ultraviolet light emitting diode which initially emits the ultraviolet light is at least any of pulse irradiation and spot irradiation by a condensing lens.

[5] The ink jet recording method according to any one of [1] to [4], further including recording using a line type ink jet recording apparatus including discharging the first ultraviolet curable ink onto the recording medium, while relatively moving positions of a head including nozzle arrays having a length equal to or greater than a length corresponding to a width of the recording medium and the recording medium in a scanning direction intersecting the width direction.

[6] The ink jet recording method according to any one of [1] to [5], wherein peak intensity of ultraviolet light emitted from the ultraviolet light emitting diode which initially emits the ultraviolet light is in a range of 800 mW/cm$^2$ to 4000 mW/cm$^2$.

[7] The ink jet recording method according to any one of [1] to [6], wherein the ultraviolet light emitting diode which initially emits ultraviolet light has a light emitting peak wavelength in a range of 360 nm to 420 nm.

[8] The ink jet recording method according to any one of [1] to [7], further including: discharging second ultraviolet curable ink of a radical polymerization reaction type which contains a radical photopolymerization initiator and a radical polymerization compound and in which transmittance at a wavelength of 395 nm exceeds 1%, onto a recording medium; and curing the second ultraviolet curable ink which is landed on the recording medium by irradiating the ink with ultraviolet light, wherein a light source which initially emits ultraviolet light in the curing of the ink is an ultraviolet light emitting diode in which peak intensity of the irradiated ultraviolet light is less than 800 mW/cm$^2$.

[9] The ink jet recording method according to [8], further including: discharging the first ultraviolet curable ink onto a recording medium; curing the first ultraviolet curable ink which is landed on the recording medium by irradiating the ink with ultraviolet light; discharging the second ultraviolet curable ink onto a recording medium; curing the second ultraviolet curable ink which is landed on the recording medium by irradiating the ink with ultraviolet light; and further curing the first ultraviolet curable ink and the second ultraviolet curable ink by irradiating the ink with ultraviolet light.

[10] The ink jet recording method according to [8] or [9], wherein the discharging of the first ultraviolet curable ink onto the recording medium and the curing the first ultraviolet curable ink which is landed on the recording medium by irradiating the ink with ultraviolet light are performed after the discharging of the second ultraviolet curable ink onto a recording medium and the curing the second ultraviolet curable ink which is landed on the recording medium by irradiating the ink with ultraviolet light.

[11] An ultraviolet curable ink used in the ink jet recording method according to any one of [1] to [10].

[12] An ink jet recording apparatus which is used with the ink jet recording method according any one of [1] to [10].

In addition, the present inventors have found that, when discharging ultraviolet curable ink containing predetermined vinyl ether group-containing (meth)acrylate esters onto a recording medium, and then curing the ink, by emitting ultraviolet light from an ultraviolet light emitting diode in which peak intensity of the irradiated ultraviolet light (hereinafter, also referred to as "irradiation peak intensity") is equal to or more than 800 mW/cm$^2$, excellent hardenability can be obtained for a recorded material to be obtained, and cured wrinkles can be efficiently prevented.

That is, a second invention is as described below.

[1] According to another aspect of the invention, there is provided an ink jet recording method including: discharging ultraviolet curable ink containing vinyl ether group-containing (meth)acrylate esters expressed by the following General Formula (I) onto a recording medium; and curing the ultraviolet curable ink which is landed on the recording medium by irradiating the ink with ultraviolet light from an ultraviolet light emitting diode in which peak intensity of the irradiated ultraviolet light is equal to or more than 800 mW/cm$^2$.

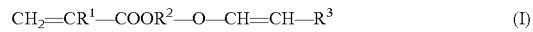

$$CH_2=CR^1-COOR^2-O-CH=CH-R^3 \quad \quad (I)$$

(In the formula, R$^1$ represents a hydrogen atom or a methyl group, R$^2$ represents a divalent organic residue having 2 to 20 carbon atoms, and R$^3$ represents a hydrogen atom or a monovalent organic residue having 1 to 11 carbon atoms.)

[2] The ink jet recording method according to [1], wherein an irradiation energy of ultraviolet light emitted from the ultraviolet light emitting diode is 100 mJ/cm$^2$ to 600 mJ/cm$^2$.

[3] The ink jet recording method according to [1] or [2], further including preliminarily curing the ultraviolet curable ink by irradiating the ink with ultraviolet light in which an irradiation energy is equal to or less than 50 mJ/cm$^2$ from an ultraviolet light emitting diode generating ultraviolet light in which a light emitting peak wavelength is in a range of 360 nm to 420 nm and peak intensity of the irradiated ultraviolet light is less than 800 mW/cm$^2$, before irradiating the ink with ultraviolet light from an ultraviolet light emitting diode in which the peak intensity is equal to or more than 800 mW/cm$^2$, in the curing of the ink.

[4] The ink jet recording method according to any one of [1] to [3], further including recording using a line ink jet recording apparatus including a line head having a length equal to or greater than a length corresponding to a width of a recording medium.

[5] The ink jet recording method according to any one of [1] to [4], wherein the irradiation from the ultraviolet light emitting diode is at least any of pulse irradiation and spot irradiation by a condensing lens individually.

[6] The ink jet recording method according to [1] or [2], wherein peak intensity of the irradiated ultraviolet light is in a range of 800 mW/cm$^2$ to 4000 mW/cm$^2$.

[7] The ink jet recording method according to [1] or [2], wherein the ultraviolet light emitting diode has a light emitting peak wavelength in a range of 360 nm to 420 nm.

[8] An ultraviolet curable ink used for the ink jet recording method according to any one of [1] to [7].

[9] An ink jet recording apparatus which is used with the ink jet recording method according to any one of [1] to [7].

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
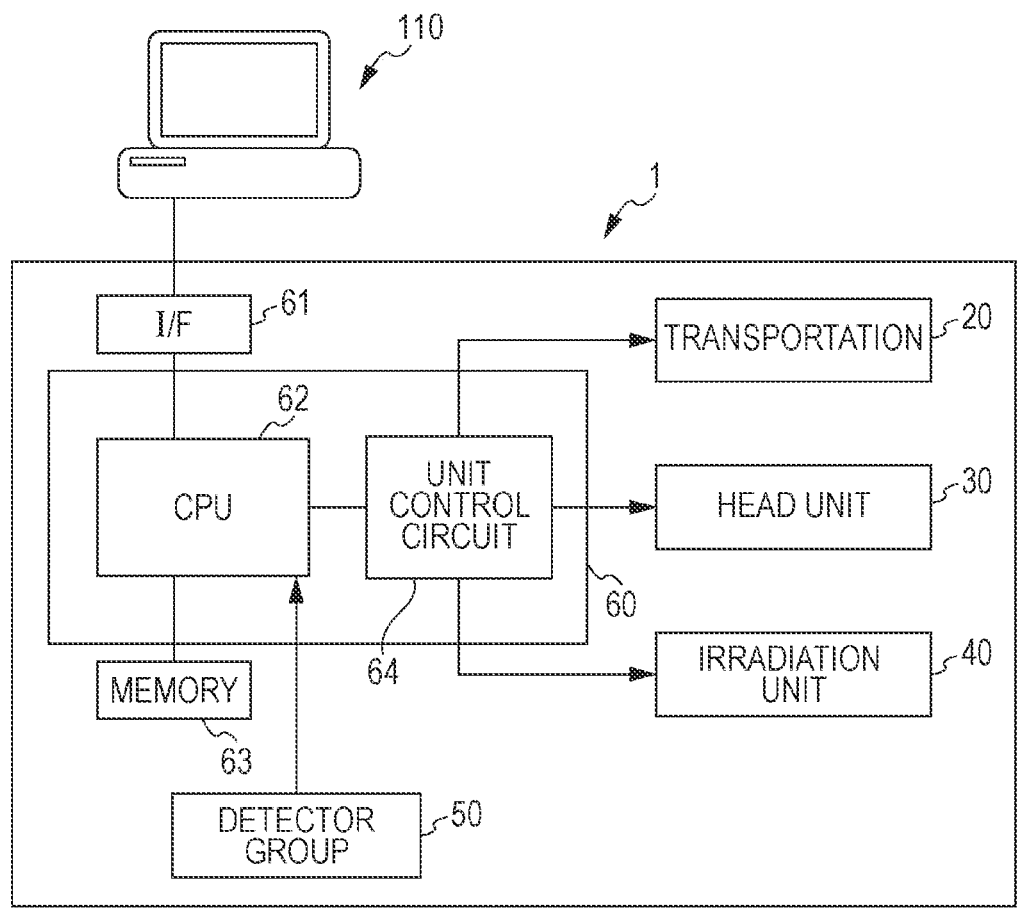
FIG. 1 is a block diagram showing a configuration of a line printer.

Hereinafter, embodiments of a first invention will be described in detail. The invention is not limited to the following embodiments, and various modifications can be performed in a range not departing from the gist of the invention. In addition, in each drawing used in the following description, scale of each constituent element (member) is appropriately changed for a size of each constituent element to be visually recognized on the drawings. The embodiments are not only limited to a ratio of quantity, a shape and a size of the constituent elements and a relative positional relationship of each constituent element described in the drawings.

In the present specification, a "hardenability" refers to a property for curing by photoresponse. "Cured wrinkles" mean wrinkles which are generated on a surface of a coating film after curing, as a result of increase of a coefficient of polymerization volumetric shrinkage by irregular flow of uncured ink existing in the coating film which is a target of curing, before curing, as described above. "Abrasion resistance" refers to a property in which it is difficult for a cured material to be peeled off and to be scratched when the cured material is rubbed.

In this specification, "discharging stability" refers to a property which is to be able to discharge ink droplets which are always stable without clogging of a nozzle, from a nozzle. "Bleed" means bleeding and "bleed resistance property" refers to a property in which bleeding hardly occurs on the edge of an image. "Uneven brightness" means that the difference in shiny appearance between these patterns is seen when an ink pattern which is discharged at first and an ink pattern which is discharged next are adjacently formed. "Preservation stability" refers to a property wherein the viscosity before and after storage is hardly changed when an ink is stored.

In this specification, a "pixel" means the minimum recording unit area corresponding to recording resolution.

In the specification, "(meth)acrylate" means at least any of acrylate and methacrylate corresponding thereto, "(meth)acryl" means at least any of acryl and methacryl corresponding thereto, and "(meth)acryloyl" means at least any of acryloyl and methacryloyl corresponding thereto.

Ink Jet Recording Apparatus

Figure 2:
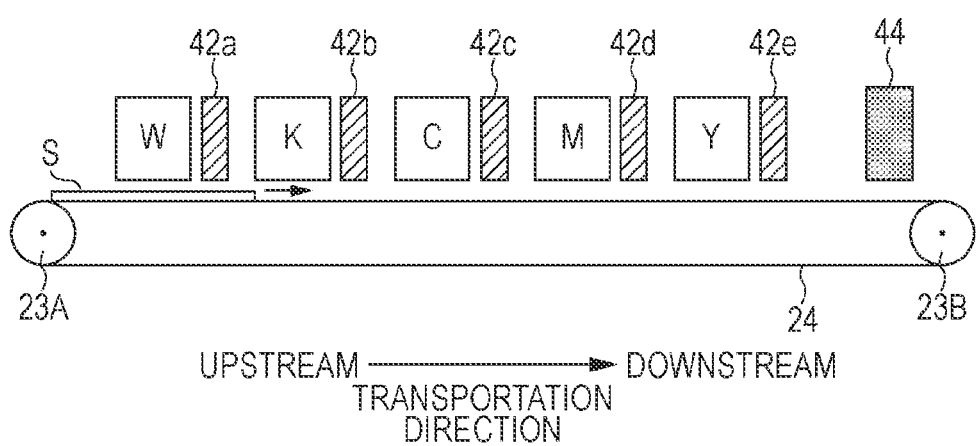
FIG. 2 is a schematic view of a recording area periphery in one embodiment of a line printer in FIG. 1.

One embodiment of the invention relates to an ink jet recording apparatus, that is, a printer. The recording apparatus is used with an ink jet recording method which will be described later. FIG. 2 is a schematic view of a recording area circumference in one aspect of a line printer.

As types of the printer in the embodiment, a line printer and a serial printer are used, and any of these can be used. The printers are used with different printer system. A line printer which is an ink jet recording apparatus of a line system (line type) is a line printer which discharges the ink onto a recording medium, while relatively moving positions of a head including nozzle arrays having a length greater than a length corresponding to a width of the recording medium and the recording medium in a scanning direction intersecting the width direction, and the head is (substantially) not moved, and is fixed, and the recording is performed with one pass (single pass). On the other hand, a serial printer which is an ink jet recording apparatus with a serial system is a serial printer which normally performs recording by two or more passes (multi passes) while reciprocating (shuttle movement) of a head in a direction orthogonal to a transportation direction of a recording medium. Here, the length of the nozzle array is preferable as long as it is a length (almost) corresponding to a width of a recording medium, however, the length of the nozzle row is preferable to be a length equal to or greater than a length corresponding to a width of a recording medium, and is more preferable to be a length corresponding to a width of a recording medium.

Among these, since the serial printer has a pixel in which the ink is not discharged with one pass, or has adjacent pixels in which the ink is not discharged, an ink discharge amount per one pass is relatively small. Accordingly, in a serial printer, there is a tendency in which cured wrinkles are hardly generated, and meanwhile, a recording rate is low due to recording by multi passes or the like. On the other hand, as will be described later, a line printer is a printer which forms an image only by single scanning of a recording medium in a predetermined direction (hereinafter, referred to as "transportation direction"). Accordingly, a line printer is preferable from a viewpoint of a significantly high recording rate, compared to a serial printer, however, problems in that an ink discharge amount per one pass is large and cured wrinkles are easily generated occur. Here, the embodiment capable of preventing generation of cured wrinkles is not limited to a line printer, however, significant effects are particularly exhibited with respect to a line printer. Hereinafter, a line printer will be described with reference to FIG. 1 and FIG. 2.

A printer 1 is a recording apparatus which forms an image on a recording medium and is communicatively connected to a computer 110 which is an external apparatus.

A printer driver is installed in the computer 110. The printer driver is a program for displaying a user interface to a display device (not shown) to convert image data output from an application program into recording data (image forming data). The printer driver is recorded in a "computer-readable recording medium" such as a flexible disk (FD) or a CD-ROM. Alternatively, the printer driver can be downloaded to the computer 110 through Internet. In addition, the program is configured from a code for realizing various functions.

In order to form an image by the printer 1, the computer 110 outputs recording data corresponding to the image to the printer 1.

Here, the "recording apparatus" of the present specification means an apparatus which forms an image on a recording medium, and for example, corresponds to the printer 1. In addition, a "recording controlling apparatus" means an apparatus which controls a recording apparatus, and for example, corresponds to the computer 110 in which the printer driver is installed.

The printer 1 of the embodiment is an apparatus which forms an image on a recording medium by discharging predetermined ultraviolet curable ink which is cured by irradiation with ultraviolet light. As the predetermined ultraviolet curable ink, at least first ultraviolet curable ink is used. The predetermined ultraviolet curable ink contains at least a radical photopolymerization initiator and a radical polymerization compound, and is cured by polymerization reaction due to irradiation with ultraviolet light.

A detailed ink composition of the ultraviolet curable ink will be described later.

The printer 1 of the embodiment includes a transportation unit 20, a head unit 30, an irradiation unit 40, a detector group 50, and a controller 60. The printer 1 which received recording data from the computer 110 which is an external apparatus controls each unit, that is, the transportation unit 20, the head unit 30, and the irradiation unit 40, by the controller 60, and forms an image on a recording medium S according to recording data. The controller 60 controls each unit and forms an image on the recording medium S, based on recording data received from the computer 110. The state in the printer 1 is monitored by the detector group 50, and the detector group 50 outputs a detection result to the controller 60. The controller 60 controls each unit, based on the detection result output from the detector group 50.

The transportation unit 20 is a unit which transports the recording medium S in a transportation direction. As shown in FIG. 2, the transportation unit 20 includes an upstream transportation roller 23A, a downstream transportation roller 23B, and a belt 24, for example. When rotating the transportation roller (not shown), the upstream transportation roller 23A and the downstream transportation roller 23B are rotated, and the belt 24 is rotated. The recording medium S which is fed by a paper feeding roller (not shown) is transported to a recordable area (area opposing to the head), by the belt 24. By transporting the recording medium S by the belt 24, the recording medium S is moved with respect to the head unit 30 in the transportation direction. The recording medium S which passes the recordable area is discharged to outside by the belt 24.

In addition, the recording medium S which is being transported is electrostatic-adsorbed or vacuum-adsorbed to the belt 24. Herein, a phrase of "paper feeding" is used for convenience sake, however, as the recording medium of the embodiment, recording media which will be described later can be used.

The head unit 30 is for discharging the ultraviolet curable ink to the recording medium S. By discharging each ink with respect to the recording medium S which is being transported, the head unit 30 forms dots on the recording medium S and forms an image. The printer 1 of the embodiment is a line printer, each head of the head unit 30 (almost) corresponds to a length of a width of the recording medium, and a dot group corresponding to the width can be formed at one time. In detail, as shown in FIG. 2 which is a schematic view of the recording area periphery of an aspect of the line printer in FIG. 1, in a case where each head of a white ink head W, a black ink head K, a cyan ink head C, a magenta ink head M, and a yellow ink head Y is provided in order from upstream of the transportation direction, a plurality of heads are disposed so that each head can discharge dot groups corresponding to the width of the recording medium S in a front direction from the back of a paper surface. As described above, by controlling each head from the upstream and forming dots in a necessary location in one line corresponding to the width of the recording medium S, it is possible to form an image with only single scanning of the recording medium S in a transportation direction.

In addition, the white ink head W is a discharge unit of ultraviolet curable white ink. The black ink head K is a discharge unit of ultraviolet curable black ink. The cyan ink head C is a discharge unit of ultraviolet curable cyan ink. The magenta ink head M is a discharge unit of ultraviolet curable magenta ink. The yellow ink head Y is a discharge unit of ultraviolet curable yellow ink.

The irradiation unit 40 irradiates the dots of ultraviolet curable ink which is landed on the recording medium S with ultraviolet light. The dots formed on the recording medium S are cured by receiving emission of the ultraviolet light from the irradiation unit 40. As shown in FIG. 2, the irradiation unit 40 of the embodiment may include first irradiation units 42a to 42e and a second irradiation unit 44.

The first irradiation unit 42a to 42e are for irradiating with ultraviolet light for curing the dots formed on the recording medium, and are positioned before the second irradiation unit 44 which performs curing in the same manner, that is, upstream of the transportation direction.

The first irradiation units 42a to 42e are provided on downstream of the transportation directions of the white ink head W, the black ink head K, the cyan ink head C, the magenta ink head M, and the yellow ink head Y, respectively. That is, the first irradiation units are provided for each ink color.

Herein, the first ultraviolet curable ink which is necessary as ink of the embodiment is ink which satisfies conditions of transmittance which will be described later, and in detail, one or more types selected from a group consisting of yellow ink, black ink, orange ink, and green ink, can be obtained. Meanwhile, one or more types selected from a group consisting of white ink, cyan ink, magenta ink, and clear ink can be set ink other than the first ultraviolet curable ink. In addition, in a case where two or more types of ink are discharged from the various ink, it is acceptable as long as at least one type thereof is the first ultraviolet curable ink, and the other ink may not be the first ultraviolet curable ink.

In addition, for example, as shown in FIG. 2, black ultraviolet curable ink discharged from the black ink head K is irradiated with ultraviolet light by at least any of the first irradiation units 42b to 42e and the second irradiation unit 44. At that time, the irradiation unit (light source) which initially irradiates the black ultraviolet curable ink with ultraviolet light is an ultraviolet light emitting diode (UV-LED) having irradiation peak intensity of equal to or more than 800 mW/cm$^2$. Accordingly, when the black ultraviolet curable ink is irradiated with ultraviolet light from the first irradiation units 42b and 42d and the second irradiation unit 44, the first irradiation unit 42b is necessary to be an UV-LED having irradiation peak intensity of equal to or more than 800 mW/cm$^2$, and types or irradiation peak intensity of the other irradiation units, that is, the first irradiation unit 42d and the second irradiation unit 44 are not particularly limited. In addition, in this case, in a case of not emitting ultraviolet light from the first irradiation unit 42b, the first irradiation unit 42d which is an initial light source which performs irradiation is necessary to be an UV-LED which satisfies the above conditions.

The first irradiation units 42a to 42e include UV-LEDs as light sources of ultraviolet irradiation. By controlling an amount of input current by the UV-LEDs, it is possible to easily change an irradiation energy. Among the UV-LEDs, particularly the irradiation unit (light source) which initially irradiates the first violet curable ink with ultraviolet light is preferable to be a type including a condensing lens (hereinafter, also referred to as a "lens-attached LED"), and by irradiating by condensing light to a limited area from the lens-attached LED, it is possible to maintain an irradiation energy and to perform spot irradiation with greater irradiation peak intensity. In addition, the irradiation units other than the irradiation unit which initially irradiates the ink with ultraviolet light may be or may not be lens-attached LEDs.

Figure 3:
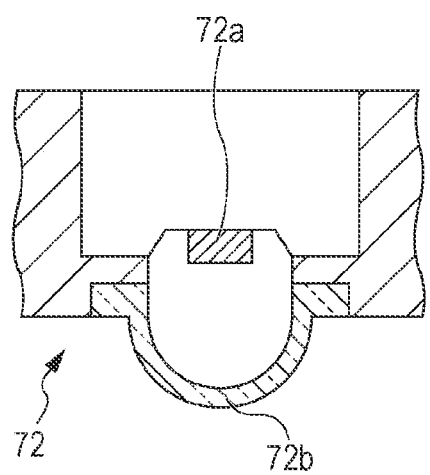
FIG. 3 is a sectional view schematically showing a part of an example of a lens-attached UV-LED among first irradiation units.

Hereinafter, the lens-attached LED will be described. FIG. 3 is a cross-sectional view schematically showing a part of an example of the lens-attached UV-LED, from the first irradiation unit.

An UV-LED 72 is mainly configured by an UV-LED chip 72a and a condensing lens 72b which emits ultraviolet light, and ultraviolet light which is issued by the UV-LED chip 72a is condensed by the condensing lens 72b to form a given irradiation angle and emitted to a lower portion of the first irradiation unit. The condensing lens 72b is a package which covers the UV-LED chip 72a, is formed of a lens formed on the surface thereof in a hemispherical shape and a cover protecting the surface thereof, and condenses ultraviolet light issued from the UV-LED chip 72a towards a center line of a hemisphere. A material of the lens or the cover is not limited as follows, however, for example, transparent resin such as glass, silicon resin, silicon rubber, and the like can be used. The structure of the lens is not limited to the above described structure as long as the light condensing can be performed, and for example, may be a structure where an attached lens which is separately formed in a hemispherical shape, other than a lens which is formed in a hemispherical shape integrated with the package. The UV-LED chip 72a included in the irradiation unit 40 controls a supply current value by an UV-LED driving circuit (not shown) controlled by the controller 60, can rapidly switch an on state and an off state, and can emit ultraviolet light having irradiation intensity necessary for curing the uncured ultraviolet curable ink which is landed on the recording medium S. In addition, a plurality of UV-LED units including the UV-LED are arranged in a line in the width direction and the transportation direction of the recording medium S, and configure each first irradiation unit. The positioning of the UV-LEDs arranged in a line in the transportation direction of the recording medium S in directions of the UV-LEDs arranged in a line in the width direction of the recording medium S, in a viewpoint of even dispersion of irradiation areas where the light condensed from the UV-LEDs in the width direction of the recording medium S. In addition, the other configurations regarding the UV-LED units may be referred to FIG. 4 disclosed in JP-A-2010-23285, and description thereof, for example. Further, the irradiation energy, a light emitting peak wavelength, and irradiation beam intensity for curing by the first irradiation units 42a to 42e will be described later.

The second irradiation unit 44 irradiates the dots formed on the recording medium S with ultraviolet light for curing the dots. The second irradiation unit 44 is provided on downstream with respect to the yellow ink head Y in the transportation direction. In addition, a length of the second irradiation unit 44 in the width direction of the recording medium S is greater than a width of the recording medium S. The second irradiation unit 44 irradiates dots formed by each head of the head unit 30 with ultraviolet light.

The second irradiation unit 44 of the embodiment includes an UV-LED as a light source of ultraviolet irradiation. Since the UV-LED has been described in the description of the first irradiation units 42a to 42e, the description thereof will be omitted herein.

In addition, an irradiation energy, a light emitting peak wavelength, and irradiation peak intensity by the second irradiation unit 44 will be described later.

A rotary encoder (not shown), a paper detecting sensor (not shown), and the like are included in the detector group 50. The rotary encoder detects rotation of the upstream transportation roller 23A or the downstream transportation roller 23B. It is possible to detect a transportation amount of the recording medium S based on the detection results of the rotary encoder. The paper detecting sensor detects a position of an end of the recording medium S which is being fed.

The controller 60 is a control unit which controls the printer. The controller 60 includes an interface unit 61, a CPU 62, a memory 63, and a unit control circuit 64. The interface unit 61 performs transmission and reception of data between the computer 110 which is an external apparatus and the printer 1. The CPU 62 is an arithmetic processing unit which controls the entire printer. The memory 63 is a memory for securing an area for storing programs of the CPU 62 or operation areas, and includes memory elements such as RAM, EEPROM, and the like. The CPU 62 controls each unit through the unit control circuit 64, according to programs stored in the memory 63.

Modification Example of Ink Jet Recording Apparatus

The printer 1 of FIG. 1 described above is only an example of the ink jet recording apparatus according to the embodiment, and there are a lot of variations.

First, in FIG. 2, when the first ultraviolet curable black ink is discharged from the black ink head K, light sources other than the light source (irradiation unit) which initially irradiates the first ultraviolet curable ink with ultraviolet light, that is, light sources which position downstream with respect to the initial light source may be or may not be exist. In a case where the light sources positioned downstream exist, the light sources are not particularly limited, and other LED or a lamp such as a metal halide lamp, a xenon lamp, a carbon-arc lamp, a chemical lamp, a low-pressure mercury lamp, and a high-pressure mercury lamp may be used, other than the UV-LED.

The irradiation by the lamp is performed to an inner portion since a light emitting wavelength of a short wavelength is included, and thus, the cured wrinkles are hardly generated, and it is substantially not necessary to initially have irradiation intensity of equal to or more than 800 mW/cm$^2$. Meanwhile, problems occur in various points such as heat generation, size (including cooling device), power consumption, and life time of the light source, and cost of the irradiator.

On the other hand, the ultraviolet irradiation by the UV-LED has a problem in that cured wrinkles is easily generated compared to the related art, however, the ink jet recording apparatus of the embodiment and the ink jet recording method of an embodiment which will be described later is obtained by solving the problem of easy generation of cured wrinkles. In addition, compared to the lamps described above, the UV-LED is small in size, has a long life time, less heat generation, and high efficiency, and is also excellent in a viewpoint of suppressing cost. Accordingly, in a case of performing ultraviolet irradiation using the UV-LED, the ink jet recording apparatus or the ink jet recording method particularly realizes significant effects.

The above points are the same as in a case of discharging first ultraviolet curable yellow ink from the yellow ink head Y.

In addition, the order of the ink heads of each color shown in FIG. 2 may be changed in any order, and only one ink head may be included or one or more ink heads which are not operated may be included. Further, the other ink heads (the colors may be the same as the existing ink heads or may be different) may be included in addition to the ink heads of each color shown in FIG. 2, or any of the ink heads may be changed to the ink heads of other colors.

Hereinafter, concretization of various variations of the embodiment will be described as Modification Examples, however, the embodiment is not particularly limited to Modification Examples.

Figure 4:
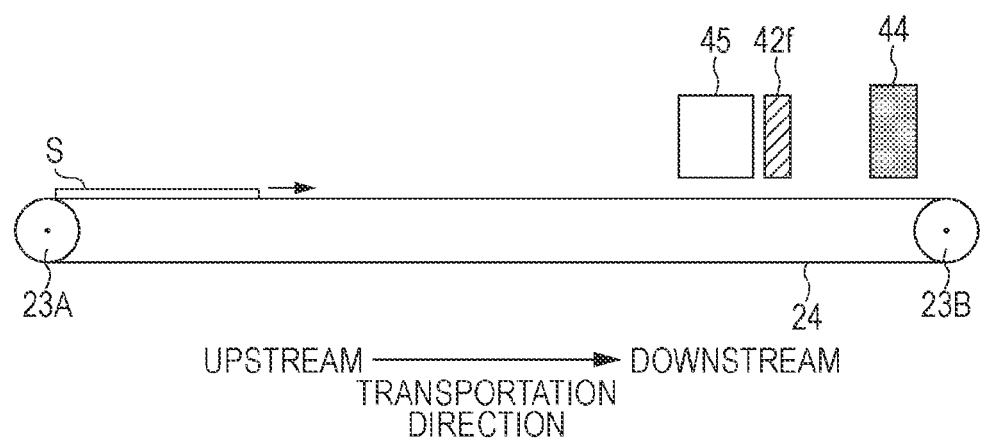
FIG. 4 is a schematic view of a recording area periphery in another embodiment of a line printer in FIG. 1.

A recording apparatus according to First Modification Example is a printer 1 including one or more heads and first irradiation units positioned downstream thereof in the transportation direction, from the white ink head W, the black ink head K, the cyan ink head C, the magenta ink head M, and the yellow ink head Y, and the first irradiation units 42a to 42e positioned downstream of each head in the transportation direction. FIG. 4 shows an aspect of the First Modification Example, and is a schematic view of the vicinity of the recording areas of the other aspect of the line printer of FIG. 1. The line printer shown in FIG. 1 includes a head 45, a first irradiation unit 42f, and the second irradiation unit 44, from the upstream in the transportation direction.

In addition, the printer 1 of First Modification Example may not include the second irradiation unit 44 or may include the second irradiation unit 44 which is not operated.

A recording apparatus according to Second Modification Example is a recording apparatus including the white ink head W, an irradiation unit for white ink, the cyan ink head C, an irradiation unit for cyan ink, the magenta ink head M, an irradiation unit for magenta ink, the black ink head K, an irradiation unit which initially irradiates the black ink which is the first ultraviolet curable ink with ultraviolet light, the yellow ink head Y, an irradiation unit which initially irradiates the yellow ink which is the first ultraviolet curable ink with ultraviolet light, an clear ink head CL, and an irradiation unit for clear ink, from the upstream in transportation direction. According to the recording apparatus according to Second Modification Example, it is possible to realize an excellent shielding property by setting the white ink as a base, and quality improvement of an image by overcoating the clear ink (transparent ink). In addition, before and after discharging the clear ink from the clear ink head CL, by emitting ultraviolet light from each irradiation unit, it is possible to perform proper curing of the color ink before discharging the clear ink.

In addition, the recording apparatus according to Second Modification Example may not include at least any of the white ink head W, the irradiation unit for white ink, and the clear ink head CL.

A recording apparatus according to Third Modification Example includes an UV-LED not including a condensing lens (hereinafter, also referred to as an "LED with no lens") as an UV-LED which is an irradiation source of ultraviolet light, instead of the lens-attached LED. The LED with no lens has the same configuration as in the case of the lens-attached LED, except for a point of not including the condensing lens 72b of FIG. 3. An example of the LED with no lens is formed on a flat surface, other than on the surface of the package covering the UV-LED chip 72a of FIG. 3 in a hemispherical shape, and a cover protecting the surface thereof is also formed on a flat surface.

Figure 5A:
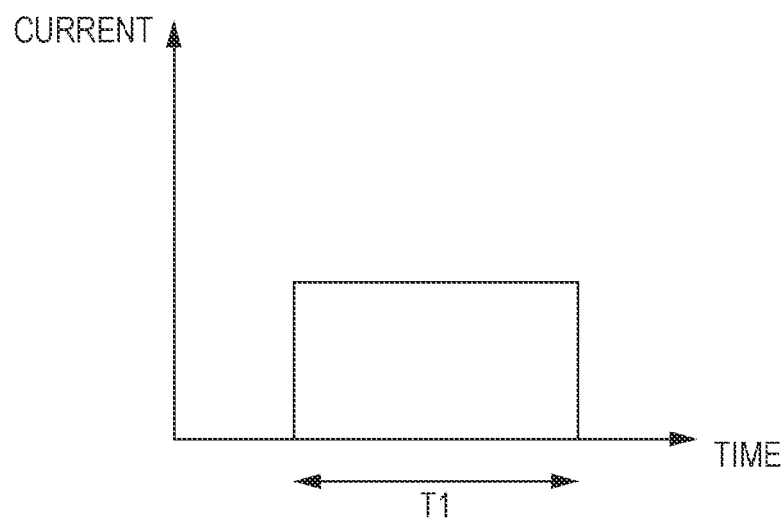
FIG. 5A is a waveform chart of pulse current which flows to an UV-LED in a printer in one embodiment of the invention in a case of not performing pulse irradiation with ultraviolet light.
Figure 5B:
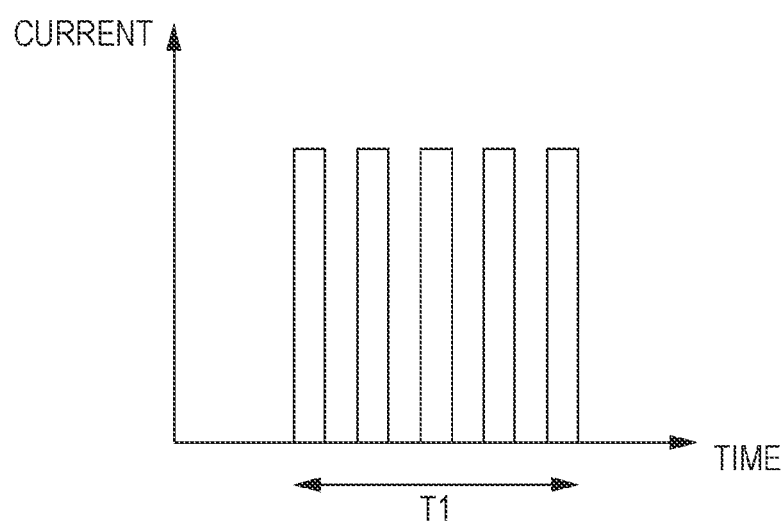
FIG. 5B is a waveform chart of pulse current which flows to an UV-LED in a printer in one embodiment of the invention in a case of performing pulse irradiation with ultraviolet light.

A recording apparatus according to Fourth Modification Example is a recording apparatus which performs pulse irradiation with ultraviolet light by setting input current to LEDs of at least any of the first irradiation units 42a to 42e and the second irradiation unit 44 as pulse current by repeatedly switching the on state and the off state by the UV-LED driving circuit (not shown) (herein, the LED is also referred to as "pulse irradiation LED"). As a driving circuit of the pulse irradiation LED, an MOFSET circuit or the like which performs PWM control can be used. FIG. 5A is a waveform chart of current which flows to the UV-LED in a printer of the embodiment, in a case of not performing pulse irradiation with ultraviolet light. FIG. 5B is a waveform chart of pulse current which flows to the UV-LED in a printer of the embodiment, in a case of performing pulse irradiation with ultraviolet light. In a case of the pulse current, the input current is pulse peak current, that is, peak input current. The total electric energy input to the UV-LED is calculated with the following expression.

$$\text{Total electric energy} = \text{input current} \times T1 \times \text{Duty ratio}$$

In the expression, T1 means irradiation time for the recording medium, and time from start of irradiation of the recording medium to the end of the irradiation. Duty ratio is a value expressed in the following expression when performing 1 periodic driving of pulse.

Duty ratio=duration when current is turned on/(duration when current is turned on+duration when current is turned off)

A Duty ratio of the LED which does not perform the pulse irradiation is 1. A Duty ratio in a case of performing the pulse irradiation may be 0.5, for example, and a pulse frequency may be set as 1 kHz, for example. Heat generation of the UV-LED generally becomes greater as the total electric energy becomes greater.

The irradiation peak intensity of the UV-LED generally becomes greater as the input current becomes greater. By performing the pulse irradiation as shown in FIG. 5B, in a case of fixing time T1 from the start of the irradiation to the end of the irradiation, it is possible to have greater irradiation peak intensity while maintaining the total input current. As described above, since the pulse irradiation LED efficiently increase the irradiation peak intensity, it is particularly suitable to be used for the first irradiation unit 42 in which greater irradiation peak intensity is necessary.

For example, FIG. 1, FIG. 2, and the description thereof disclosed in JP-A-2006-231795, and description disclosed in JP-T-2011-523370 may be referred for the pulse irradiation LED described above. The irradiation energy of the pulse irradiation LED can be calculated using the following expression.

Irradiation energy=irradiation peak intensity×T1×Duty ratio

Accordingly, when T1 is fixed, it is possible to increase the peak intensity while maintaining the same irradiation energy of the LED or it is possible to decrease the irradiation energy of the LED while maintaining the same peak intensity, in a case of performing the pulse irradiation, compared to the case of not performing the pulse irradiation.

In addition, the irradiation from UV-LED is preferable to be at least any of the pulse irradiation and the spot irradiation. In this case, as described above, it is possible to further increase the irradiation peak intensity while maintaining the irradiation energy.

Figure 6:
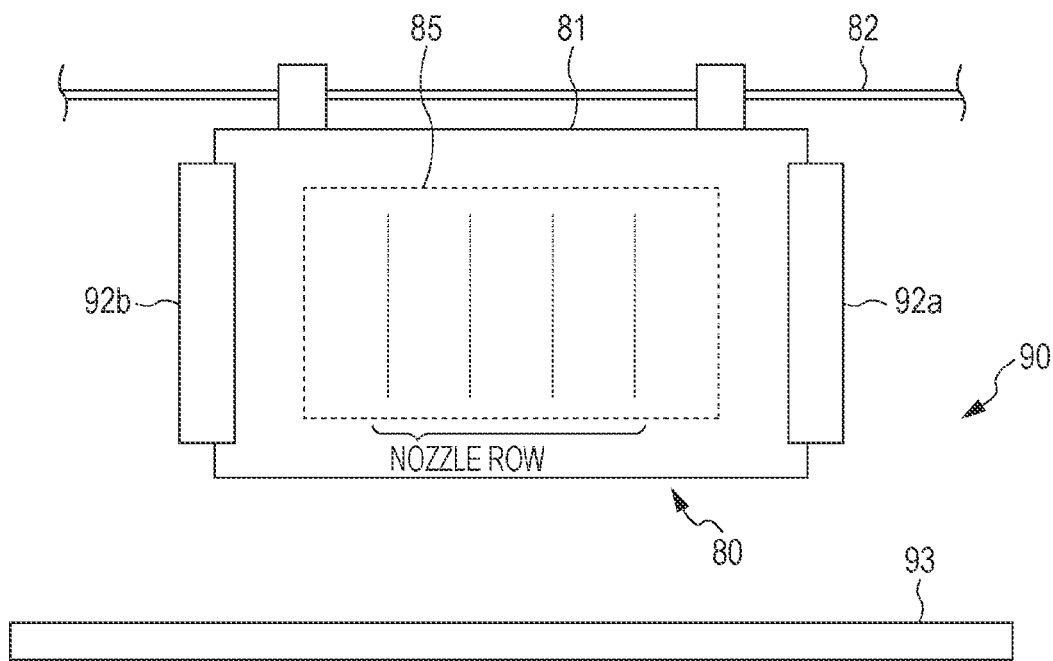
FIG. 6 is a schematic view of a head periphery of a serial printer.
Figure 6:
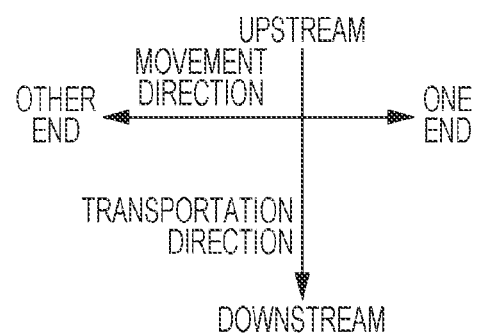

A recording apparatus according to Fifth Modification Example is a recording apparatus which uses a serial printer instead of the line printer described with reference to FIG. 2 and the like. Characteristics of the line printer and the serial printer are as described above. Hereinafter, an example of the serial printer will be briefly described. FIG. 6 is a schematic view of the vicinity of the head of the serial printer.

A carriage unit 80 is a movement mechanism which moves, that is, scans a head 85 with respect to a recording medium rested in a recording area, in a direction (hereinafter, referred to as a "moving direction" or a "main scanning direction") intersecting the transportation direction (auxiliary scanning direction), while discharging ink. The carriage unit 80 includes a carriage 81 and a carriage motor (not shown). In addition, the carriage 81 detachably holds an ink carriage (not shown) which accommodates ultraviolet curable ink. The carriage 81 reciprocates along a guide spindle 82 by the carriage motor, in a state of being supported by the guide spindle 82 which intersects the transportation direction which will be described later.

The head 85 is for discharging ultraviolet curable ink with respect to a recording medium, and includes a plurality of nozzles. Since the head 85 is provided in the carriage 81, when the carriage 81 is moved in the moving direction, the head 85 also moves in the moving direction. By intermittently discharging ultraviolet curable ink by the head 85 which is being moved in the moving direction, dot rows along the moving direction are formed on the recording medium.

In addition, in the movement of the head 85, the discharging of the ultraviolet curable ink is performed during movement from one end side to the other end side of FIG. 6, however the discharging of the ultraviolet curable ink is not performed during movement from the other end side to the one side.

The irradiation unit 90 irradiates the ultraviolet curable ink which is attached (landed) on the recording medium with ultraviolet light to cure the ultraviolet curable ink. The dots formed on the recording medium is irradiated with ultraviolet light from the irradiation unit 90 to be cured, and a cured material is formed. The irradiation unit 90 includes first irradiation units 92a and 92b and a second irradiation unit 93 on downstream of the head 85 in the transportation direction.

Herein, the first irradiation units 92a and 92b correspond to the first irradiation units of the line printer described above, and the second irradiation unit 93 corresponds to the second irradiation unit of the line printer described above. In the configuration and the operation of the serial printer, the irradiation unit which initially irradiates first ultraviolet curable ink from the first irradiation units 92a and 92b corresponds to a light source which initially irradiates the first ultraviolet curable ink with ultraviolet light.

In addition, detailed description of other points regarding the first irradiation units 92a and 92b and the second irradiation unit 93 will be omitted.

One unit recording operation is realized with one main scanning by the carriage unit 80, the head 85, the first irradiation units 92a and 92b, and the second irradiation unit 93, and in the embodiment, the unit recording operations are performed plural times. Herein, the "unit recording operation" means a single operation of forming an image over the entire recording medium, and is also referred to as a pass or main scanning.

When performing the recording, a dot formation operation of discharging ultraviolet curable ink from the head 85 which is being moved in the moving direction, and a transportation operation of transporting a recording medium in the transportation direction are alternately repeated, and an image formed of a plurality of dots is recorded on the recording medium.

An ink jet recording method using the serial printer includes performing the unit recording operation (unit recording step) plural times, which includes at least a discharging step of discharging ultraviolet curable ink from the head 85 towards a recording medium, and a curing step of irradiating ultraviolet curable ink which is landed on a recording medium with ultraviolet light to cure the ultraviolet curable ink. In more detail, the recording method is a method of performing recording by alternately performing the unit recording operation and the transportation operation (transporting step) of transporting a recording medium. Accordingly, when recording, the recording medium is not transported, and is in a state of being held by a platen (not shown) which positions in the recording area. Thus, it is possible to form a cured material in an area of the recording medium opposing to the head 85.

In addition, when performing the recording of the ink set using the serial printer with different irradiation peak intensity for initial irradiation depending on each ink after the discharging, as shown in FIG. 2 in JP-A-2011-25684, for example, the recording may be performed using a serial printer including a light source for each head of the carriage.

Ink Jet Recording Method

One embodiment of the invention relates to an ink jet recording method. The ink jet recording method can be performed using the ink jet recording apparatus of the embodiment described above. In addition, the ink jet recording method includes a discharging step of discharging first ultraviolet curable ink of a radical polymerization reaction type which contains a radical photopolymerization initiator and a radical polymerization compound and in which transmittance at a wavelength of 395 nm is equal to or less than 1%, onto a recording medium, and a curing step of curing the first ultraviolet curable ink which is landed on the recording medium by initially irradiating the ink with ultraviolet light from an UV-LED in which irradiation peak intensity is equal to or more than 800 mW/cm$^2$.

Discharging Step

In the discharging step, viscosity of the ink at the time of being discharged is preferable to be equal to or less than 25 mPa·s, and more preferable to be 5 mPa·s to 20 mPa·s. If the viscosity of the ink is as described above when a temperature of the ink is a room temperature or in a state of not heating the ink, the ink may be discharged with a temperature of the ink as a room temperature or without heating the ink. Meanwhile, by heating the ink to a predetermined temperature, the ink may be discharged by setting the viscosity to a preferable value. Accordingly, excellent discharging stability is realized.

Since ultraviolet curable ink has high viscosity than water-based ink used for ink for normal ink jet, viscosity fluctuation due to temperature fluctuation at the time of discharging is large. Such viscosity fluctuation of the ink largely affects change of liquid droplet size and change of liquid droplet discharging speed, and further, image quality degradation may occur. Accordingly, it is preferable to maintain a constant temperature of the ink at the time of discharging as much as possible.

Curing Step

Next, in the curing step, first ultraviolet curable ink which is discharged onto and landed on the recording medium is cured by initially receiving ultraviolet irradiation from any UV-LED having irradiation peak intensity of equal to or more than 800 mW/cm$^2$ from the first irradiation units 42a to 42e and the second irradiation unit 44. In other words, an ink coating film formed on the recording medium becomes a cured film by the irradiation with ultraviolet light. This is because that at least the radical photopolymerization initiator included in the first ultraviolet curable ink is decomposed by the irradiation with ultraviolet light to generate radical which is an initiating species, and polymerization reaction of the radical polymerization compound is promoted by functions of the radical. Alternatively, it is because that the radical polymerization reaction of the radical polymerization compound starts by the irradiation with ultraviolet light. At that time, if there is at least a sensitizing dye with the radical photopolymerization initiator in the first ultraviolet curable ink, the sensitizing dye in a system absorbs active ultraviolet light to be in an excitation state, and promotes the decomposition of the radical photopolymerization initiator by being in contact with the radical photopolymerization initiator, and it is possible to realize curing reaction with higher sensitivity.

The predominance for using the UV-LED as the light source is as described above.

The light emitting peak wavelength at the time of the irradiation is preferable to be in a range of 360 nm to 420 nm, and more preferable to be in a range of 380 nm to 410 nm. It is suitable that the light emitting peak wavelength be in the range described above, from viewpoints of easy purchase and low cost of the UV-LED.

In addition, the light emitting wavelength may be one or more in the preferable wavelength range. Even in a case of the plurality of light emitting peak wavelength, the entire irradiation energy amount of ultraviolet light having the light emitting peak wavelength in the above described range is set as the irradiation energy described above.

The peak intensity (irradiation peak intensity) of the ultraviolet light initially emitted to the first ultraviolet curable ink is equal to or more than 800 mW/cm$^2$, and preferably equal to or more than 1000 mW/cm$^2$. If the irradiation peak intensity is in the range described above, hardenability is excellent, and it is possible to effectively prevent generation of cured wrinkles. In more detail, as a result of delay of the curing of the inner portion of the ink coating film compared to the curing of the surface thereof, the surface of the ink coating film is first cured, and it is possible to effectively prevent generation of cured wrinkles.

The irradiation peak intensity will be further described. The LEDs have narrow range of the light emitting wavelength from the characteristics thereof, and among them, as described above, the long-wavelength LED having the light emitting peak wavelength in a range of 360 nm to 420 nm is obtained with low cost, however includes only a range of the light emitting wavelength limited by the long-wavelength. Accordingly, it is difficult for the emitted ultraviolet light to reach the inner portion of the ink droplet which is landed on the recording medium, and only the surface of the ink coating film is first cured. Thus, when curing the ultraviolet curable ink (at least the first ultraviolet curable ink) in which transmittance at a wavelength of 395 nm is equal to or less than 1%, the cured wrinkles tend to be easily generated (wrinkles tend to be easily generated on the surface of the cured film). Here, the inventors of the present application have found that it is possible to reduce the cured wrinkles even in a case of using the long-wavelength LED, by setting the irradiation peak intensity to be equal to or more than 800 mW/cm$^2$. Accordingly, by setting the irradiation peak intensity of the first ultraviolet curable ink to be relatively high, it is possible to perform both curing almost at the same time without delay of the curing of the inner portion of the ink coating film compared to the curing of the surface thereof, and to prevent the cured wrinkles. Thus, glossiness becomes high and shiny appearance is excellent. In a case of using the first ultraviolet curable ink, and when the irradiation peak intensity is small, the reason of easy generation of the cured wrinkles is expected as a significantly low curing speed for such ink in the inner portion of the coating film compared to a curing speed in the surface of the coating film. However, the reason is not limited thereto.

In addition, the ultraviolet curable ink containing the radical photopolymerization initiator and the radical polymerization compound has a high curing speed, and particularly it is possible to obtain a high curing speed, even with the ultraviolet irradiation from the light source including the limited light emitting peak wavelength as the LED. However, in a case of using the ink, the problem in that the cured wrinkles are easily generated occurs. The inventors of the present application also found that a high-quality recorded material with excellent hardenability and no cured wrinkles can be obtained by setting the irradiation peak intensity to be equal to or more than 800 mW/cm$^2$, even in a case of using such ink.

Herein, the ultraviolet irradiation with the irradiation peak intensity of equal to or more than 800 mW/cm$^2$ may be performed one time, or may be performed two or more times. In addition, in a case of performing the ultraviolet irradiation two or more times, the ultraviolet irradiation can be performed plural times from the same light source, or the ultraviolet irradiation may be performed one or more times from each different light source.

In addition, since the irradiation peak intensity can suppress the cost of the irradiator and can prevent heat generation or light leakage from the light source from affecting the head to obtain excellent discharging stability, the irradiation peak intensity is preferable to be 800 mW/cm$^2$ to 4000 mW/cm$^2$, more preferable to be 800 mW/cm$^2$ to 2000 mW/cm$^2$, and further preferable to be 1000 mW/cm$^2$ to 2000 mW/cm$^2$.

In addition, for the irradiation peak intensity of the present specification, a value which is measured using an ultraviolet meter UM-10 and a receptor UM-400 (all manufactured by KONICA MINOLTA SENSING, INC.) is used. However, the measuring method of the irradiation peak intensity is not limited, and a well-known measuring method of the related art can be used.

In addition, the irradiation energy at the time of the irradiation is preferable to be 100 mJ/cm$^2$ to 600 mJ/cm$^2$, more preferable to be 200 mJ/cm$^2$ to 600 mJ/cm$^2$, and further preferable to be 200 mJ/cm$^2$ to 500 mJ/cm$^2$. If the irradiation energy is in the range described above, an excellent hardenability is obtained, and it is possible to suppress the cost of the irradiation units necessary for the irradiation.

In addition, the irradiation energy of the present specification is calculated by multiplying the irradiation peak intensity by the time from the irradiation start to the irradiation end, and in a case of the pulse irradiation LED, the Duty ratio is further multiplied for the calculation.

Herein, the ultraviolet irradiation with the irradiation peak intensity of equal to or more than 800 mW/cm$^2$ may be performed plural times. In this case, the irradiation energy is expressed as the irradiation energy amount obtained by adding the irradiation of the plural times. In addition, in a case of performing the irradiation with the irradiation peak intensity of equal to or more than 800 mW/cm$^2$ plural times, for further excellent discharging stability, the irradiation energy in the irradiation initially performed after the discharging is preferable to be equal to or less than 800 mJ/cm$^2$, more preferable to be equal to or less than 400 mJ/cm$^2$, further preferable to be equal to or less than 200 mJ/cm$^2$, and further more preferable to be 50 mJ/cm$^2$ to 200 mJ/cm$^2$.

When the irradiation peak intensity, the irradiation energy, and the light emitting peak wavelength described above are in the preferable ranges, the curing is performed with a low energy and at a high speed with the composition of the ink which will be described later. In addition, it is possible to shorten the irradiation time by the composition of the ink which will be described later, and in this case, the recording speed increases. Meanwhile, it is possible to reduce the irradiation peak intensity by the composition of the ink which will be described later, and in this case, the miniaturization of the apparatus and reduction of the cost is realized.

In addition, as described above, in the curing step, it is preferable to further perform irradiation with ultraviolet light, after the first ultraviolet curable ink is initially irradiated with ultraviolet light from the UV-LED having the irradiation peak intensity of equal to or more than 800 mW/cm$^2$. The light source in a case of further irradiating the first ultraviolet curable ink with ultraviolet light is not particularly limited as described above, and the irradiation peak intensity, the irradiation energy, and the peak wavelength are not particularly limited, however in a case where the curing is not sufficiently performed with the first irradiation, that is, in a case of preliminary curing, it is preferable to have an irradiation energy to perform sufficient curing (proper curing). In addition, the number of the light sources or the number of times of the irradiation when further irradiating is not particularly limited.

In addition, for obtaining the same advantageous effects as described above, the light emitting peak wavelength when initially irradiates the first ultraviolet curable ink with ultraviolet light is preferable to be in a range of 360 nm to 420 nm, and more preferable to be in a range of 380 nm to 410 nm.

Ink Jet Recording Method Using an Ink Set

An ink jet recording method in a case of using an ink set including the first ultraviolet curable ink will be further described from the ink jet recording method described above.

From the ink jet recording method in a case of using the ink set, an ink jet recording method further including a discharging step of discharging ultraviolet curable ink (hereinafter, also referred to as "second ultraviolet curable ink") of a radical polymerization reaction type in which a radical photopolymerization initiator and a radical polymerization compound is included and transmittance at a wavelength 395 nm exceeds 1%, onto a recording medium, and a curing step of curing the second ultraviolet curing ink which is landed on the recording medium by irradiating the ink with ultraviolet light, is preferable. In addition, it is more preferable that the light source which initially emits ultraviolet light in the curing step be an UV-LED having the irradiation peak intensity of less than 800 mW/cm$^2$. In this case, it is possible to uneven brightness which can be generated between the coating film of the first ultraviolet curable ink and the coating film of the second ultraviolet curable ink.

Herein, the irradiation peak intensity will be further described. When curing the ultraviolet curable ink such as the second ultraviolet curable ink in which transmittance at a wavelength of 395 nm exceeds 1%, if the light source having the irradiation peak intensity of equal to or more than 800 mW/cm$^2$ is used in the same manner as the case of the first ultraviolet curable ink, the shiny appearance tends to become high. However, when performing multi-color printing using the first ultraviolet curable ink and the second ultraviolet curable ink, it is difficult to balance shiny appearance with an image portion of the first ultraviolet curable ink due to extremely high shiny appearance of an image portion of the second ultraviolet curable ink. As a result, uneven brightness is observed between each image portion. Here, the inventors of the present application have found that, it is possible to prevent generation of the cured wrinkles and to reduce the uneven brightness, by setting the irradiation peak intensity of the second ultraviolet curable ink to be relatively low to be less than 800 mW/cm$^2$, when performing the multi-color printing.

The irradiation peak intensity from the UV LED is more preferable to be 100 mW/cm$^2$ to 700 mW/cm$^2$, and further preferable to be 100 mW/cm$^2$ to 500 mW/cm$^2$. In addition, the irradiation energy when irradiating the second ultraviolet curable ink with ultraviolet light is preferable to be equal to or less than 500 mJ/cm$^2$, and more preferable to be 100 mJ/cm$^2$ to 400 mJ/cm$^2$. If the irradiation peak intensity and the irradiation energy are in the range described above, the hardenability and discharging stability also become excellent.

The discharging step and the curing step using the first ultraviolet curable ink and the discharging step and the curing step using the second ultraviolet curable ink may be performed in any order, and the order is not particularly limited. After performing to the process of the curing of the first ultraviolet curable ink, the discharging step of the second ultraviolet curable ink may be performed, or after performing to the process of curing the second ultraviolet curable ink, the discharging step of the first ultraviolet curable ink may be performed. In addition, each curing step is not limited to a curing step of performing sufficient curing, and may be a curing step of curing at least a part of the ink, or the sufficient curing may not be performed finally.

Among them, it is preferable to subsequently perform the discharging step and the curing step using the second ultraviolet curable ink, after sequentially performing the discharging step and the curing step using the first ultraviolet curable ink. In this case, it is possible to reduce the irradiation energy in the curing step of the first ultraviolet curable ink.

Further, after performing each curing step of the first ultraviolet curable ink and the second ultraviolet curable ink, a curing step of curing the first ultraviolet curable ink and the second ultraviolet curable ink by further irradiating the ink with ultraviolet light, may be provided. By providing the additional curing step described above, it is also possible to reduce the irradiation energy in the curing step of the second ultraviolet curable ink.

Further, in a case of performing multi-color printing with multicolor ink by a plurality of heads using the recording apparatus shown in FIG. 2, by performing minimum irradiation for preventing color mixing for each head and finally collectively irradiating the multicolor ink with intensity of equal to or more than 800 mW/cm$^2$, it is possible to suppress the cost of the light source to be extremely low.

In addition, for obtaining the same advantageous effects as described above, the light emitting peak wavelength when it initially irradiates the second ultraviolet curable ink with ultraviolet light is preferable to be in a range of 360 nm to 420 nm, and more preferable to be in a range of 380 nm to 410 nm.

Recording Medium

A recorded material is obtained by discharging the ink onto the recording medium by using the ink jet recording method of the embodiment. As the recording medium, for example, an ink absorbable or non-absorbable recording medium is used. The ink jet recording method of the embodiment can be widely applied to recording media having various absorption properties, such as a non-absorbable recording medium in which permeation of water-soluble ink is difficult, and an absorbable recording medium in which permeation of ink is easy.

As the absorbable recording medium, it is not particularly limited, and for example, plain paper such as electrophotographic paper having high permeability of ink, ink jet paper (exclusive paper for ink jet including an ink absorbing layer configured of silica particles or alumina particles, or an ink absorbing layer configured of hydrophilic polymer such as polyvinyl alcohol (PVA) or polyvinylpyrrolidone (PVP)), art paper, coated paper, or cast paper which is used for general offset printing having relatively low permeability of water-based ink, or the like, is used.

As the non-absorbable recording medium, it is not particularly limited, and for example, a plastic film or plate such as polyvinyl chloride, polyethylene, polypropylene, polyethylene terephthalate (PET), or the like, a metallic plate such as iron, silver, copper, aluminum, or the like, or metallic plate or plastic film obtained by manufacturing by vapor disposition of each metals thereof, alloy plate such as stainless or brass, or the like is used.

As described above, according to the embodiment, it is possible to provide an ink jet recording method which can have an excellent hardenability, effectively prevent cured wrinkles, and further have excellent abrasion resistance, discharging stability, and bleed resistance.

Among the effects realized by the embodiment described above, hardenability will be described in detail. In a case of a relatively thin film thickness of a cured film and a radical polymerization reaction system, hardenability is degraded due to effect of oxygen inhibition. If sufficient irradiation is performed, an excellent hardenability can be secured, however, in a case of using a relatively thick cured film, a problem of degradation of the recording image quality occurs due to generation of cured wrinkles. To this, according to the embodiment, it is possible to suppress generation of cured wrinkles.

Ultraviolet Curable Ink

An embodiment of the invention relates to ultraviolet curable ink. The ultraviolet curable ink is at least the first ultraviolet curable ink of a radical polymerization reaction type, and is used in the ink jet recording method of the embodiment described above. In addition, the first ultraviolet curable ink contains the radical photopolymerization initiator and the radical polymerization compound, and has transmittance at a wavelength of 395 nm to be equal to or less than 1%.

Herein, the ultraviolet curable ink can be classified into radical polymerization reaction type ink and cation polymerization reaction type ink, from the difference in polymerization reaction mechanism thereof. Among them, the ultraviolet curable ink of cation polymerization reaction type contains a cation photopolymerization initiator and a cation polymerization compound, and, cured wrinkles are difficult to be generated due to a low coefficient of polymerization volumetric shrinkage. Accordingly, it is substantially unnecessary to set the irradiation intensity of initial irradiation to be equal to or more than 800 mW/cm$^2$, for the ultraviolet curable ink of cation polymerization reaction type.

Meanwhile, among them, the ultraviolet curable ink of radical polymerization reaction type is ink containing the radical photopolymerization initiator and the radical polymerization compound, and is ink in that radical photopolymerization initiator generates radical by the irradiation with ultraviolet light, and polymerization reaction of the radical polymerization compound is promoted. The ultraviolet curable ink of radical polymerization reaction type is advantageous in that an ink material is inexpensive, there are many types of radical polymerization compound, and it is easy to deal with various requirements such as film quality, however, a problem in that the cured wrinkles are easily generated occurs due to a high coefficient of polymerization volumetric shrinkage.

Here, it is possible to effectively prevent generation of cured wrinkles by using the predetermined ultraviolet curable ink of the radical polymerization reaction type in the ink jet recording method of the embodiment described above. Accordingly, the significant effects are obtained when using the ultraviolet curable ink of the radical polymerization reaction type than the cation polymerization reaction type, in the ink jet recording method described above.

Hereinafter, an additive (component) which is contained or may be contained at least in the first ultraviolet curable ink among the ultraviolet curable ink of the embodiment (hereinafter, simply referred to as "ink"), will be described.

In the ultraviolet curable ink other than the first ultraviolet curable ink, not otherwise specified, the following components may be or may not be contained, and other well-known components of the related art may be contained. As the ultraviolet curable ink other than the first ultraviolet curable ink, the second ultraviolet curable ink and ink other than the second ultraviolet curable ink which will be described later are used.

Radical Polymerization Compound

The radical polymerization compound included in the ink is polymerized at the time of light irradiation with the operation of the radical photopolymerization which will be described later and the printed ink can be cured.

The radical polymerization compound included in the ink is polymerized at the time of light irradiation with the operation of the radical photopolymerization which will be described later and it is possible to cure printed ink. As the radical polymerization compound, various monofunctional, bifunctional, and trifunctional or more of polyfunctional monomers and oligomers which are well known in the related art can be used. As the monomer, unsaturated carboxylic acid such as (meth)acrylate, itaconate, crotonate, isocrotonic acid, and maleic acid, or salt thereof, ester, urethane, amide, and anhydride thereof, acrylonitrile, styrene, various unsaturated polyester, unsaturated polyether, polyether polyamides, and unsaturated urethane, are used for example. In addition, as the oligomers, an oligomer formed from the monomers described above such as a straight-chain acrylic oligomer or the like, epoxy (meth)acrylate, oxetane (meth)acrylate, aliphatic urethane (meth)acrylate, aromatic urethane (meth)acrylate, and polyester (meth)acrylate are used for example.

In addition, as the other monofunctional monomer or multifunctional monomer, an N-vinyl compound may be contained. As the N-vinyl compound, N-vinyl formamide, N-vinyl carbazole, N-vinyl acetamide, N-vinyl pyrrolidone, N-vinyl caprolactam, and acryloylmorpholine, and derivatives thereof are used, for example.

Among the radical polymerization compounds, ester of (meth)acrylate, that is, (meth)acrylate is preferable.

Among the (meth)acrylate, as monofunctional (meth)acrylate, monofunctional (meth)acrylate having an aromatic ring skeleton such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxy butyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, tetrahydro furfuryl (meth)acrylate, isobornyl (meth)acrylate, 2-hydroxyethyl (meth)acrylate, 2-hydroxypropyl (meth)acrylate, lactone-modified flexible (meth)acrylate, t-butyl cyclohexyl (meth)acrylate, dicyclopentanyl (meth)acrylate, dicyclopentenyloxyethyl (meth)acrylate, phenoxyethyl (meth)acrylate, phenoxy diethylene glycol (meth)acrylate, 2-hydroxy-3-phenoxypropyl (meth)acrylate, and benzyl (meth)acrylate, and vinyl ether group-containing (meth)acrylate esters expressed by the following General Formula (I), are used, for example.

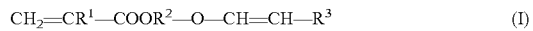

$$CH_2=CR^1-COOR^2-O-CH=CH-R^3 \quad (I)$$

In Formula (I), $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

Among them, since it is possible to obtain an excellent hardenability and have low viscosity of the ink, at least any of vinyl ether group-containing (meth)acrylate esters represented by the General Formula (I) and phenoxyethyl (meth)acrylate expressed is preferable.

Among (meth)acrylate described above, as bifunctional (meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, and polytetramethyleneglycol di(meth)acrylate are used, for example. Among them, at least any of diethylene glycol di(meth)acrylate and tripropylene glycol di(meth)acrylate is preferable.

Among (meth)acrylate described above, as trifunctional or more of polyfunctional (meth)acrylate, trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylol propane tetra(meth)acrylate, glycerine propoxy tri(meth)acrylate, caprolactone-modified trimethylolpropane tri(meth)acrylate, pentaerythritol tetra(meth)acrylate, and caprolactam-modified dipentaerythritol hexa(meth)acrylate are used, for example.

Vinyl ether group-containing (meth)acrylate esters expressed by General Formula (I) will be described in detail. In General Formula (I), as the divalent organic residue having 2 to 20 carbon atoms represented by $R^2$, a straight, branched, or cyclic alkylene group having 2 to 20 carbon atoms which may be substituted, an alkylene group including oxygen atoms due to ether bond and/or ester bond in a structure and having 2 to 20 carbon atoms which may be substituted, and a divalent aromatic group having 6 to 11 carbon atoms which may be substituted are preferable. Among them, an alkylene group having 2 to 6 carbon atoms such as an ethylene group, an n-propylene group, an isopropylene group, and a butylene group, and an alkylene group having oxygen atoms due to ether bond in a structure and having 2 to 9 carbon atoms such as an oxyethylene group, an oxy n-propylene group, an oxy isopropylene group, an oxybutylene group are preferably used.

In General Formula (I), as the monovalent organic residue having 1 to 11 carbon atoms represented by $R^3$, a straight, branched, or cyclic alkyl group having 1 to 10 carbon atoms which may be substituted, and an aromatic group having 6 to 11 carbon atoms which may be substituted are preferable. Among them, an alkyl group having 1 or 2 carbon atoms such as a methyl group or an ethyl group, and an aromatic group having 6 to 8 carbon atoms such as a phenyl group and a benzene group are preferably used.

In a case where each organic residue is a group which may be substituted, the substituent thereof is divided into a group containing carbon atoms and a group not containing carbon atoms. First, in a case where the substituent is a group containing carbon atoms, the number of the carbon atoms are counted as the number of carbon atoms in the organic residue. The group containing carbon atoms is not limited to the following, however, a carboxyl group and an alkoxy group are used, for example. Next, the group not containing carbon atoms are not limited o the following, however, a hydroxyl group and a halo group are used, for example.

Among vinyl ether group-containing (meth)acrylate esters, since the lower viscosity of the ink, a high flash point, and an excellent hardenability of ink can be obtained, 2-(vinyloxyetoxy) ethyl (meth)acrylate, that is, at least any of 2-(vinyloxyetoxy) ethyl acrylate and 2-(vinyloxyetoxy) ethyl methacrylate is preferable, and 2-(vinyloxyetoxy) ethyl acrylate is more preferable. Particularly, since all of 2-(vinyloxyetoxy) ethyl acrylate and 2-(vinyloxyetoxy) ethyl methacrylate have simple structure and small molecular weight, it is possible to significantly lower viscosity of ink. As 2-(vinyloxyetoxy) ethyl (meth)acrylate, 2-(2-vinyloxyetoxy) ethyl (meth)acrylate and 2-(1-vinyloxyetoxy) ethyl (meth)acrylate are used, and as 2-(vinyloxyetoxy) ethyl acrylate, 2-(2-vinyloxyetoxy) ethyl acrylate and 2-(1-vinyloxyetoxy) ethyl acrylate are used. In addition, 2-(vinyloxyetoxy) ethyl acrylate is more excellent in viewpoint of hardenability, compared to 2-(vinyloxyetoxy) ethyl methacrylate.

Vinyl ether group-containing (meth)acrylate esters described above may be used alone, or may be used in combination of two or more kinds.

As a manufacturing method of vinyl ether group-containing (meth)acrylate esters described above, it is not limited to the following, however, a method of esterifying (meth)acrylate and hydroxyl group-containing vinyl ether (manufacturing method B), a method of esterifying halide (meth)acrylate and hydroxyl group-containing vinyl ether (manufacturing method C), a method of esterifying (meth)acrylic anhydride and hydroxyl group-containing vinyl ether (manufacturing method D), a method of esterifying (meth)acrylic ester and hydroxyl group-containing vinyl ether (manufacturing method E), a method of esterifying (meth)acrylate and halogen-containing vinyl ether (manufacturing method F), a method of esterifying (meth)acrylate alkali (earth) metal salt and halogen-containing vinyl ether (manufacturing method G), a method of transvinylation of hydroxyl group-containing (meth)acrylic ester and vinyl carboxylic acid (manufacturing method H), a method of transetherification of hydroxyl group-containing (meth)acrylic ester and alkyl vinyl ether (manufacturing method I) are used. Among them, the manufacturing method E is preferable since it is possible to excellently exhibit desirable effects of the embodiment.

Among the radical polymerization compound described above, since the ink of the embodiment is further excellent to realize low viscosity, hardenability, and solubility of the radical photopolymerization initiator, it is preferable to contain at least any of monofunctional (meth)acrylate and bifunctional or more (meth)acrylate, and it is more preferable to contain both thereof. In this case, low viscosity of ink is obtained, excellent solubility of the radical photopolymerization initiator and the other additive is obtained, excellent discharging stability at the time of ink jet recording is easily obtained, and further high toughness, heat resistance, and chemical resistance of the coating film are increased.

The radical polymerization compound described above may be used along, or may be used in combination of two or more types.

Content of the radical polymerization compound described above is preferable to be equal to or less than 95% by mass, with respect to the total mass (100% by mass) of the ink. Particularly, the total content of monofunctional (meth)acrylate is preferable to be 30% by mass to 90% by mass and more preferable to be 40% by mass to 80% by mass, with respect to the total mass (100% by mass) of the ink. Herein, in a case of containing monofunctional (meth)acrylate which is vinyl ether group-containing (meth)acrylate ester described above, the total content described above means content including vinyl ether group-containing (meth)acrylate ester described above.

In addition, among the monofunctional (meth)acrylate, in a case of containing monofunctional (meth)acrylate other than vinyl ether group-containing (meth)acrylate ester described above, the content thereof is preferable to be 20% by mass to 80% by mass, and more preferable to be 30% by mass to 70% by mass, with respect to the total content (100% by mass) of the ink.

Further, in a case of vinyl ether group-containing (meth)acrylate ester described above contained in the ink as monofunctional (meth)acrylate, the content of vinyl ether group-containing (meth)acrylate ester described above is preferable to be 10% by mass to 70% by mass, and more preferable to be 10% by mass to 50% by mass, with respect to the total content (100% by mass) of the ink.

By setting the content in the range described above, it is possible to realize further excellent hardenability of the ink, hardenability due to solubility of the radical photopolymerization initiator, viscosity reduction, and preservation stability. In particular, by containing monofunctional (meth)acrylate including an aromatic skeleton in the ink among monofunctional (meth)acrylate, further excellent hardenability, viscosity reduction, and solubility of the radical photopolymerization initiator are obtained. In addition, in a case of containing bifunctional or more (meth)acrylate, the content thereof is preferable to be 5% by mass to 60% by mass, more preferable to be 10% by mass to 50% by mass, and further preferable to be 10% by mass to 40% by mass, with respect to the total content (100% by mass) of the ink, since it is possible to obtain further excellent hardenability, abrasion resistance, and adhesiveness.

Radical Photopolymerization Initiator

The ink of the embodiment contains the radical photopolymerization initiator. The radical photopolymerization initiator is used for performing printing by curing the ink existing on a surface of a recording medium with radical polymerization by the irradiation with ultraviolet light. By using ultraviolet light (UV), it is possible to obtained excellent safety and to suppress cost of a light source lamp. By the energy of the light (ultraviolet light), radical active species are generated and polymerization of the radical polymerization compound is initiated.

As the radical photopolymerization initiator, aromatic ketones, acyl phosphine oxide compounds, aromatic onium salt compounds, organic peroxides, thio compounds (such as thioxanthone compounds, thiophenyl group-containing compounds), α-aminoalkylphenone compounds, hexaarylbiimidazole compounds, ketoxime ester compounds, borate compounds, azinium compounds, metallocene compounds, active ester compounds, compounds having carbon-halogen bond, and alkylamine compounds are used, for example.

Among them, since it is possible to realize further excellent hardenability of the ink, acyl phosphine oxide compounds are preferable.

As detailed examples of the radical photopolymerization initiator, acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methylacetoacetate phenone, 4-chloro benzophenone, 4,4'-dimethoxy-benzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methyl-propan-1-one, 2-hydroxy-2-methyl-1-phenyl propan-1-one, thioxanthone, diethyl thioxanthone, 2-isopropylthio xanthone, 2-chlorothioxanthone, 2-methyl-1-[4-

(methylthio) phenyl]-2-morpholino-propan-1-one, bis (2,4,6-trimethyl benzoyl)-phenyl phosphine oxide, 2,4,6-trimethyl benzoyl-diphenyl-phosphine oxide, 2,4-diethyl thioxanthone, and bis-(2,6-dimethoxybenzoyl)-2,4,4-trimethylpentyl phosphine oxide are used.

As commercially available products of the radical photopolymerization initiator, IRGACURE 651 (2,2-dimethoxy-1,2-diphenyl ethane-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl] phenyl}-2-methyl-propane-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl) methyl]-1-[4-(4-morpholinyl) phenyl]-1-butanone), DAROCUR TPO (2,4,6-trimethylbenzoyl-diphenyl-phosphine oxide), IRGACURE 819 (bis (2,4,6-trimethyl benzoyl)-phenyl phosphine oxide), IRGACURE 784 (bis (η5-2,4-cyclopentadien-1-yl)-bis (2,6-difluoro-3-(1H-pyrrol-1-yl)-phenyl) titanium), IRGACURE OXE 01 (1,2-octane dione, 1-[4-(phenylthio)-, 2-(O-benzoyloxime)]), IRGACURE OXE 02 (ethanone, 1-[9-ethyl-6-(2-methyl-benzoyl)-9H-carbazol-3-yl]-, 1-(O-acetyl oxime)), IRGACURE 754 (mixture of oxyphenyl acetic acid, 2-[2-oxo-2-phenylacetoxy ethoxy] ethyl ester and oxyphenyl acetic acid, and 2-(2-hydroxyethoxy) ethyl ester) (all manufactured by BASF), Speedcure TPO, Speedcure DETX (2,4-diethyl thioxanthone), Speedcure ITX (2-isopropylthioxanthone) (all manufactured by Lambson), KAYACURE DETX-S (2,4-diethyl thioxanthone) (manufactured by Nippon Kayaku Co., Ltd.), Lucirin TPO, LR8893, LR8970 (all manufactured by BASF), and UBECRYL P36 (manufactured by UCB) are used, for example.

The radical photopolymerization initiator may be used along or may be used in combination of two or more kinds.

The content of the radical photopolymerization initiator is preferable to be 5% by mass to 15% by mass and more preferable to be 7% by mass to 13% by mass, with respect to the total content (100% by mass) of the ink. If the content thereof is in the range described above, it is possible to sufficiently exhibit the ultraviolet curing speed, and to avoid residue of dissolved radical photopolymerization initiator or coloring due to the initiator. It is preferable to contain acyl phosphine oxide compounds among the radical photopolymerization initiator. The content of acyl phosphine oxide compounds described above is preferable to be 5% by mass to 15% by mass and more preferable to be 7% by mass to 13% by mass, with respect to the total content (100% by mass) of the ink.

Color Material

The ink of the embodiment may further contain color materials.

As described above, in at least the first ultraviolet curable ink among the ink of the embodiment, transmittance at a wavelength of 395 nm is equal to or less than 1%. As the ink in which transmittance at a wavelength of 395 nm is equal to or less than 1%, ink containing one or more selected from a group consisting of a yellow color material, a black color material, an orange color material, and a green color material, is used. Since these color materials easily absorb light (ultraviolet light) having a wavelength of 395 nm, a problem in that most of ultraviolet emitted from an LED including a peak wavelength at around 395 nm is not contributed to photopolymerization reaction. Here, in the embodiment, by setting the irradiation peak intensity to be great to be equal to or more than 800 mW/cm$^2$, even when using the ink containing the color materials which easily absorb light (ultraviolet light) having a wavelength of 395 nm, the emitted ultraviolet light can be sufficiently contributed to photopolymerization reaction.

On the other hand, among the ink of the embodiment, as ink in which transmittance at a wavelength of 395 nm exceeds 1%, ink containing at least any of a cyan color material, a magenta color material, and a white color material, or clear ink not containing color materials are used. In a case of irradiating the ink containing the color materials with ultraviolet light from the LED, by setting the irradiation peak intensity to be relatively low to be less than 800 mW/cm$^2$, it is possible to extremely suppress generation of difference in shiny appearance with the ink in which transmittance at a wavelength of 395 nm is equal to or less than 1%, and to effectively prevent uneven brightness. In addition, since the transmittance at a wavelength of 395 nm is slightly different depending to kinds of colors shown by the color materials and kinds of the color materials, and is different depending on the content of the color materials in the ink, the transmittance is obtained by measuring for each ink. Among them, since the transmittance is satisfied and the recording of a color image can be performed, as the first ultraviolet curable ink, the ink containing one or more selected from a group consisting of a yellow color material, a black color material, an orange color material, and a green color material is preferable. In addition, since the transmittance is satisfied, the recording of a color image can be performed, and an excellent appearance of a recorded material is obtained, the ink containing one or more selected from a group consisting of a cyan color material, a magenta color material, and a white color material, or the clear ink is more preferable.

As the color material, at least one of a pigment and a dye can be used. Among, since excellent light resistance is obtained, the pigment is preferable.

Pigment

By using the pigment as the color material, it is possible to obtain excellent light resistance of the ink. Both an inorganic pigment and an organic pigment can be used for the pigment.

As the inorganic pigment, carbon blacks (C.I. Pigment Black 7) such as furnace black, lamp black, acetylene black, and channel black, iron oxide, titanium oxide can be used.

As the organic pigment, azo pigments such as insoluble azo pigments, condensed azo pigments, azo lake, and chelate azo, polycylic pigments such as phthalocyanine pigments, perylene and perinone pigments, anthraquinone pigments, quinacridone pigments, dioxane pigments, thioindigo pigments, isoindolinone pigments, and quinophthalone pigments, dye chelate (for example, basic dye chelate, acidic dye chelate, or the like), dye lake (basic dye lake, acidic dye lake, or the like), nitro pigments, nitroso pigments, aniline black, and daylight fluorescent pigments are used.

In more detail, as carbon black used for the black ink, No. 2300, No. 900, MCF88, No. 33, No. 40, No. 45, No. 52, MA7, MA8, MA100, No. 2200B and the like (all manufactured by Mitsubishi Chemical Corporation), Raven 5750, Raven 5250, Raven 5000, Raven 3500, Raven 1255, Raven 700 and the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (all manufactured by Degussa), and Microlith Black 0066 K (former Microlith Black C-K, manufactured by BASF) are used.

As the pigment used for the white ink, C.I. Pigment White 6, 18, and 21 are used.

As the pigment used for the yellow ink, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180 are used.

As the pigment used for the magenta ink, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violet 19, 23, 32, 33, 36, 38, 43, and 50 are used.

As the pigment used for the cyan ink, C.I. Pigment Blue 1, 2, 3, 15, 15:1, 15:2, 15:3, 15:34, 15:4, 16, 18, 22, 25, 60, 65, and 66, and C.I. Vat Blue 4 and 60 are used.

In addition, as the pigment other than magenta, cyan, and yellow, C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63 are used.

The pigment may be used alone, or may be used in combination of two or more kinds.

In a case of using the pigment described above, an average particle size thereof is preferable to be equal to or less than 300 nm and more preferable to be 50 nm to 200 nm. If the average particle size thereof is in the range described above, it is possible to obtain further excellent reliability such as discharging stability or dispersion stability of the ink, and to form an image with excellent image quality. Herein, the average particle size of the embodiment is measured with a dynamic light scattering method.

Dye

A dye can be used as the color material. As the dye, it is not particularly limited, and an acidic dye, a direct dye, a reactive dye, and a basic dye can be used. As the dye, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow, 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, C.I. Reactive Black 3, 4, and 35 are used, for example.

The dye described above may be used alone, or may be used in combination of two or more kinds.

Since excellent shielding property and color reproducibility are obtained, the content of the color material is preferable to be 0.2% by mass to 10% by mass and more preferable to be 0.5% by mass to 8% by mass, with respect to the total content (100% by mass) of the ink.

Dispersant

When the ink contains the pigment, the ink may further contain a dispersant for obtaining further excellent pigment dispersibility. As the dispersant, it is not particularly limited, and a dispersant which is commonly used for preparing a pigment dispersion liquid such as a polymer dispersant, is used. As detailed examples, a dispersant including one or more of polyoxyalkylene polyalkylene polyamine, vinyl polymer and copolymer, acrylic polymer and copolymer, polyester, polyamide, polyimide, polyurethane, amino-based polymer, silicon-containing polymer, sulfur-containing polymer, fluorine-containing polymer, and epoxy resin, as main components, are used. As commercially available products of the polymer dispersant, Ajisper Series manufactured by Ajinomoto Fine-Techno Co., Inc., Solsperse Series (such as Solsperse 36000) which can be purchased from Avecia or Noveon, DISPERBYK Series manufactured by BYK Chemie, and DISPARLON Series manufactured by Kusumoto Chemicals, Ltd. are used.

Slip Agent

The ink of the embodiment may further contain a slip agent (surfactant). As the slip agent, it is not particularly limited, and as silicone based surfactant, polyester-modified silicone or polyether-modified silicone can be used, for example, and it is particularly preferable to use polyester-modified polydimethylsiloxane or a polyether modified polydimethylsiloxane. As detailed example, BYK-347, BYK-348, BYK-UV3500, 3510, 3530, and 3570 (all manufactured by BYK) can be used.

The slip agent may be used alone and may be used in combination of two or more kinds. In addition, the content of the slip agent is not limited, and a preferable amount may be suitably added.

Other Additives

The ink may further contain additives (components) other than the additives described above. As such component, it is not particularly limited, and a polymerization accelerator, a polymerization inhibitor, a permeation accelerator, and a wetting agent (moisturizing agent) which are well known in the related art may be used, for example. As the other additives, a fixing agent, an antifungal agent, a preservative, an antioxidant, an ultraviolet absorbing agent, a chelate, pH adjuster, and a thickener which are well known in the related art may be used, for example.

Hereinafter, an embodiment of a second invention will be described in detail. The invention is not limited to the following embodiment, and various modifications can be performed in a range not departing from the gist of the invention. In addition, in each drawing used in the following description, scale of each constituent element (member) is appropriately changed for a size of each constituent element to be visually recognized on the drawings. The embodiments are not only limited to a ratio of quantity, a shape and a size of the constituent elements and a relative positional relationship of each constituent element described in the drawings.

In the present specification, a "hardenability" refers to a property for curing by photoresponse. "Cured wrinkles" mean wrinkles which are generated on a surface of a coating film after curing, as described above. "Abrasion resistance" refers to a property in which it is difficult for a cured material to be peeled off and to be scratched when the cured material is rubbed. "Discharging stability" refers to a property which is to be able to discharge ink droplets which are always stable without clogging of a nozzle, from a nozzle. "Bleed" means bleeding and "bleed resistance" refers to a property in which bleeding hardly occurs on the edge of an image. "Preservation stability" refers to a property wherein the viscosity before and after storage is hardly changed when an ink is stored.

In this specification, "(meth)acrylate" means at least any of acrylate and methacrylate corresponding thereto, "(meth)acryl" means at least any of acryl and methacryl corresponding thereto, and "(meth)acryloyl" means at least any of acryloyl and methacryloyl corresponding thereto.

Ink Jet Recording Apparatus

A first embodiment of the invention relates to an ink jet recording apparatus, that is, a printer. The recording apparatus is used with an ink jet recording method which will be described later. FIG. 2 is a schematic view of a recording area circumference in one aspect of a line printer.

As types of the printer in the embodiment, a line printer and a serial printer are used, and these printers are used with different printer system. To described briefly, a line printer includes a line head having a length equal to or greater than a length corresponding to a width of a recording medium, and preferably having a length (width of recording medium) corresponding to a width of a recording medium, and the head is (substantially) not moved, and is fixed, and the recording is performed with one pass (single pass). On the other hand, a serial printer normally performs recording by two or more passes (multi passes) while reciprocating (shuttle movement) of a head in a direction orthogonal to a transportation direction of a recording medium. In the embodiment, any system printers can be used.

Among them, as will be described later, a line printer (line ink jet recording apparatus) is a printer which forms an image only by single scanning of a recording medium in a predetermined direction (hereinafter, referred to as "transportation direction"). Accordingly, a line printer is preferable from a viewpoint of a significantly high printing rate, compared to a serial printer, however, problems in that an ink discharge amount per one pass is large and cured wrinkles are easily generated, occur. Here, significant effects of the embodiment capable of preventing generation of cured wrinkles are particularly exhibited with respect to a line printer. Hereinafter, a line printer will be described with reference to FIG. 1 and FIG. 2.

A printer 1 is a recording apparatus which forms an image on a recording medium, and is communicatively connected to a computer 110 which is an external apparatus.

A printer driver is installed in the computer 110. The printer driver is a program for displaying a user interface to a display device (not shown) to convert image data output from an application program into recording data (image forming data). The printer driver is recorded in a "computer-readable recording medium" such as a flexible disk (FD) or a CD-ROM. Alternatively, the printer driver can be downloaded to the computer 110 through Internet. In addition, the program is configured from a code for realizing various functions.

In order to form an image by the printer 1, the computer 110 outputs recording data corresponding to the image to the printer 1.

Here, the "recording apparatus" of the present specification means an apparatus which forms an image on a recording medium, and for example, corresponds to the printer 1. In addition, a "recording controlling apparatus" means an apparatus which controls a recording apparatus, and for example, corresponds to the computer 110 in which the printer driver is installed.

The printer 1 of the embodiment is an apparatus which forms an image on a recording medium by discharging predetermined ultraviolet curable ink which is cured by irradiation with ultraviolet light. The predetermined ultraviolet curable ink contains at least vinyl ether group-containing (meth)acrylate esters and is cured by polymerization reaction due to irradiation with ultraviolet light.

A detailed ink composition of the ultraviolet curable ink will be described later.

The printer 1 of the embodiment includes a transportation unit 20, a head unit 30, an irradiation unit 40, a detector group 50, and a controller 60. The printer 1 which received printing data from the computer 110 which is an external apparatus controls each unit, that is, the transportation unit 20, the head unit 30, and the irradiation unit 40, by the controller 60, and forms an image on a recording medium S according to printing data. The controller 60 controls each unit and forms an image on the recording medium S, based on printing data received from the computer 110. The state in the printer 1 is monitored by the detector group 50, and the detector group 50 outputs a detection result to the controller 60. The controller 60 controls each unit, based on the detection result output from the detector group 50.

The transportation unit 20 is a unit which transports the recording medium S in a transportation direction. As shown in FIG. 2, the transportation unit 20 includes an upstream transportation roller 23A, a downstream transportation roller 23B, and a belt 24, for example. When rotating the transportation roller (not shown), the upstream transportation roller 23A and the downstream transportation roller 23B are rotated, and the belt 24 is rotated. The recording medium S which is fed by a paper feeding roller (not shown) is transported to a recordable area (area opposing to the head), by the belt 24. By transporting the recording medium S by the belt 24, the recording medium S is moved with respect to the head unit 30 in the transportation direction. The recording medium S which passes the recordable area is discharged to outside by the belt 24.

In addition, the recording medium S which is being transported is electrostatic-adsorbed or vacuum-adsorbed to the belt 24. Herein, a phrase of "paper feeding" is used for convenience sake, however, as the recording medium of the embodiment, recording media which will be described later can be used.

The head unit 30 is for discharging the ultraviolet curable ink to the recording medium S. By discharging each ink with respect to the recording medium S which is being transported, the head unit 30 forms dots on the recording medium S and forms an image. The printer 1 of the embodiment is a line printer, and each head of the head unit 30 can form dots corresponding to the width of the recording medium at one time. In detail, as shown in FIG. 2 which is a schematic view of the recording area periphery of an aspect of the line printer in FIG. 1, in a case where each head of a white ink head W, a black ink head K, a cyan ink head C, a magenta ink head M, and a yellow ink head Y is provided in order from upstream of the transportation direction, a plurality of heads are disposed so that each head can discharge dots corresponding to the width of the recording medium S in a front direction from the back of a paper surface. As described above, by controlling each head from the upstream and forming dots in a necessary location in one line corresponding to the width of the recording medium S, it is possible to form an image with only single scanning of the recording medium S in a transportation direction.

In addition, the white ink head W is a discharge unit of ultraviolet curable white ink. The black ink head K is a discharge unit of ultraviolet curable black ink. The cyan ink head C is a discharge unit of ultraviolet curable cyan ink. The magenta ink head M is a discharge unit of ultraviolet curable magenta ink. The yellow ink head Y is a discharge unit of ultraviolet curable yellow ink.

The irradiation unit 40 irradiates the dots of ultraviolet curable ink which is landed on the recording medium S with ultraviolet light. The dots formed on the recording medium S are cured by receiving emission of the ultraviolet light from the irradiation unit 40. As shown in FIG. 2, the irradiation unit 40 of the embodiment may include first irradiation units 42a to 42e and a second irradiation unit 44.

The first irradiation unit 42a to 42e are for irradiating with ultraviolet light for preliminarily curing the dots formed on the recording medium, and are positioned before the second irradiation unit 44 which performs curing, that is, upstream of the transportation direction. The "preliminary curing" herein is also called pinning, means temporary tacking, and in more detail, means curing for preventing bleeding between dots and controlling dot size. Accordingly, at least only a part of dots (liquid droplets), for example, a dot surface may be cured.

Hereinafter, for differentiating with the preliminary curing, curing which is finally performed, that is, curing by emitting ultraviolet light from an ultraviolet light emitting diode (UV-LED) having irradiation peak intensity of equal to or more than 800 mW/cm$^2$, is referred to as "proper curing".

The first irradiation units 42a to 42e are provided on downstream of the transportation directions of the white ink head W, the black ink head K, the cyan ink head C, the magenta ink head M, and the yellow ink head Y, respectively. That is, the first irradiation units are provided for each ink color.

The first irradiation units 42a to 42e include ultraviolet light emitting diodes (UV-LEDs) as light sources of ultraviolet irradiation. By controlling an amount of input current by the UV-LEDs, it is possible to easily change an irradiation energy. The UV-LED is a type including a condensing lens (hereinafter, also referred to as a "lens-attached LED"), and by irradiating by condensing light to a limited irradiation area from the lens-attached LED, it is possible to maintain an irradiation energy and to perform spot irradiation with greater irradiation peak intensity.

Hereinafter, the lens-attached LED will be described. FIG. 3 is a cross-sectional view schematically showing a part of an example of the lens-attached UV-LED, from the first irradiation unit.

An UV-LED 72 is mainly configured by an UV-LED chip 72a and a condensing lens 72b which emits ultraviolet light, and ultraviolet light which is issued by the UV-LED chip 72a is condensed by the condensing lens 72b to form a given irradiation angle and emitted to a lower portion of the first irradiation unit. The condensing lens 72b is a package which covers the UV-LED chip 72a, is formed of a lens formed on the surface thereof in a hemispherical shape and a cover protecting the surface thereof, and condenses ultraviolet light issued from the UV-LED chip 72a towards a center line of a hemisphere. A material of the lens or the cover is not limited as follows, however, for example, transparent resin such as glass, silicon resin, silicon rubber, and the like can be used. The structure of the lens is not limited to the above described structure as long as the light condensing can be performed, and for example, may be a structure an attached lens which is separately formed in a hemispherical shape, other than a lens which is formed in a hemispherical shape integrally with the package. The UV-LED chip 72a included in the irradiation unit 40 controls a supply current value by an UV-LED driving circuit (not shown) controlled by the controller 60, can rapidly switch an on state and an off state, and can emit ultraviolet light having irradiation intensity necessary for curing the uncured ultraviolet curable ink which is landed on the recording medium S. In addition, UV-LEDs are arranged in a line in the width direction and the transportation direction of the recording medium S, and configure each first irradiation unit. The positioning of the UV-LEDs arranged in a line in the transportation direction of the recording medium S in directions of the UV-LEDs arranged in a line in the width direction of the recording medium S, in a viewpoint of even distribution of irradiation areas where the light condensed from the UV-LEDs in the width direction of the recording mediums.

In addition, the other configurations regarding the UV-LED units may be referred to FIG. 4 disclosed in JP-A-2010-23285, and description thereof, for example. Further, the irradiation energy, a light emitting peak wavelength, and irradiation beam intensity for preliminary curing by the first irradiation units 42a to 42e will be described later.

The second irradiation unit 44 irradiates the dots formed on the recording medium S with ultraviolet light to perform (substantially) complete curing, that is, proper curing. The second irradiation unit 44 is provided on downstream with respect to the yellow ink head Y in the transportation direction. In addition, a length of the second irradiation unit 44 in the width direction of the recording medium S is greater than a width of the recording medium S. The second irradiation unit 44 irradiates dots formed by each head of the head unit 30 with ultraviolet light.

The second irradiation unit 44 of the embodiment includes an UV-LED as a light source of ultraviolet irradiation. Since the UV-LED has been described in the description of the first irradiation units 42a to 42e, the description thereof will be omitted herein. Herein, as the light source, a metal halide lamp, a xenon lamp, a carbon-arc lamp, a chemical lamp, a low-pressure mercury lamp, and a high-pressure mercury lamp can be used. The irradiation by the lamp is performed to an inner portion since a light emitting wavelength of a short wavelength is included, and thus, the cured wrinkles are hardly generated, however, on the other hand, problems occur in various points such as heat generation, size (including cooling device), power consumption, and life time of the light source, and cost of the irradiator. In addition, compared to the lamps described above, the UV-LED is small in size, has a long life time, less heat generation, and high efficiency, and is also excellent in a viewpoint of suppressing cost.

In addition, an irradiation energy, a light emitting peak wavelength, and irradiation peak intensity for proper curing by the second irradiation unit 44 will be described later.

A rotary encoder (not shown), a paper detecting sensor (not shown), and the like are included in the detector group 50. The rotary encoder detects rotation of the upstream transportation roller 23A or the downstream transportation roller 23B. It is possible to detect a transportation amount of the recording medium S based on the detection results of the rotary encoder. The paper detecting sensor detects a position of an end of the recording medium S which is being fed.

The controller 60 is a control unit which controls the printer. The controller 60 includes an interface unit 61, a CPU 62, a memory 63, and a unit control circuit 64. The interface unit 61 performs transmission and reception of data between the computer 110 which is an external apparatus and the printer 1. The CPU 62 is an arithmetic processing unit which controls the entire printer. The memory 63 is a memory for securing an area for storing programs of the CPU 62 or operation areas, and includes memory elements such as RAM, EEPROM, and the like. The CPU 62 controls each unit through the unit control circuit 64, according to programs stored in the memory 63.

Modification Example of Ink Jet Recording Apparatus

The printer 1 of FIG. 1 described above is only an example of the ink jet recording apparatus according to the embodiment, and there are a lot of variations.

First, the first irradiation units 42*a* to 42*e* and the second irradiation unit 44 in FIG. 2 may be any of units for preliminary curing and for proper curing. In a case of discharging the white ink from the white ink head W which positions on the upstream of FIG. 2 in the transportation direction for applying an excellent shielding property to an image to form a solid patterned image, the first irradiation unit 42*a* is preferable to be an irradiation unit for proper curing.

In addition, the proper curing by the ultraviolet irradiation with the irradiation peak intensity of equal to or more than 800 mW/cm$^2$ may be performed one time, or may be performed two or more times. Among them, in a case of performing the proper curing two or more times, two or more the second irradiation units 44 may be provided.

In addition, the order of the ink heads of each color shown in FIG. 2 may be changed in any order, and only one ink head may be included or one or more ink heads which are not operated may be included. Further, the other ink heads (the colors may be the same as the existing ink heads or may be different) may be included in addition to the ink heads of each color shown in FIG. 2, or any of the ink heads may be changed to the ink heads of other colors.

Hereinafter, concretization of various variations of the embodiment will be described as Modification Examples, however, the embodiment is not particularly limited to Modification Examples.

A recording apparatus according to First Modification Example is the printer 1 which may not include the second irradiation unit 44 or may include the second irradiation unit 44 which is not operated. According to First Modification Example, one or more irradiation units from the first irradiation units 42*a* to 42*e* perform proper curing instead of the second irradiation unit 44, and the preliminary curing described above is not performed, in some cases (in a case where all of the first irradiation units 42*a* to 42*e* perform proper curing).

A recording apparatus according to Second Modification Example is the printer 1 which may not include one or more irradiation units from the first irradiation units 42*a* to 42*e* or may include the irradiation units which are not operated. According to Second Modification Example, the preliminary curing described above is not performed, in some cases (in a case where all of the first irradiation units 42*a* to 42*e* are not included, or where the irradiation units are included but are not operated).

A recording apparatus according to Third Modification Example is the printer 1 including one or more head and first irradiation units provided on downstream thereof in the transportation direction, from the white ink head W, the black ink head K, the cyan ink head C, the magenta ink head M, and the yellow ink head Y, and the first irradiation units 42*a* to 42*e* positioned downstream of each head in the transportation direction. FIG. 4 shows an aspect of the Third Modification Example, and is a schematic view of the vicinity of the recording areas of the other aspect of the line printer of FIG. 1. The line printer shown in FIG. 1 includes the black ink head K, the first irradiation unit 42*b*, and the second irradiation unit 44, from the upstream in the transportation direction.

In addition, the printer 1 of Third Modification Example may not include the second irradiation unit 44 or may include the second irradiation unit 44 which is not operated in the same manner as First Modification Example described above, or may not include the first irradiation units 42*a* to 42*e* or may include the irradiation units which are not operated in the same manner as Second Modification Example described above.

A recording apparatus according to Fourth Modification Example is a recording apparatus including the white ink head W, an irradiation unit for preliminary curing of white ink, the cyan ink head C, an irradiation unit for preliminary curing of cyan ink, the magenta ink head M, an irradiation unit for preliminary curing of magenta ink, the black ink head K, an irradiation unit for preliminary curing of black ink, the yellow ink head Y, a first irradiation unit for proper curing, an clear ink head CL, and a second irradiation unit for proper curing, from the upstream in transportation direction. According to the recording apparatus according to Fourth Modification Example, it is possible to realize an excellent shielding property by setting the white ink as a base, and quality improvement of an image by overcoating the clear ink (transparent ink). In addition, before and after discharging the clear ink from the clear ink head CL, by emitting ultraviolet light from each irradiation unit for proper curing, it is possible to perform proper curing of the color ink before discharging the clear ink.

The recording apparatus according to Fourth Modification Example may not include at least any of the white ink head W, the irradiation unit for preliminary curing of white ink, and the clear ink head CL, or may include one irradiation unit for proper curing (is preferable to include the second irradiation unit for proper curing).

A recording apparatus according to Fifth Modification Example includes an UV-LED not including a condensing lens (hereinafter, also referred to as an "LED with no lens") as an UV-LED which is an irradiation source of ultraviolet light, instead of the lens-attached LED. The LED with no lens has the same configuration as in the case of the lens-attached LED, except for a point of not including the condensing lens 72*b* of FIG. 3. An example of the LED with no lens is formed on a flat surface, other than on the surface of the package covering the UV-LED chip 72*a* of FIG. 3 in a hemispherical shape, and a cover protecting the surface thereof is also formed on a flat surface.

A recording apparatus according to Sixth Modification Example is a recording apparatus which performs pulse irradiation with ultraviolet light by setting input current to LEDs of at least any of the first irradiation units 42*a* to 42*e* and the second irradiation unit 44 as pulse current by repeatedly switching the on state and the off state by the UV-LED driving circuit (not shown) (herein, the LED is also referred to as "pulse irradiation LED"). As a driving circuit of the pulse irradiation LED, an MOFSET circuit or the like which performs PWM control can be used. FIG. 5A is a waveform chart of current which flows to the UV-LED in a printer of the embodiment, in a case of not performing pulse irradiation with ultraviolet light. FIG. 5B is a waveform chart of pulse current which flows to the UV-LED in a printer of the embodiment, in a case of performing pulse irradiation with ultraviolet light. In a case of the pulse current, the input current is peak input current which is pulse peak current. The total electric energy input to the UV-LED is calculated with the following expression.

$$\text{Total electric energy} = \text{input current} \times T1 \times \text{Duty ratio}$$

In the expression, irradiation time for the recording medium (T1) means time from start of irradiation of the recording medium to the end of the irradiation. Duty ratio is a value expressed in the following expression when performing 1 periodic driving of pulse.

Duty ratio=duration when current is turned on/(duration when current is turned on+duration when current is turned off)

A Duty ratio of the LED which does not perform the pulse irradiation is 1. A Duty ratio in a case of performing the pulse irradiation may be 0.5, for example, and a pulse frequency may be set as 1 kHz, for example. Heat generation of the UV-LED generally becomes greater as the total electric energy becomes greater.

The irradiation peak intensity of the UV-LED generally becomes greater as the input current becomes greater. By performing the pulse irradiation as shown in FIG. 5B, in a case of fixing time T1 from the start of the irradiation to the end of the irradiation, it is possible to have greater irradiation peak intensity while maintaining the total input current. As described above, since the pulse irradiation LED efficiently increase the irradiation peak intensity, it is particularly suitable to be used for the second irradiation unit 44 in which greater irradiation peak intensity is necessary. The pulse irradiation LED may also be used in the first irradiation units 42a to 42e, and in a case of performing the proper curing other than the preliminary curing, it is preferable to use the pulse irradiation LED also for the first irradiation units.

For example, FIG. 1, FIG. 2, and the description thereof disclosed in JP-A-2006-231795, and description disclosed in JP-T-2011-523370 may be referred for the pulse irradiation LED described above. The irradiation energy of the pulse irradiation LED can be calculated using the following expression.

Irradiation energy=irradiation peak intensity×$T1$×Duty ratio

Accordingly, when T1 is fixed, it is possible to increase the peak intensity while maintaining the same irradiation energy of the LED or it is possible to decrease the irradiation energy of the LED while maintaining the same peak intensity, in a case of performing the pulse irradiation, compared to the case of not performing the pulse irradiation.

In addition, the irradiation, particularly the irradiation for proper curing other than the preliminary curing from UV-LED is preferable to be at least any of the pulse irradiation and the spot irradiation. In this case, as described above, it is possible to further increase the irradiation peak intensity while maintaining the irradiation energy.

Ink Jet Recording Method

One embodiment of the invention relates to an ink jet recording method. The ink jet recording method can be performed using the ink jet recording apparatus of the embodiment described above. In addition, the ink jet recording method includes a discharging step of discharging ultraviolet curable ink containing vinyl ether group-containing (meth)acrylate esters expressed by the following General Formula (I) (hereinafter, also simply referred to as "vinyl ether group-containing (meth)acrylate esters"), onto a recording medium, and a curing step of curing the ultraviolet curable ink which is landed on the recording medium by irradiating the ink with ultraviolet light from an ultraviolet light emitting diode (UV-LED) in which peak intensity of the emitted ultraviolet light is equal to or more than 800 mW/cm$^2$.

Discharging Step

In the discharging step, viscosity of the ink at the time of being discharged is preferable to be equal to or less than 25 mPa·s, and more preferable to be 5 mPa·s to 20 mPa·s. If the viscosity of the ink is as described above when a temperature of the ink is a room temperature or in a state of not heating the ink, the ink may be discharged with a temperature of the ink as a room temperature or without heating the ink. Meanwhile, by heating the ink to a predetermined temperature, the ink may be discharged by setting the viscosity to a preferable value. Accordingly, excellent discharging stability is realized.

Since ultraviolet curable ink has high viscosity than water-based ink used for ink for normal ink jet, viscosity fluctuation due to temperature fluctuation at the time of discharging is large. Such viscosity fluctuation of the ink largely affects change of liquid droplet size and change of liquid droplet discharging speed, and further, image quality degradation may occur. Accordingly, it is preferable to maintain a constant temperature of the ink at the time of discharging as much as possible.

Curing Step

Next, in the curing step, the ink which is discharged onto and landed on the recording medium is cured by irradiation with ultraviolet light (light) from the second irradiation unit 44, or in a case of performing proper curing other than the preliminary curing, from the first irradiation units 42a to 42e. In other words, an ink coating film formed on the recording medium becomes a cured film by the irradiation with ultraviolet light. This is because that the photopolymerization initiator included in the ink is decomposed by the irradiation with ultraviolet light to generate initiating species such as radical, acid, and base, and polymerization reaction of the photopolymerization compound is promoted by functions of the initiating species. Alternatively, it is because that the photopolymerization reaction of the polymerization compound starts by the irradiation with ultraviolet light. At that time, if there is a sensitizing dye with the photopolymerization initiator in the ink, the sensitizing dye in a system absorbs active ultraviolet light to be in an excitation state, and promotes the decomposition of the photopolymerization initiator by being in contact with the photopolymerization initiator, and it is possible to realize curing reaction with higher sensitivity.

The predominance for using the UV-LED as the light source (ultraviolet light source) is as described above.

The light emitting peak wavelength at the time of the irradiation is preferable to be in a range of 360 nm to 420 nm, and more preferable to be in a range of 380 nm to 410 nm. It is suitable that the light emitting peak wavelength be in the range described above, from viewpoints of easy purchase and low cost of the UV-LED.

In addition, the light emitting wavelength may be one or more in the preferable wavelength range. Even in a case of the plurality of light emitting peak wavelength, the entire irradiation energy amount of ultraviolet light having the light emitting peak wavelength is set as the irradiation energy described above.

The peak intensity (irradiation peak intensity) of the emitted ultraviolet light is equal to or more than 800 mW/cm$^2$, and preferably equal to or more than 1000 mW/cm$^2$. If the irradiation peak intensity is in the range described above, hardenability is excellent, and it is possible to effectively prevent generation of cured wrinkles. In more detail, as a result of delay of the curing of the inner portion of the ink coating film compared to the curing of the surface thereof, the surface of the ink coating film is first cured, and it is possible to effectively prevent generation of cured wrinkles.

The irradiation peak intensity will be further described. The LEDs have narrow range of the light emitting wavelength from the characteristics thereof, and among them, as described above, the long-wavelength LED having the light emitting peak wavelength in a range of 360 nm to 420 nm is obtained with low cost, however includes only a range of the light emitting wavelength limited by the long-wavelength. Accordingly, it is difficult for the emitted ultraviolet light to reach the inner portion of the ink droplet which is landed on the recording medium, and only the surface of the ink coating film is first cured. Thus, the cured wrinkles tend to be easily generated. Here, the inventors of the present application have found that it is possible to reduce the cured wrinkles even in a case of using the long-wavelength LED, by setting the irradiation peak intensity to be equal to or more than 800 mW/cm$^2$. Meanwhile, the ultraviolet curable ink containing vinyl ether group-containing (meth)acrylate esters expressed by the following General Formula (I) as the polymerization compound has a high curing speed, and particularly it is possible to obtain a high curing speed, even with the ultraviolet irradiation from the light source including the limited light emitting peak wavelength as the LED. However, in a case of using the ink, the problem in that the cured wrinkles are easily generated occurs. The inventors of the present application also found that a high-quality recorded material with excellent hardenability and no cured wrinkles can be obtained by setting the irradiation peak intensity to be equal to or more than 800 mW/cm$^2$, even in a case of using such ink. In a case of using such ink, and when the irradiation peak intensity is small, the reason of easy generation of the cured wrinkles is expected as slow complete effects in the inner portion of the coating film even with the high curing speed with the coating film surface with such ink. However, the reason is not limited thereto.

Herein, the ultraviolet irradiation with the irradiation peak intensity of equal to or more than 800 mW/cm$^2$ may be performed one time, or may be performed two or more times. In addition, in a case of performing the ultraviolet irradiation two or more times, the ultraviolet irradiation can be performed plural times from the same light source, or the ultraviolet irradiation may be performed one or more times from each different light source.

In addition, since the irradiation peak intensity can suppress the cost of the irradiator and can prevent heat generation or light leakage from the light source from affecting the head to obtain excellent discharging stability, the irradiation peak intensity is preferable to be 800 mW/cm$^2$ to 4000 mW/cm$^2$, more preferable to be 800 mW/cm$^2$ to 2000 mW/cm$^2$, and further preferable to be 1000 mW/cm$^2$ to 2000 mW/cm$^2$.

In addition, for the irradiation peak intensity of the present specification, a value which is measured using an ultraviolet meter UM-10 and a receptor UM-400 (all manufactured by KONICA MINOLTA SENSING, INC.) is used. However, the measuring method of the irradiation peak intensity is not limited, and a well-known measuring method of the related art can be used.

In addition, the irradiation energy at the time of the irradiation is preferable to be 100 mJ/cm$^2$ to 600 mJ/cm$^2$, more preferable to be 200 mJ/cm$^2$ to 600 mJ/cm$^2$, and further preferable to be 200 mJ/cm$^2$ to 500 mJ/cm$^2$. If the irradiation energy is in the range described above, an excellent hardenability is obtained, and it is possible to suppress the cost of the irradiation units necessary for the irradiation.

In addition, the irradiation energy of the present specification is calculated by multiplying the irradiation peak intensity by the time from the irradiation start to the irradiation end, and in a case of the pulse irradiation LED, the Duty ratio is further multiplied for the calculation.

Herein, the ultraviolet irradiation with the irradiation peak intensity of equal to or more than 800 mW/cm$^2$ may be performed plural times. In this case, the irradiation energy is expressed as the irradiation energy amount obtained by adding the irradiation of the plural times. In addition, in a case of performing the irradiation with the irradiation peak intensity of equal to or more than 800 mW/cm$^2$ plural times, for further excellent discharging stability, the irradiation energy in the irradiation initially performed after the discharging is preferable to be equal to or less than 800 mJ/cm$^2$, more preferable to be equal to or less than 400 mJ/cm$^2$, further preferable to be equal to or less than 200 mJ/cm$^2$, and further more preferable to be 50 mJ/cm$^2$ to 200 mJ/cm$^2$.

When the irradiation peak intensity, the irradiation energy, and the light emitting peak wavelength described above are in the preferable ranges, the curing is performed with a low energy and at a high speed with the composition of the ink which will be described later. In addition, it is possible to shorten the irradiation time by the composition of the ink which will be described later, and in this case, the recording speed increases. Meanwhile, it is possible to reduce the irradiation peak intensity by the composition of the ink which will be described later, and in this case, the miniaturization of the apparatus and reduction of the cost is realized.

Further, in the curing step, it is preferable to perform preliminary curing described above, before performing proper curing by emitting ultraviolet light from the UV-LED having the irradiation peak intensity of equal to or more than 800 mW/cm$^2$ as described above. In the stage of the preliminary curing, the ultraviolet light (light) irradiates ultraviolet curable ink which will be described later, from the first irradiation units 42a to 42e for preliminary curing.

The irradiation peak intensity from the UV-LED in the stage of the preliminary curing is preferable to be less than 800 mW/cm$^2$, and more preferable to be equal to or less than 500 mW/cm$^2$, and further preferable to be 100 mW/cm$^2$ to 500 mW/cm$^2$. In addition, the irradiation energy in the stage of the preliminary curing is preferable to be equal to or less than 50 mJ/cm$^2$, and more preferable to be 10 mJ/cm$^2$ to 50 mJ/cm$^2$. If the irradiation peak intensity and the irradiation energy are in the range described above, it is possible to dispose the light source for irradiation with the irradiation peak intensity of equal to or more than 800 mW/cm$^2$ to be separated from the head, and prevent heat generation or light leakage from the light source from affecting the head to obtain excellent bleed resistance.

Further, in a case of performing multi-color printing with multicolor ink by a plurality of heads using the recording apparatus shown in FIG. 1, by performing minimum irradiation for preventing color mixing for each head and finally collectively irradiating the multicolor ink with intensity of equal to or more than 800 mW/cm$^2$, it is possible to suppress the cost of the light source to be extremely low.

In addition, the light emitting peak wavelength in the stage of preliminary curing is preferable to be in a range of 360 nm to 420 nm, and more preferable to be in a range of 380 nm to 410 nm, due to the same reason with the irradiation energy at the time of irradiation described above.

Recording Medium

A recorded material is obtained by discharging the ink onto the recording medium by using the ink jet recording method of the embodiment. As the recording medium, for example, an ink absorbable or non-absorbable recording medium is used. The ink jet recording method of the embodiment can be widely applied to recording media having various absorption properties, such as a non-absorbable recording medium in which permeation of ink is difficult, and an absorbable recording medium in which permeation of ink is easy.

As the absorbable recording medium, it is not particularly limited, and for example, plain paper such as electrophotographic paper having high permeability of ink, ink jet paper (exclusive paper for ink jet including an ink absorbing layer configured of silica particles or alumina particles, or an ink absorbing layer configured of hydrophilic polymer such as polyvinyl alcohol (PVA) or polyvinylpyrrolidone (PVP)), art paper, coated paper, or cast paper which is used for general offset printing having relatively low permeability of ink, or the like, is used.

As the non-absorbable recording medium, it is not particularly limited, and for example, a plastic film or plate such as polyvinyl chloride, polyethylene, polypropylene, polyethylene terephthalate (PET), or the like, a metallic plate such as iron, silver, copper, aluminum, or the like, or metallic plate or plastic film obtained by manufacturing by vapor disposition of each metals thereof, alloy plate such as stainless or brass, or the like is used.

As described above, according to the embodiment, it is possible to provide an ink jet recording method which can have an excellent hardenability, effectively prevent cured wrinkles, and further have excellent abrasion resistance, discharging stability, and bleed resistance.

Ultraviolet Curable Ink

An embodiment of the invention relates to ultraviolet curable ink. The ultraviolet curable ink is used in the ink jet recording method of the embodiment described above.

Hereinafter, an additive (component) which is contained or may be contained in ultraviolet curable ink of the embodiment (hereinafter, simply referred to as "ink"), will be described.

Polymerization Compound

The polymerization compound included in the ink is polymerized at the time of light irradiation alone or with the operation of the photopolymerization which will be described later and it is possible to cure printed ink.

Vinyl Ether Group-Containing (Meth)Acrylate Esters

The ink of the embodiment contains vinyl ether group-containing (meth)acrylate esters expressed by the following General Formula (I) as the polymerization compound.

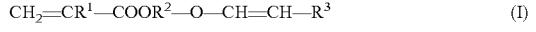

(In the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.)

By containing vinyl ether group-containing (meth)acrylate esters described above in the ink, it is possible to obtain an excellent hardenability of the ink and to lower viscosity of the ink. Further, it is preferable to use the compound including both vinyl ether group and (meth)acrylic group in one molecular, other than to separately use the compound including vinyl ester group and the compound including (meth)acrylic group, in a viewpoint of obtaining an excellent hardenability of the ink.

In General Formula (I), as the divalent organic residue having 2 to 20 carbon atoms represented by $R^2$, a straight, branched, or cyclic alkylene group having 2 to 20 carbon atoms which may be substituted, an alkylene group including oxygen atoms due to ether bond and/or ester bond in a structure and having 2 to 20 carbon atoms which may be substituted, and a divalent aromatic group having 6 to 11 carbon atoms which may be substituted are preferable.

Among them, an alkylene group having 2 to 6 carbon atoms such as an ethylene group, an n-propylene group, an isopropylene group, and a butylene group, and an alkylene group having oxygen atoms due to ether bond in a structure and having 2 to 9 carbon atoms such as an oxyethylene group, an oxy n-propylene group, an oxy isopropylene group, an oxybutylene group are preferably used.

In General Formula (I), as the monovalent organic residue having 1 to 11 carbon atoms represented by $R^3$, a straight, branched, or cyclic alkyl group having 1 to 10 carbon atoms which may be substituted, and an aromatic group having 6 to 11 carbon atoms which may be substituted are preferable. Among them, an alkyl group having 1 or 2 carbon atoms such as a methyl group or an ethyl group, and an aromatic group having 6 to 8 carbon atoms such as a phenyl group and a benzene group are preferably used.

In a case where each organic residue is a group which may be substituted, the substituent thereof is divided into a group containing carbon atoms and a group not containing carbon atoms. First, in a case where the substituent is a group containing carbon atoms, the number of the carbon atoms are counted as the number of carbon atoms in the organic residue. The group containing carbon atoms is not limited to the following, however, a carboxyl group and an alkoxy group are used, for example. Next, the group not containing carbon atoms are not limited o the following, however, a hydroxyl group and a halo group are used, for example.

Vinyl ether group-containing (meth)acrylate esters described above is not limited to the followings, however, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxypropyl (meth)acrylate, 1-methyl-3-vinyloxypropyl (meth)acrylate, 1 vinyloxypropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxycyclohexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy) ethyl (meth)acrylate, 2-(vinyloxyisopropoxy) ethyl (meth)acrylate, 2-(vinyloxyethoxy) propyl (meth)acrylate, 2-(vinyloxyethoxy) isopropyl (meth)acrylate, 2-(vinyloxyisopropoxy) propyl (meth)acrylate, 2-(vinyloxyisopropoxy) isopropyl (meth)acrylate, 2-(vinyloxyethoxy) ethyl (meth)acrylate, 2-(vinyloxyethoxy isopropoxy) ethyl (meth)acrylate, 2-(vinyloxyisopropoxy ethoxy) ethyl (meth)acrylate, 2-(vinyloxyisopropoxyisopropoxy) ethyl (meth)acrylate, 2-(vinyloxy ethoxy ethoxy) propyl (meth)acrylate, 2-(vinyloxy ethoxyisopropoxy) propyl (meth)acrylate, 2-(vinyloxyisopropoxyethoxy) propyl (meth)acrylate, 2-(vinyloxyisopropoxyisopropoxy) propyl (meth)acrylate, 2-(vinyloxyethoxyethoxy) isopropyl (meth)acrylate, 2-(vinyloxyethoxy isopropoxy) isopropyl (meth)acrylate, 2-(vinyloxy isopropoxyethoxy) isopropyl (meth)acrylate, 2-(vinyloxyisopropoxyisopropoxy) isopropyl (meth)acrylate, 2-(vinyloxyethoxyethoxyethoxy) ethyl (meth)acrylate, 2-(vinyloxyethoxyethoxyethoxyethoxy) ethyl (meth)acrylate, 2-(isopropenoxyethoxy) ethyl (meth)acrylate, 2-(isopropenoxyethoxyethoxy) ethyl (meth)acrylate, 2-(isopropenoxyethoxyethoxyethoxy) ethyl (meth)acrylate, 2-(isopropenoxyethoxyethoxyethoxyethoxy) ethyl (meth)

acrylate, polyethylene glycol monovinylether (meth)acrylate, and polypropylene glycol monovinylether (meth)acrylate are used, for example.

Among them, since the lower viscosity of the ink, a high flash point, and an excellent hardenability of ink can be obtained, 2-(vinyloxyetoxy) ethyl (meth)acrylate, that is, at least any of 2-(vinyloxyetoxy) ethyl acrylate and 2-(vinyloxyetoxy) ethyl methacrylate is preferable, and 2-(vinyloxyetoxy) ethyl acrylate is more preferable. Particularly, since all of 2-(vinyloxyetoxy) ethyl acrylate and 2-(vinyloxyetoxy) ethyl methacrylate have simple structure and small molecular weight, it is possible to significantly lower viscosity of ink. As 2-(vinyloxyetoxy) ethyl (meth)acrylate, 2-(2-vinyloxyetoxy) ethyl (meth)acrylate and 2-(1-vinyloxyetoxy) ethyl (meth)acrylate are used, and as 2-(vinyloxyetoxy) ethyl acrylate, 2-(2-vinyloxyetoxy) ethyl acrylate and 2-(1-vinyloxyetoxy) ethyl acrylate are used. In addition, 2-(vinyloxyetoxy) ethyl acrylate is more excellent in viewpoint of hardenability, compared to 2-(vinyloxyetoxy) ethyl methacrylate.

Vinyl ether group-containing (meth)acrylate esters may be used alone, or may be used in combination of two or more kinds.

The content of vinyl ether group-containing (meth)acrylate esters, particularly 2-(vinyloxyetoxy) ethyl (meth)acrylate, is preferable to be 10% by mass to 90% by mass, more preferable to be 20% by mass to 80% by mass, further preferable to be 20% by mass to 70% by mass, and even more preferable to be 20% by mass to 60% by mass, with respect to the total content (100% by mass) of the ink. If the content thereof is equal to or more than 10% by mass, it is possible to lower the viscosity of the ink and to obtain excellent hardenability of the ink. Meanwhile, if the content thereof is equal to or less than 90% by mass, it is possible to maintain preservation stability of the ink in an excellent state and to further effectively prevent generation of the cured wrinkles.

As a manufacturing method of vinyl ether group-containing (meth)acrylate esters described above, it is not limited to the following, however, a method of esterifying (meth)acrylate and hydroxyl group-containing vinyl ether (manufacturing method B), a method of esterifying halide (meth)acrylate and hydroxyl group-containing vinyl ether (manufacturing method C), a method of esterifying (meth)acrylic anhydride and hydroxyl group-containing vinyl ether (manufacturing method D), a method of esterifying (meth)acrylic ester and hydroxyl group-containing vinyl ether (manufacturing method E), a method of esterifying (meth)acrylate and halogen-containing vinyl ether (manufacturing method F), a method of esterifying (meth)acrylate alkali (earth) metal salt and halogen-containing vinyl ether (manufacturing method G), a method of transvinylation of hydroxyl group-containing (meth)acrylic ester and vinyl carboxylic acid (manufacturing method H), a method of transetherification of hydroxyl group-containing (meth)acrylic ester and alkyl vinyl ether (manufacturing method I) are used.

Among them, the manufacturing method E is preferable since it is possible to excellently exhibit desirable effects of the embodiment.

Other Polymerization Compounds

As polymerization compounds other than the described above compounds (hereinafter, referred to as "other polymerization compounds"), various monofunctional, bifunctional, and trifunctional or more of polyfunctional monomers and oligomers which are well known in the related art can be used. As the monomer, unsaturated carboxylic acid such as (meth)acrylate, itaconate, crotonate, isocrotonic acid, and maleic acid, or salt thereof, ester, urethane, amide, and anhydride thereof, acrylonitrile, styrene, various unsaturated polyester, unsaturated polyether, polyether polyamides, and unsaturated urethane, are used for example. In addition, as the oligomers, an oligomer formed from the monomers described above such as a straight-chain acrylic oligomer or the like, epoxy (meth)acrylate, oxetane (meth)acrylate, aliphatic urethane (meth)acrylate, aromatic urethane (meth)acrylate, and polyester (meth)acrylate are used for example.

In addition, as the other monofunctional monomer or multifunctional monomer, an N-vinyl compound may be contained. As the N-vinyl compound, N-vinyl formamide, N-vinyl carbazole, N-vinyl acetamide, N-vinyl pyrrolidone, N-vinyl caprolactam, and acryloylmorpholine, and derivatives thereof are used, for example.

Among the other polymerization compounds, ester of (meth)acrylate, that is, (meth)acrylate is preferable.

Among the (meth)acrylate, as monofunctional (meth)acrylate, monofunctional (meth)acrylate having an aromatic ring skeleton such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxy butyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydro furfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butyl cyclohexyl (meth)acrylate, dicyclopentanyl (meth)acrylate, dicyclopentenyloxyethyl (meth)acrylate, and benzyl (meth)acrylate are used. Among them, one or more selected from a group consisting of phenoxyethyl (meth)acrylate, benzyl (meth)acrylate, and isobornyl (meth)acrylate are preferable.

Among (meth)acrylate described above, as bifunctional (meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, and polytetramethyleneglycol di(meth)acrylate are used, for example. Among them, dipropylene glycol di(meth)acrylate is preferable.

Among (meth)acrylate described above, as trifunctional or more of polyfunctional (meth)acrylate, trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa (meth)acrylate, ditrimethylol propane tetra(meth)acrylate, glycerine propoxy tri(meth)acrylate, caprolactone-modified trimethylolpropane tri(meth)acrylate, pentaerythritol tetra (meth)acrylate, and caprolactam-modified dipentaerythritol hexa(meth)acrylate are used, for example.

Among them, since advantageous effects described below are obtained, the ink of the embodiment is preferable to contain at least any of monofunctional (meth)acrylate and bifunctional or more (meth)acrylate, more preferable to contain monofunctional (meth)acrylate, and further preferable to contain both thereof. In this case, low viscosity of ink is obtained, excellent solubility of the photopolymerization initiator and the other additive is obtained, excellent discharging stability at the time of ink jet recording is easily obtained, and further high toughness, heat resistance, and chemical resistance of the coating film are increased. In addition, since the hardenability and the solubility of the initiator become more excellent, monofunctional (meth)acrylate including an aromatic skeleton in the molecule such as phenoxyethyl (meth)acrylate, benzyl (meth)acrylate, 2-hydroxyphenoxypropyl (meth)acrylate, and phenoxydiethylene glycol (meth)acrylate is preferable, among monofunctional (meth)acrylate. In addition, since the hardenability and the abrasion resistance of the coating film become more excellent, one or more selected from a group consisting of diethylene glycol di(meth)acrylate, tripropylene glycol di(meth)acrylate, and dipropyleneglycoldi(meth)acrylate are preferable, among bifunctional (meth)acrylate.

The other polymerization compound may be used alone or may be used in combination of two or more kinds.

In a case of containing the other polymerization compound, the content thereof is preferable to be 5% by mass to 85% by mass, and more preferable to be 15% by mass to 70% by mass, with respect to the total content (100% by mass) of the ink. Since excellent hardenability due to solubility of the photopolymerization initiator, viscosity reduction, and preservation stability are obtained, the content of monofunctional (meth)acrylate except for vinyl ether group-containing (meth)acrylate esters described above is preferable to be 5% by mass to 50% by mass, and more preferable to be 10% by mass to 40% by mass, with respect to the total content (100% by mass) of the ink.

Since the excellent hardenability, the abrasion resistance, and the adhesiveness are obtained, the content of bifunctional or more (meth)acrylate is preferable to be 5% by mass to 55% by mass, and more preferable to be 10% by mass to 40% by mass, with respect to the total content (100% by mass) of the ink.

Photopolymerization Initiator

The ink of the embodiment contains the photopolymerization initiator. The photopolymerization initiator is used for performing printing by curing the ink existing on a surface of a recording medium with polymerization by the irradiation with ultraviolet light. By using ultraviolet light (UV), it is possible to obtained excellent safety and to suppress cost of a light source lamp. The photopolymerization initiator is not limited as long as active species of radical or cation are generated and polymerization of the polymerization compound is initiated by the energy of the light (ultraviolet light), however, a photoradical polymerization initiator or a photocation polymerization initiator can be used, and among them, it is preferable to use the photoradical polymerization initiator.

As the photoradical polymerization initiator, aromatic ketones, acyl phosphine oxide compounds, aromatic onium salt compounds, organic peroxides, thio compounds (such as thioxanthone compounds, thiophenyl group-containing compounds), α-aminoalkylphenone compounds, hexaarylbiimidazole compounds, ketoxime ester compounds, borate compounds, azinium compounds, metallocene compounds, active ester compounds, compounds having carbon-halogen bond, and alkylamine compounds are used, for example.

Among them, since it is possible to realize further excellent hardenability of the ink, thioxanthone compounds are preferable, and combination of acyl phosphine oxide compounds and thioxanthone compounds is more preferable.

As detailed examples of the photoradical polymerization initiator, acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methylacetoacetate phenone, 4-chloro benzophenone, 4,4'-dimethoxy-benzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methyl-propan-1-one, 2-hydroxy-2-methyl-1-phenyl propan-1-one, thioxanthone, diethyl thioxanthone, 2-isopropylthio xanthone, 2-chlorothioxanthone, 2-methyl-1-[4-(methylthio) phenyl]-2-morpholino-propan-1-one, bis (2,4,6-trimethyl benzoyl)-phenyl phosphine oxide, 2,4,6-trimethyl benzoyl-diphenyl-phosphine oxide, 2,4-diethyl thioxanthone, and bis-(2,6-dimethoxybenzoyl)-2,4,4-trimethylpentyl phosphine oxide are used.

As commercially available products of the photoradical polymerization initiator, IRGACURE 651 (2,2-dimethoxy-1,2-diphenyl ethane-1-one), IRGACURE 184 (1-hydroxycyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl] phenyl}-2-methyl-propane-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl) methyl]-1-[4-(4-morpholinyl) phenyl]-1-butanone), DAROCUR TPO (2,4,6-trimethylbenzoyl-diphenyl-phosphine oxide), IRGACURE 819 (bis (2,4,6-trimethyl benzoyl)-phenyl phosphine oxide), IRGACURE 784 (bis (η5-2,4-cyclopentadien-1-yl)-bis (2,6-difluoro-3-(1H-pyrrol-1-yl)-phenyl) titanium), IRGACURE OXE 01 (1,2-octane dione, 1-[4-(phenylthio)-, 2-(O-benzoyloxime)]), IRGACURE OXE 02 (ethanone, 1-[9-ethyl-6-(2-methyl-benzoyl)-9H-carbazol-3-yl]-, 1-(O-acetyl oxime)), IRGACURE 754 (mixture of oxyphenyl acetic acid, 2-[2-oxo-2-phenylacetoxy ethoxy] ethyl ester and oxyphenyl acetic acid, and 2-(2-hydroxyethoxy) ethyl ester) (all manufactured by BASF), Speedcure TPO, Speedcure DETX (2,4-diethyl thioxanthone), Speedcure ITX (2-isopropylthioxanthone) (all manufactured by Lambson), KAYACURE DETX-S (2,4-diethyl thioxanthone) (manufactured by Nippon Kayaku Co., Ltd.), Lucirin TPO, LR8893, LR8970 (all manufactured by BASF), and UBECRYL P36 (manufactured by UCB) are used, for example.

The photopolymerization initiator may be used along or may be used in combination of two or more kinds.

The content of the photopolymerization initiator is preferable to be 5% by mass to 15% by mass and more preferable to be 7% by mass to 13% by mass, with respect to the total content (100% by mass) of the ink. If the content thereof is in the range described above, it is possible to sufficiently exhibit the ultraviolet curing speed, and to avoid residue of dissolved photopolymerization initiator or coloring due to the initiator. It is preferable to contain acyl phosphine oxide compounds among the photopolymerization initiator. The content of acyl phosphine oxide compounds described above is preferable to be 5% by mass to 15% by mass and more preferable to be 7% by mass to 13% by mass, with respect to the total content (100% by mass) of the ink.

In addition, by using the photopolymerization compound as the polymerization compound described above, it is possible to omit the addition of the photopolymerization initiator, however, it is suitable to use the photopolymerization initiator since it is possible to easily adjust the start of the polymerization.

Color Material

The ink may further contain color materials. As the color material, at least one of a pigment and a dye can be used.

Pigment

By using the pigment as the color material, it is possible to obtain excellent light resistance of the ink. Both an inorganic pigment and an organic pigment can be used for the pigment.

As the inorganic pigment, carbon blacks (C.I. Pigment Black 7) such as furnace black, lamp black, acetylene black, and channel black, iron oxide, titanium oxide can be used.

As the organic pigment, azo pigments such as insoluble azo pigments, condensed azo pigments, azo lake, and chelate azo, polycylic pigments such as phthalocyanine pigments, perylene and perinone pigments, anthraquinone pigments, quinacridone pigments, dioxane pigments, thioindigo pigments, isoindolinone pigments, and quinophthalone pigments, dye chelate (for example, basic dye chelate, acidic dye chelate, or the like), dye lake (basic dye lake, acidic dye lake, or the like), nitro pigments, nitroso pigments, aniline black, and daylight fluorescent pigments are used.

In more detail, as carbon black used for the black ink, No. 2300, No. 900, MCF88, No. 33, No. 40, No. 45, No. 52, MA7, MA8, MA100, No. 2200B and the like (all manufactured by Mitsubishi Chemical Corporation), Raven 5750, Raven 5250, Raven 5000, Raven 3500, Raven 1255, Raven 700 and the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all manufactured by CABOT JAPAN K.K.), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4 (all manufactured by Degussa), and Microlith Black 0066 K (former Microlith Black C-K, manufactured by BASF) are used.

As the pigment used for the white ink, C.I. Pigment White 6, 18, and 21 are used.

As the pigment used for the yellow ink, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180 are used.

As the pigment used for the magenta ink, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violet 19, 23, 32, 33, 36, 38, 43, and 50 are used.

As the pigment used for the cyan ink, C.I. Pigment Blue 1, 2, 3, 15, 15:1, 15:2, 15:3, 15:34, 15:4, 16, 18, 22, 25, 60, 65, and 66, and C.I. Vat Blue 4 and 60 are used.

In addition, as the pigment other than magenta, cyan, and yellow, C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63 are used.

The pigment may be used alone, or may be used in combination of two or more kinds.

In a case of using the pigment described above, an average particle size thereof is preferable to be equal to or less than 300 nm and more preferable to be 50 nm to 200 nm. If the average particle size thereof is in the range described above, it is possible to obtain further excellent reliability such as discharging stability or dispersion stability of the ink, and to form an image with excellent image quality. Herein, the average particle size of the embodiment is measured with a dynamic light scattering method.

Dye

A dye can be used as the color material. As the dye, it is not particularly limited, and an acidic dye, a direct dye, a reactive dye, and a basic dye can be used. As the dye, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow, 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, C.I. Reactive Black 3, 4, and 35 are used, for example.

The dye described above may be used alone, or may be used in combination of two or more kinds.

Since excellent shielding property and color reproducibility are obtained, the content of the color material is preferable to be 1% by mass to 20% by mass with respect to the total content (100% by mass) of the ink.

Dispersant

When the ink contains the pigment, the ink may further contain a dispersant for obtaining further excellent pigment dispersibility. As the dispersant, it is not particularly limited, and a dispersant which is commonly used for preparing a pigment dispersion liquid such as a polymer dispersant, is used. As detailed examples, a dispersant including one or more of polyoxyalkylene polyalkylene polyamine, vinyl polymer and copolymer, acrylic polymer and copolymer, polyester, polyamide, polyimide, polyurethane, amino-based polymer, silicon-containing polymer, sulfur-containing polymer, fluorine-containing polymer, and epoxy resin, as main components, are used. As commercially available products of the polymer dispersant, Ajisper Series manufactured by Ajinomoto Fine-Techno Co., Inc., Solsperse Series (such as Solsperse 36000) which can be purchased from Avecia or Noveon, DISPERBYK Series manufactured by BYK Chemie, and DISPARLON Series manufactured by Kusumoto Chemicals, Ltd. are used.

Slip Agent

The ink of the embodiment may further contain a slip agent (surfactant). As the slip agent, it is not particularly limited, and as silicone based surfactant, polyester-modified silicone or polyether-modified silicone can be used, for example, and it is particularly preferable to use polyester-modified polydimethylsiloxane or a polyether modified polydimethylsiloxane. As detailed example, BYK-347, BYK-348, BYK-UV3500, 3510, 3530, and 3570 (all manufactured by BYK) can be used.

The slip agent may be used alone and may be used in combination of two or more kinds. In addition, the content of the slip agent is not limited, and a preferable amount may be suitably added.

Other Additives

The ink may further contain additives (components) other than the additives described above. As such component, it is not particularly limited, and a polymerization accelerator, a polymerization inhibitor, a permeation accelerator, and a wetting agent (moisturizing agent) which are well known in the related art may be used, for example. As the other additives, a fixing agent, an antifungal agent, a preservative, an antioxidant, an ultraviolet absorbing agent, a chelate, pH adjuster, and a thickener which are well known in the related art may be used, for example.

EXAMPLES

Hereinafter, the embodiment of the first invention will be described in more detail with reference to Examples, however, the embodiment is not limited only to Examples.

Used Raw Material

Raw materials used for Examples and Comparative Examples are as follows.

Coloring Materials (pigments)
- Novoperm Yellow 4G01 (C.I. Pigment Yellow 155, manufactured by Clariant, hereinafter referred to as "PY 155")
- IRGALITE BLUE GLVO (C.I. Pigment Blue 15:4, manufactured by BASF, hereinafter referred to as "PB 15:4")
- CROMOPHTAL PinkPT (SA) (C.I. Pigment Red 122, manufactured by BASF, hereinafter referred to as "PR 122")

Dispersant
- Solsperse 36000 (product name, manufactured by Lubrizol Corporation, hereinafter referred to as "SOL 36000")

Radical Polymerization Compounds
- VEEA (2-(2-vinyloxy ethoxy) ethyl acrylate, product name, manufactured by Nippon Shokubai Co., Ltd., hereinafter referred to as "VEEA")
- Viscoat #192 (phenoxyethyl acrylate, product name, manufactured by OSAKA ORGANIC CHEMICAL INDUSTRY LTD., hereinafter referred to as "PEA")
- SR 230 (diethylene glycol diacrylate, product name, manufactured by Sartomer Company Inc., hereinafter, referred to as "DEGDA")
- APG-200 (tripropylene glycol diacrylate, product name, manufactured by SHIN-NAKAMURA CHEMICAL CO., LTD., hereinafter referred to as "TPGDA")
- IBXA (isobornyl acrylate, product name, manufactured by OSAKA ORGANIC CHEMICAL INDUSTRY LTD., hereinafter referred to as "IBX")
- V #160 (benzyl acrylate, product name, manufactured by OSAKA ORGANIC CHEMICAL INDUSTRY LTD., hereinafter, referred to as "BZA")

Radical Photopolymerization Initiators
- IRGACURE 819 (product name, manufactured by BASF, solid content of 100%, hereinafter referred to as "819")
- DAROCURE TPO (product name, manufactured by BASF, solid content of 100%, hereinafter, referred to as "TPO")

Slip Agent
- BYK-UV3500 (product name, manufactured by BYK, hereinafter referred to as "UV3500")

Examples 1 to 13, Comparative Examples 1 to 6, and Reference Examples 1 to 6

Manufacture of Pigment Dispersion Liquid

A pigment dispersion liquid was manufactured before manufacturing the ink. 2 parts by mass of each pigment, 0.6 parts by mass of dispersant, and 20 parts by mass of polymerization compound as a dispersion medium, were mixed, and stirred with a stirrer for 1 hour. The mixed liquid after stirring was dispersed with a bead mill, and pigment dispersion liquid was obtained. In addition, as dispersion conditions, zirconia beads having a diameter of 0.65 mm were filled with a filling rate of 70%, a circumferential speed was set to be 9 mm/s, dispersion time was set to be 2 to 4 hours. The dispersion medium was used with the polymerization compounds which can be used for each ink, in priority order of PEA, BZA, IBX, and VEEA.

Manufacture of Ultraviolet Curable Ink 1 to 8

Components disclosed in Table 1 below were added to have compositions disclosed in Table 1 below (unit is % by mass) and were stirred by a high-speed water-cooling type stirrer, and thus, ultraviolet curable yellow ink, ultraviolet curable cyan ink, and ultraviolet curable magenta ink (1 to 8) were prepared. In addition, in Table 1, transmittance (unit is %) at a wavelength of 395 nm was obtained by diluting each ultraviolet curable ink with ethyl diglycol acetate by 1000 times, and measuring the diluted solution with a spectrophotometer U3300 (product name manufactured by Hitachi, Ltd.).

TABLE 1

| | Ink 1 to 8 | | | | | | | |
|---|---|---|---|---|---|---|---|---|
| | Ink No. | | | | | | | |
| Component | 1 | 2 | 3 | 4 | 5 | 6 | 7 | 8 |
| VEEA | 15.00 | 15.00 | 15.00 | 15.00 | 15.00 | 20.00 | 15.00 | 20.00 |
| PEA | 30.00 | 30.00 | 30.00 | — | — | 68.20 | — | 68.20 |
| BZA | — | — | — | 30.00 | — | — | 30.00 | — |
| IBX | — | — | — | — | 30.00 | — | — | — |
| DEGDA | 25.20 | 25.20 | 25.20 | 25.20 | 25.20 | — | 25.20 | — |
| TPGDA | 18.00 | 18.00 | 18.00 | 18.00 | 18.00 | — | 18.00 | — |
| PY 155 | 2.00 | — | — | 2.00 | 2.00 | 2.00 | — | — |
| PB 15:4 | — | 2.00 | — | — | — | — | 2.00 | 2.00 |
| PR 122 | — | — | 2.00 | — | — | — | — | — |
| SOL 36000 | 0.60 | 0.60 | 0.60 | 0.60 | 0.60 | 0.60 | 0.60 | 0.60 |
| 819 | 5.00 | 5.00 | 5.00 | 5.00 | 5.00 | 5.00 | 5.00 | 5.00 |
| TPO | 4.00 | 4.00 | 4.00 | 4.00 | 4.00 | 4.00 | 4.00 | 4.00 |
| UV 3500 | 0.20 | 0.20 | 0.20 | 0.20 | 0.20 | 0.20 | 0.20 | 0.20 |
| Total | 100.00 | 100.00 | 100.00 | 100.00 | 100.00 | 100.00 | 100.00 | 100.00 |
| Transmittance at a wavelength of 395 nm (%) | 0.37 | 7.64 | 4.30 | 0.37 | 0.37 | 0.37 | 7.64 | 7.64 |
| Ink hardenability | B | A | A | B | C | C | A | B |

Ink Jet Recording of Examples 1

Ink jet recording was performed using the printer 1 which is a line printer in FIG. 4 described above. In detail, in the printer 1, the head was filled with the ultraviolet curable yellow ink 1 prepared as described above. Nozzle density of the head was set to be 720 dpi. A solid patterned image having a film thickness of 10 μm was printed on a PET film (product name: PET 50A, manufactured by Lintec Corporation) which is a recording medium, with conditions of recording resolution of 720 dpi×720 dpi, Duty of 100%, liquid droplet weight of 7 ng, and one pass (single pass). The printing was performed by heating the ink so that the viscosity of the ink is 10 mPa·s. In addition, the "solid patterned image" in the present specification means an image on which dots are recorded with respect to all pixels each of which is a minimum recording unit area specified by the recording resolution.

With the recording, in order to cure the image, ultraviolet light having irradiation peak intensity of 800 mW/cm$^2$ (see Table 2 below), input current of LEDs of 230 mA (for each UV-LED), and a light emitting peak wavelength of 395 nm was emitted for predetermined time, from the lens-attached LED (described above) in the ultraviolet irradiation device installed on downstream of the recording medium in the transportation direction, that is, the first irradiation unit 42f. The irradiation energy at that time was 400 mJ/cm$^2$ (see Table 2 below). Accordingly, the ink jet recording was performed, and a recorded material was obtained.

In addition, the irradiation peak intensity of each example which will be described later were adjusted by changing the input current of the UV-LED, and were measured with a distance from a light emitting surface to the recording medium. Further, the irradiation energy is a value calculated from the sum of the irradiation peak intensity [mW/cm$^2$] and the irradiation time [s]. In the printing, each irradiation unit 42 and 44 continued irradiation, and the irradiation duration when one point from the irradiated surface of the recording medium which is transported under the irradiation units passes the irradiation area irradiated by the irradiation units were set as the irradiation time T1. The irradiation time T1 was adjusted by changing the number of the UV-LEDs which emit light from the plurality of UV-LEDs arranged in the transportation direction of the recording medium in the irradiation unit. Other irradiation units were not used.

Ink Jet Recording of Examples 2 to 4, and 10 to 13, Comparative Examples 1, 4, and 5, and Reference Examples 1 to 6

The ink jet recording was performed in the same manner as Example 1 except for setting the irradiation peak intensity, irradiation energy, and the ink filled the head as shown in Tables 2 to 4, and a recorded material was obtained.

Ink Jet Recording of Examples 5 to 7, and Comparative Examples 2 and 3

The ink jet recording was performed in the same manner as Example 1 except for using the second irradiation unit 44 in addition to the first irradiation unit 42f or using the second irradiation unit 44 without using the first irradiation unit 42f, and setting the irradiation peak intensity, irradiation energy, and the ink filled the head as shown in Tables 2 to 4, and a recorded material was obtained.

Ink Jet Recording of Example 8

The ink jet recording was performed in the same manner as Example 1 except for using the LED with no lens (described above) instead of the lens-attached LED for the LED in the first irradiation unit 42f, and setting the irradiation peak intensity and irradiation energy as shown in Table 2, and a recorded material was obtained. The irradiation time T1 was the same as Example 1. The input current of the LED was necessary to be 270 mA.

Ink Jet Recording of Example 9

The ink jet recording was performed in the same manner as Example 1 except for using the LED with no lens which is the pulse irradiation LED (described above) instead of the lens-attached LED for the LED in the first irradiation unit 42f, and setting the irradiation peak intensity and irradiation energy as shown in Table 2, and a recorded material was obtained. In the pulse irradiation LED, the Duty ratio was set to 0.5, the pulse frequency was set to 1 kHz, and the input current was set to 220 mA. The irradiation time T1 was the same as Example 1.

Ink Jet Recording of Comparative Example 6

The ink jet recording was performed using the serial printer shown in FIG. 6. In detail, in the serial printer shown in FIG. 6, the head is filled with ultraviolet curable ink 1 shown in Table 4. The nozzle density of the head was set to be 360 dpi. A solid patterned image having a film thickness of 10 μm was printed on a PET film (product name: PET 50A, manufactured by Lintec Corporation) which is a recording medium, with conditions of recording resolution of 720 dpi×720 dpi, Duty of 100%, liquid droplet weight of 7 ng, and 4 passes (2 passes in the main scanning direction×2 passes in the auxiliary scanning direction).

With the recording, in order to cure the image, ultraviolet light having irradiation peak intensity of 500 mW/cm$^2$ (see Table 2 below) and a light emitting peak wavelength of 395 nm was emitted for predetermined time, from the lens-attached LED (described above) in the ultraviolet irradiation device installed on downstream of the recording medium in the transportation direction, that is, the first irradiation units 92a and 92b. The irradiation energy for one pass was set to be 200 mJ/cm$^2$. Accordingly, the ink jet recording was performed, and a recorded material was obtained.

Evaluation Items

For the recorded materials obtained in respective Examples (including Examples 14 to 23 which will be described later) and Comparative Examples (including Comparative Example 7 will be described later), hardenability, cured wrinkles, abrasion resistance, bleed resistance, and discharging stability were evaluated with the following methods.

1. Hardenability Test 1

After rubbing the surface of the obtained solid patterned image (recorded surface) using a Johnson cotton swab manufactured by Johnson & Johnson, with 40 times of reciprocation and a load of 10 g, it was determined whether or not there were scratches on the recorded surface, and the hardenability at the time of the printing was evaluated. Evaluation criteria are as follows. The evaluation results are shown in Tables 2 to 5.

O: No scratches

X: Scratches generated

2. Hardenability Test 2

When obtaining a cured coating film having a thickness of 10 μm by further coating the PET film (PET 50A) with each ink by a bar coater and curing by emitting light by the UV-LED having the irradiation peak intensity of 800 mW/cm$^2$ and the light emitting peak wavelength of 395 nm, the surface was rubbed with the conditions same as Hardenability Test 1, and irradiation energy necessary to have "O" of the evaluation criteria in Hardenability Test 1 was evaluated. The evaluation results were shown in Table 1 as "ink hardenability".

A: Equal to or less than 100 mJ/cm²
B: More than 100 mJ/cm² and equal to or less than 150 mJ/cm²
C: More than 150 mJ/cm²
3. Cured Wrinkles For surface roughness of the recording medium, a root mean square height (Rq value) was measured by using a laser microscope VK-9700 (manufactured by KEYENCE), and the recorded surface was visually observed.

Evaluation criteria are as follows. The evaluation results are shown in Tables 2 to 5.
O: Rq was equal to or less than 3. Sufficient shiny appearance was observed when seen reflected light of the film.
Δ: Rq exceeded 3 or was equal to or less than 5. Slightly insufficient shiny appearance was observed when seen reflected light of the film.
X: Rq exceeded 5. Shiny appearance was insufficient and the surface was observed to be rough when seen reflected light of the film.
4. Abrasion Resistance Evaluation of abrasion resistance was performed using a Color Fastness Rubbing Tester (manufactured by TESTER SANGYO CO., LTD.), based on JIS K5701 (ISO 11628) (regulation of a method for testing ink, a vehicle material, a printed material used in planography). As the evaluation method, cannequin was put on the recorded surface and the surface was rubbed with a load of 450 g, and then, abrasion and scratches on the cured surface of the recorded material were visually observed and compared.

Evaluation criteria are as follows. The evaluation results are shown in Tables 2 to 5.
1: No stains were observed. No abrasion or scratches were observed on the printed surface.
2: Strains on the cannequin were observed. No abrasion or scratches were observed on the printed surface.
3: Strains on the cannequin were observed. Abrasion or scratches on the printed surface were observed.
5. Bleed Resistance Periphery portion of the obtained solid patterned image was visually observed. Evaluation criteria are as follows. The evaluation results are shown in Tables 2 to 5.
1: Bleeding on the periphery portion of the solid patterned image was not observed.
2: Bleeding on the periphery portion of the solid patterned image was observed.
6. Discharging Stability An ink jet evaluating device (test model) having 180 nozzles in which a discharging nozzle diameter was set as 20 μm and a driving frequency was set as 18 kHz, and an ink discharging amount for each time was adjusted to be 11 ng, was prepared. Using this evaluating device, the number of nozzles in which nozzle omission occurred when continuously performing ink discharging for 60 minutes was acquired.

Evaluation criteria are as follows. The evaluation results are shown in Tables 2 to 5.
1: 1 nozzle or less
2: 2 to 4 nozzles
3: 5 nozzles or more
7. Glossiness Glossiness at a turning angle of 60° C. was measured using a gloss meter (product name: MINOLTA MULTI GLOSS 268 manufactured by Knoica Minolta Sensing, Inc.).

Evaluation criteria are as follows. The evaluation results are shown in Tables 2 to 5.
A: Equal to or more than 80
B: Equal to or more than 70 and less than 80
C: Equal to or more than 60 and less than 70
D: Less than 60

TABLE 2

Examples 1 to 10

| Item | 1 | 2 | 3 | 4 | 5 | 6 | 7 | 8 | 9 | 10 |
|---|---|---|---|---|---|---|---|---|---|---|
| Ink No. | 1 | 1 | 1 | 1 | 1 | 1 | 1 | 1 | 1 | 1 |
| Peak intensity of first irradiation unit | 800 | 1500 | 3000 | 800 | 800 | 1500 | — | 1500 | 1300 | 1000 |
| Irradiation energy | 400 | 400 | 800 | 200 | 200 | 100 | — | 400 | 173 | 400 |
| Peak intensity of second irradiation unit | — | — | — | — | 500 | 1500 | 1500 | — | — | — |
| Irradiation energy | — | — | — | — | 100 | 200 | 400 | — | — | — |
| Evaluation results |  |  |  |  |  |  |  |  |  |  |
| Cured wrinkles | O | O | O | O | O | O | O | O | O | O |
| Hardenability | O | O | O | O | O | O | O | O | O | O |
| Abrasion resistance | 1 | 1 | 1 | 1 | 1 | 1 | 1 | 1 | 1 | 1 |
| Discharging stability | 1 | 2 | 3 | 1 | 1 | 1 | 1 | 3 | 1 | 2 |
| Bleeding resistance | 1 | 1 | 1 | 1 | 1 | 1 | 2 | 1 | 1 | 1 |
| Glossiness | C | B | B | C | C | B | B | B | B | B |

TABLE 3

Examples 11 to 13

| Item | 11 | 12 | 13 |
|---|---|---|---|
| Ink No. | 4 | 5 | 6 |
| Peak intensity of first irradiation unit | 1000 | 1000 | 1000 |
| Irradiation energy | 400 | 400 | 400 |
| Peak intensity of second irradiation unit | — | — | — |
| Irradiation energy | — | — | — |
| Evaluation results |  |  |  |
| Cured wrinkles | 0 | 0 | A |
| Hardenability | 0 | 0 | 0 |
| Abrasion resistance | 1 | 1 | 1 |
| Discharging stability | 2 | 2 | 2 |

TABLE 3-continued

Examples 11 to 13

| | Example No. Example | | |
|---|---|---|---|
| Item | 11 | 12 | 13 |
| Bleeding resistance | 1 | 1 | 1 |
| Glossiness | B | B | C |

TABLE 4

Comparative Examples 1 to 6 and Reference Examples 1 to 6

| | Example No. | | | | | | | | | | | |
|---|---|---|---|---|---|---|---|---|---|---|---|---|
| | Comparative Examples | | | | | | Reference Examples | | | | | |
| Item | 1 | 2 | 3 | 4 | 5 | 6 | 1 | 2 | 3 | 4 | 5 | 6 |
| Ink No. | 1 | 1 | 1 | 1 | 1 | 1 | 2 | 2 | 2 | 3 | 7 | 8 |
| Peak intensity of first irradiation unit | 500 | 500 | 500 | 500 | 100 | 500 | 500 | 800 | 1500 | 500 | 800 | 800 |
| Irradiation energy | 200 | 100 | 200 | 100 | 1500 | 200 | 200 | 400 | 400 | 200 | 400 | 400 |
| Peak intensity of second irradiation unit | — | 800 | 800 | — | — | — | — | — | — | — | — | — |
| Irradiation energy | — | 400 | 400 | — | — | — | — | — | — | — | — | — |
| Evaluation results | | | | | | | | | | | | |
| Cured wrinkles | X | X | X | ◯ | X | Δ | Δ | ◯ | ◯ | Δ | ◯ | Δ |
| Hardenability | ◯ | ◯ | ◯ | X | ◯ | ◯ | ◯ | ◯ | ◯ | ◯ | ◯ | ◯ |
| Abrasion resistance | 2 | 1 | 1 | 3 | 1 | 2 | 1 | 1 | 1 | 1 | 1 | 1 |
| Discharging stability | 1 | 1 | 1 | 1 | 3 | 1 | 1 | 1 | 2 | 1 | 1 | 1 |
| Bleeding resistance | 1 | 1 | 1 | 1 | 2 | 1 | 1 | 1 | 1 | 1 | 1 | 1 |
| Glossiness | D | D | D | D | D | C | B | A | A | B | A | A |

According to the results described above, it was clear that the recording method (Examples) including a discharging step of discharging first ultraviolet curable ink of a radical polymerization reaction type which contains a radical photopolymerization initiator and a radical polymerization compound and in which transmittance at a wavelength of 395 nm is equal to or less than 1%, onto a recording medium, and a curing step of curing the ink by setting the light source which initially irradiates the first ultraviolet curable ink which is landed on the recording medium with ultraviolet light as the UV-LED having the peak intensity of the emitted ultraviolet light of equal to or more than 800 mW/cm², can realize the excellent hardenability, efficiently prevent the cured wrinkles, and achieves excellent abrasion resistance, discharging stability, bleeding resistance, and glossiness, compared to the other recording methods (Comparative Examples).

Supposition regarding the results described above are provided, however, the invention is not limited to the following supposition. According to respective Comparative Examples, it is found that the result of the cured wrinkles is poor and the glossiness is low, in a case where the irradiation peak intensity of the initial ultraviolet irradiation is less than 800 mW/cm². According to Comparative Example 1, it is assumed that the abrasion resistance also tends to be degraded, in a case of the poor result of the cured wrinkles. According to Comparative Example 5, it is assumed that the bleeding resistance tends to be degraded due to the delay of curing by the first irradiation, in a case of extremely small irradiation peak intensity of the initial ultraviolet irradiation.

In addition, according to Example 2 and Comparative Example 5, in a case where the irradiation peak intensity of the initial ultraviolet irradiation is extremely great or the irradiation energy thereof is extremely great, it is assumed that the discharging stability is degraded since the change occurred in the discharging property with the significant degradation of the viscosity of the ink of the nozzle due to the heat generation of the light source, or the polymerization of the ink of the nozzle occurred due to large amount of light leakage from the light source and accordingly the viscosity of the ink is increased. Meanwhile, according to Example 6, it is assumed that the excellent discharging stability is obtained by setting the irradiation energy of the initial ultraviolet irradiation (first irradiation) to be relatively small, and setting the irradiation energy of the second ultraviolet irradiation (second irradiation) to be relatively large.

In addition, according to Example 5, it is assumed that the cured wrinkles can be effectively prevented with any conditions of the second ultraviolet irradiation (second irradiation), in a case where the irradiation peak intensity of the initial ultraviolet irradiation (first irradiation) is equal to or more than 800 mW/cm². According to Example 7, it is assumed that the bleeding resistance tends to be degraded in a case of not performing irradiation by the first irradiation unit.

In addition, when comparing Examples 2 and 8, it is assumed that, in a case of using the LED with no lens, since the input current of the light source is necessary to be large and as a result, the heat generation becomes great, the discharging stability tends to be degraded. According to Example 9, it is assumed that the excellent discharging stability is obtained if the LED with no lens which is the LED with the pulse irradiation is used.

In addition, according to Comparative Example 6, in a case of using the serial printer, although the irradiation peak intensity was small, the generation of the cured wrinkles was suppressed compared to the case of using the line printer, however, recording could not be performed in a high speed.

Examples 14 to 23 and Comparative Example 7

In Examples 14 to 23 and Comparative Example 7, the ink jet recording was performed using an ink set obtained by combining the plurality of ink prepared as described above, and evaluations were performed. Hereinafter, Examples 14 to 23 and Comparative Example 7 will be described in detail.

Ink Jet Recording

The ink jet recording was performed as disclosed in Table 5, by using the line printer shown in FIG. 2. The magenta ink head M (hereinafter referred to as a "head M") is filled with the ink to be previously discharged, and the yellow ink head Y (hereinafter referred to as a "head Y") is filled with the ink to be discharged later, and the first irradiation units 42d and 42e and the second irradiation unit 44 are operated to perform evaluation using the ink set. In addition, even if the head M and the head Y are filled with ink other than the magenta ink or yellow ink, there are no effects for evaluation results.

Evaluation Items

8. Uneven Brightness

When a pattern of ink to be initially discharged and a pattern of ink to be discharged later are formed to be adjacent to each other, the difference in shiny appearance between the patterns was visually evaluated.

Evaluation criteria are as follows. Evaluation results were shown in Table 5 below.

A: Difference in shiny appearance was not observed.
B: Difference in shiny appearance was observed.

TABLE 5

Examples 14 to 23 and Comparative Example 7

| | Examples | | | | | | | | | | Com. Ex. |
|---|---|---|---|---|---|---|---|---|---|---|---|
| Item | 14 | 15 | 16 | 17 | 18 | 19 | 20 | 21 | 22 | 23 | 7 |
| Ink to be initially discharged (used in head M) | 1 | 1 | 1 | 1 | 2 | 2 | 2 | 2 | 1 | 1 | 2 |
| Peak intensity of first irradiation unit 42d | 800 | 800 | 800 | 800 | 500 | 500 | 500 | 500 | 1500 | 1500 | 500 |
| Irradiation enegy | 400 | 400 | 400 | 400 | 200 | 50 | 50 | 50 | 100 | 100 | 50 |
| Ink to be discharged later (used in head Y) | 2 | 2 | 2 | 3 | 1 | 1 | 1 | 1 | 2 | 2 | 1 |
| Peak intensity of first irradiation unit 42e | 500 | 800 | 1500 | 500 | 800 | 800 | 1500 | 1500 | 500 | 500 | 500 |
| Irradiation energy | 200 | 400 | 400 | 200 | 400 | 400 | 400 | 100 | 50 | 300 | 200 |
| Peak intensity of second irradiation unit 44 | — | — | — | — | — | — | — | 1500 | 1500 | — | 1500 |
| Irradiation energy | — | — | — | — | — | — | — | 200 | 100 | — | 200 |
| Evaluation results of the ink to be previously discharged | | | | | | | | | | | |
| Cured wrinkles | ○ | ○ | ○ | ○ | Δ | Δ | Δ | Δ | ○ | ○ | Δ |
| Hardenability | ○ | ○ | ○ | ○ | ○ | ○ | ○ | ○ | ○ | ○ | ○ |
| Abrasion resistance | 1 | 1 | 1 | 1 | 1 | 1 | 1 | 1 | 1 | 1 | 1 |
| Discharging stability | 1 | 1 | 1 | 1 | 1 | 1 | 1 | 1 | 1 | 1 | 1 |
| Bleeding resistance | 1 | 1 | 1 | 1 | 1 | 1 | 1 | 1 | 1 | 1 | 1 |
| Glossiness | C | C | C | C | B | B | B | B | B | B | B |
| Evaluation results of ink to be discharged later | | | | | | | | | | | |
| Cured wrinkles | Δ | ○ | ○ | Δ | ○ | ○ | ○ | ○ | Δ | Δ | X |
| Hardenability | ○ | ○ | ○ | ○ | ○ | ○ | ○ | ○ | ○ | ○ | ○ |
| Abrasion resistance | 1 | 1 | 1 | 1 | 1 | 1 | 1 | 1 | 1 | 1 | 2 |
| Discharging stability | 1 | 1 | 2 | 1 | 1 | 1 | 2 | 1 | 1 | 1 | 1 |
| Bleeding resistance | 1 | 1 | 1 | 1 | 1 | 1 | 1 | 1 | 1 | 1 | 1 |
| Glossiness | B | A | A | B | C | C | B | B | B | B | D |
| Evaluation results of entire ink set | | | | | | | | | | | |
| Uneven brightness | A | B | B | A | A | A | A | A | A | A | B |

It was found that, if there is difference of 2 or more ranks in the evaluation results of the glossiness between each ink configuring the ink set (for example, evaluation as A and evaluation as C), the uneven brightness in a case of using the ink set tends to be degraded. According to Examples 14 and 17 to 23, it is found that it is possible to reduce the uneven brightness by setting the irradiation peak intensity when initially irradiating the ink at which transmittance at a wavelength of 395 nm is equal to or less than 1%, to be equal to or more than 800 mW/cm$^2$, and setting the irradiation peak intensity when initially irradiating the ink at which transmittance at a wavelength of 395 nm exceeds 1%, to be less than 800 mW/cm². Meanwhile, it is assumed that, in Example 15 and 16 in which the irradiation peak intensity when initially irradiating the second ultraviolet curable ink is set to be equal to or more than 800 mW/cm², the result of the cured wrinkles of the first ultraviolet curable ink was excellent, however, the difference in shiny appearance between the pattern of the first ultraviolet curable ink and the pattern of the second ultraviolet curable ink is large and the uneven brightness was observed. In addition, from comparison of Examples 14 and 16, it was found that, the second ultraviolet curable ink which can obtain relatively excellent curing wrinkles even when the irradiation peak intensity at the time of initial irradiation is less than 800 mW/cm², is advantageous in a viewpoint of excellent discharging stability of two ink, by setting the irradiation peak intensity at the time of initial irradiation to be less than 800 mW/cm².

The ink to be previously discharged in Examples 19 to 23 are irradiated (first irradiation) with the minimum irradiation energy to not generate the bleeding, and the ink to be previously discharged is further irradiated (second irradiation) with the irradiation for the ink to be discharged later. Accordingly, it is found that the discharging stability of the ink to be previously discharged is excellent, the ink is sufficiently irradiated with ultraviolet light so as to obtain sufficient hardenability by the later irradiation, and it is possible to reduce cost and size of the light source of the first irradiation. In Example 21 or 22, by further performing the irradiation by the second irradiation unit 44 and performing sufficient curing, it is possible to reduce size of the head M, the head Y, and the first irradiation units 42d and 42e which position to be relatively close to the heads, and the periphery of the head where disposition of various devices such as the ink supply device or the head driving device is necessary is cleared for space. Thus, Example 21 or 22 is advantageous compared to Examples 14 to 18 or Example 23. In addition, it is possible to position the irradiation unit 44 to be relatively separated.

In addition, since the case of irradiation with the irradiation peak intensity of equal to or more than 800 mW/cm² results in the case of large irradiation energy, in many cases, compared to the case of irradiation with the irradiation peak intensity of less than 800 mW/cm² (particularly, in a case where the irradiation time T1 is fixed), as Examples 18 to 21, it is advantageous to discharge the ink having transmittance at a wavelength of 395 nm of equal to or less than 1% and to irradiate the ink with the irradiation peak intensity of equal to or more than 800 mW/cm², later than discharging the ink the ink having transmittance at a wavelength of 395 nm of more than 1% and irradiating the ink with the irradiation peak intensity of less than 800 mW/cm², since it is possible to irradiate the ink having transmittance at a wavelength of 395 nm of more than 1% by the irradiation with the irradiation peak intensity of equal to or more than 800 mW/cm².

According to comparison of Examples 20 and 21, it is found that, when performing the second irradiation after the first irradiation having small irradiation energy for the ink having transmittance at a wavelength of 395 nm of equal to or less than 1%, it is possible to suppress the heat generation of or heat leakage from the light source of the first irradiation, and further excellent discharging stability of the head is obtained.

Hereinafter, the embodiment of the second invention will be described in more detail with reference to Examples, however, the embodiment is limited to only the following Examples.

Used Raw Material

Raw materials used for Examples and Comparative Examples are as follows.

Coloring Material

Microlith Black C-K (C.I. Pigment Black 7, product name, manufactured by BASF, hereinafter referred to as a "black pigment")

Dispersant

Solsperse 36000 (product name, manufactured by Lubrizol Corporation, hereinafter referred to as "SOL 36000") Vinyl Ether Group-Containing (Meth)acrylate Esters VEEA (2-(2-vinyloxy ethoxy) ethyl acrylate, product name, manufactured by Nippon Shokubai Co., Ltd., hereinafter referred to as "VEEA")

Other Polymerization Compounds

Viscoat #192 (phenoxyethyl acrylate, product name, manufactured by OSAKA ORGANIC CHEMICAL INDUSTRY LTD., hereinafter, referred to as "PEA")

IBXA (isobornyl acrylate, product name, manufactured by OSAKA ORGANIC CHEMICAL INDUSTRY LTD., hereinafter, referred to as "IBX")

V #160 (benzyl acrylate, product name, manufactured by OSAKA ORGANIC CHEMICAL INDUSTRY LTD., hereinafter, referred to as "BZA")

SR 230 (diethylene glycol diacrylate, product name, manufactured by Sartomer Company Inc., hereinafter, referred to as "DEGDA")

APG-200 (tripropylene glycol diacrylate, product name, manufactured by SHIN-NAKAMURA CHEMICAL CO., LTD., hereinafter, referred to as "TPGDA") Photopolymerization Initiators IRGACURE 819 (product name, manufactured by BASF, solid content of 100%, hereinafter, referred to as "819")

DAROCURE TPO (product name, manufactured by BASF, solid content of 100%, hereinafter, referred to as "TPO") Slip Agent BYK-UV3500 (product name, manufactured by BYK, hereinafter, referred to as "UV3500")

Examples 1 to 18 and Comparative Examples 1 to 11

Manufacture of Pigment Dispersion Liquid

A pigment dispersion liquid was manufactured before manufacturing the ink. 1.7 parts by mass of the black pigment, 0.6 parts by mass of dispersant, and 20 parts by mass of polymerization compound as a dispersion medium, were mixed, and stirred with a stirrer for 1 hour. The mixed liquid after stirring was dispersed with a bead mill, and pigment dispersion liquid was obtained. In addition, as dispersion conditions, zirconia beads having a diameter of 0.65 mm were filled with a filling rate of 70%, a circumferential speed was set to be 9 m/s, dispersion time was set to be 2 to 4 hours. The dispersion medium was used with the polymerization compounds which can be used for each ink, in priority order of PEA, BZA, IBX, and VEEA.

Manufacture of Ultraviolet Curable Ink

Components disclosed in Table below were added to have compositions disclosed in Table below (unit is % by mass) and were stirred by a high-speed water-cooling type stirrer, and thus, ultraviolet curable black ink 1 to 10 were prepared.

TABLE 6

| | Ink 1 | Ink 2 | Ink 3 | Ink 4 | Ink 5 | Ink 6 | Ink 7 | Ink 8 | Ink 9 | Ink 10 |
|---|---|---|---|---|---|---|---|---|---|---|
| VEEA | 25.0 | 65.0 | — | 74.5 | 25.0 | 25.0 | 10.0 | 35.0 | — | — |
| PEA | 30.0 | 10.0 | 35.0 | 5.0 | — | — | 35.0 | 49.5 | — | — |
| BZA | — | — | — | — | 30.0 | — | — | — | 35.0 | — |
| IBX | — | — | — | — | — | 30.0 | — | — | — | 35.0 |
| DEGDA | 20.0 | 5.0 | 40.0 | 5.0 | 20.0 | 20.0 | 25.0 | 2.5 | 40.0 | 40.0 |
| TPGDA | 14.5 | 9.5 | 14.5 | 5.0 | 14.5 | 14.5 | 19.5 | 2.5 | 14.5 | 14.5 |
| Black pigment | 1.7 | 1.7 | 1.7 | 1.7 | 1.7 | 1.7 | 1.7 | 1.7 | 1.7 | 1.7 |
| SOL 36000 | 0.6 | 0.6 | 0.6 | 0.6 | 0.6 | 0.6 | 0.6 | 0.6 | 0.6 | 0.6 |
| 819 | 4.0 | 4.0 | 4.0 | 4.0 | 4.0 | 4.0 | 4.0 | 4.0 | 4.0 | 4.0 |
| TPO | 4.0 | 4.0 | 4.0 | 4.0 | 4.0 | 4.0 | 4.0 | 4.0 | 4.0 | 4.0 |
| UV 3500 | 0.2 | 0.2 | 0.2 | 0.2 | 0.2 | 0.2 | 0.2 | 0.2 | 0.2 | 0.2 |
| Total | 100.0 | 100.0 | 100.0 | 100.0 | 100.0 | 100.0 | 100.0 | 100.0 | 100.0 | 100.0 |
| Ink hardenability | A | A | C | A | A | B | B | B | C | C |

Ink Jet Recording of Example 1

Ink jet recording was performed using the printer 1 which is a line printer in FIG. 4 described above. In detail, the black head K of the printer 1 was filled with each ultraviolet curable ink prepared as described above, respectively. Nozzle density of the head was set to be 720 dpi. A solid patterned image having a film thickness of 10 μm was printed on a PET film (product name: PET 50A, manufactured by Lintec Corporation) which is a recording medium, with conditions of recording resolution of 720 dpi×720 dpi, Duty of 100%, and one pass (single pass). The printing was performed by heating each ink so that the viscosity of the ink is 10 mPa·s. In addition, the "solid patterned image" in the present specification means an image on which dots are recorded with respect to all pixels each of which is a minimum recording unit area specified by the recording resolution.

With the recording, in order to cure the image, ultraviolet light having irradiation peak intensity of 800 mW/cm$^2$ (see Table below), input current of LEDs of 120 mA (for each UV-LED), and a light emitting peak wavelength of 395 nm was emitted for predetermined time, from the lens-attached LED (described above) in the ultraviolet irradiation device installed on downstream of the recording medium in the transportation direction, that is, the first irradiation unit 42b. The irradiation energy at that time was 400 mJ/cm$^2$ (see Table below). Accordingly, the ink jet recording was performed, and a recorded material was obtained.

In addition, the irradiation peak intensity of each Example which will be described later were adjusted by changing the input current of the LED elements, and were measured with a distance from a light emitting surface to the recording medium. Further, the irradiation energy is a value calculated from the sum of the irradiation peak intensity [mW/cm$^2$] and the irradiation time [s]. In the printing, each irradiation unit 42 and 44 continued irradiation, and the irradiation duration when one point from the irradiated surface of the recording medium which is transported under the irradiation units passes the irradiation area irradiated by the irradiation units were set as the irradiation time T1. The irradiation time T1 was adjusted by changing the number of the UV-LEDs which emit light from the plurality of UV-LEDs arranged in the transportation direction of the recording medium in the irradiation unit. Other unit heads and irradiation units were not used.

Ink Jet Recording of Examples 2, 3, 7, 9, 10, and 13 to 18 and Comparative Examples 1, and 3 to 11

The ink jet recording was performed in the same manner as Example 1 except for setting the irradiation peak intensity and the irradiation energy as values disclosed in Table below, and a recorded material was obtained.

Ink Jet Recording of Example 8

The ink jet recording was performed in the same manner as Example 1 except for using the second irradiation unit 44 instead of the first irradiation unit 42b and setting the irradiation peak intensity and the irradiation energy as values disclosed in Table below, and a recorded material was obtained.

Ink Jet Recording of Examples 4 to 6 and Comparative Example 2

The ink jet recording was performed in the same manner as Example 1 except for setting the irradiation peak intensity and the irradiation energy of the first irradiation unit 42b as values disclosed in Table below, using the second irradiation unit 44 in addition to the first irradiation unit 42b, and setting the irradiation peak intensity and the irradiation energy thereof as values disclosed in Table below, and a recorded material was obtained.

Ink Jet Recording of Example 11

The ink jet recording was performed in the same manner as Example 1 except for setting the LED in the first irradiation unit 42b as the LED with no lens described above instead of the lens-attached LED, and a recorded material was obtained. The irradiation time T1 was the same as Example 1. The input current of the LED was necessary to be 140 mA.

Ink Jet Recording of Example 12

The ink jet recording was performed in the same manner as Example 1 except for using the LED with no lens which is the pulse irradiation LED instead of the lens-attached LED for the LED in the first irradiation unit 42b and using the ink 2, and a recorded material was obtained. In the pulse irradiation LED, the Duty ratio was set to 0.5, the pulse frequency was set to 1 kHz, and the input current was set to 220 mA. The irradiation time T1 was the same as Example 1.

Evaluation Items

For the recorded materials obtained in respective Examples and Comparative Examples, hardenability, cured wrinkles, abrasion resistance, bleed resistance, and discharging stability were evaluated with the following methods.

1. Hardenability Test 1

After rubbing the surface of the obtained solid patterned image (recorded surface) using a Johnson cotton swab manufactured by Johnson & Johnson, with 20 times of reciprocation and a load of 100 g, it was determined whether or not there were scratches on the recorded surface, and the hardenability at the time of the printing was evaluated. Evaluation criteria are as follows. The evaluation results are shown in Table below.

O: No scratches
X: Scratches generated

2. Hardenability Test 2

When obtaining a cured coating film having a thickness of 10 μm by further coating the PET film (PET 50A) with each ink composition by a bar coater and curing by emitting light by the UV-LED having the irradiation peak intensity of 800 mW/cm$^2$ and the light emitting peak wavelength of 395 nm, the surface was rubbed with the conditions same as Hardenability Test 1, and irradiation energy necessary to have "O" of the evaluation criteria was evaluated. The evaluation results were shown in Table described above as "ink hardenability".

A: Equal to or less than 200 mJ/cm$^2$
B: More than 200 mJ/cm$^2$ and equal to or less than 300 mJ/cm$^2$
C: More than 300 mJ/cm$^2$ 3. Cured Wrinkles For surface roughness of the recording medium, a root mean square height (Rq value) was measured by using a laser microscope VK-9700 (manufactured by KEYENCE), and the recorded surface was visually observed.

Evaluation criteria are as follows. The evaluation results are shown in Table below.

O: Rq was equal to or less than 3. Sufficient shiny appearance was observed when seen reflected light of the film.
Δ: Rq exceeded 3 or was equal to or less than 5. Slightly insufficient shiny appearance was observed when seen reflected light of the film.
X: Rq exceeded 5. Shiny appearance was insufficient and the surface was observed to be rough when seen under the reflected light of the film.

4. Abrasion Resistance

Evaluation of abrasion resistance was performed using a Color Fastness Rubbing Tester (manufactured by TESTER SANGYO CO., LTD.), based on JIS K5701 (ISO 11628) (regulation of a method for testing ink, a vehicle material, a printed material used in planography). As the evaluation method, cannequin was put on the recorded surface and the surface was rubbed with a load of 400 g, and then, abrasion and scratches on the cured surface of the recorded material were visually observed and compared.

Evaluation criteria are as follows. The evaluation results are shown in Table below.

1: No stains were observed. No abrasion or scratches were observed on the printed surface.
2: Strains on the cannequin were observed. No abrasion or scratches were observed on the printed surface.
3: Strains on the cannequin were observed. Abrasion or scratches on the printed surface were observed.

5. Bleed Resistance

Periphery portion of the obtained solid patterned image was visually observed. Evaluation criteria are as follows. The evaluation results are shown in Table below.

1: Bleeding on the periphery portion of the solid patterned image was not observed.
2: Bleeding on the periphery portion of the solid patterned image was observed.

6. Discharging Stability

An ink jet evaluating device (test model) having 180 nozzles in which a discharging nozzle diameter was set as 20 μm and a driving frequency was set as 18 kHz, and an ink discharging amount for each time was adjusted to be 11 ng, was prepared. Using this evaluating device, the number of nozzles in which nozzle omission occurred when continuously performing ink discharging for 60 minutes was acquired.

Evaluation criteria are as follows.
The evaluation results are shown in Table below.
1: 1 nozzle or less
2: 2 to 4 nozzles
3: 5 to 7 nozzles
4: 8 nozzles or more

TABLE 7

| | Examples 1 to 12 |||||||||||||
| --- | --- | --- | --- | --- | --- | --- | --- | --- | --- | --- | --- | --- |
| | Example No. |||||||||||||
| Item | 1 | 2 | 3 | 4 | 5 | 6 | 7 | 8 | 9 | 10 | 11 | 12 |
| Ink No. | 1 | 1 | 1 | 1 | 1 | 1 | 1 | 1 | 2 | 2 | 1 | 2 |
| Peak intensity of first irradiation unit | 800 | 1500 | 3000 | 500 | 500 | 800 | 800 | — | 800 | 1500 | 800 | 1300 |
| Irradiation energy | 400 | 400 | 800 | 20 | 50 | 150 | 200 | — | 400 | 400 | 400 | 325 |
| Peak intensity of second irradiation unit | — | — | — | 800 | 800 | 1500 | — | 1500 | — | — | — | — |
| Irradiation energy | — | — | — | 400 | 400 | 250 | — | 400 | — | — | — | — |
| Evaluation results | | | | | | | | | | | | |
| Cured wrinkles | O | O | O | O | Δ | O | O | O | Δ | O | O | O |
| Hardenability | O | O | O | O | O | O | O | O | O | O | O | O |
| Abrasion resistance | 1 | 1 | 1 | 1 | 1 | 2 | 1 | 1 | 1 | 1 | 1 | 1 |
| Discharging stability | 1 | 2 | 3 | 1 | 1 | 1 | 1 | 1 | 1 | 2 | 2 | 1 |
| Bleeding resistance | 1 | 1 | 1 | 1 | 1 | 1 | 1 | 2 | 1 | 1 | 1 | 1 |

TABLE 8

Examples 13 to 18

| Item | Example No. 13 | 14 | 15 | 16 | 17 | 18 |
|---|---|---|---|---|---|---|
| Ink No. | 2 | 4 | 5 | 6 | 7 | 8 |
| Peak intensity of first irradiation unit | 1000 | 1500 | 1500 | 1500 | 1500 | 1500 |
| Irradiation energy | 400 | 400 | 400 | 400 | 400 | 400 |
| Peak intensity of second irradiation unit | — | — | — | — | — | — |
| Irradiation energy | — | — | — | — | — | — |
| Evaluation results | | | | | | |
| Cured wrinkles | ◯ | Δ | ◯ | ◯ | ◯ | Δ |
| Hardenability | ◯ | ◯ | ◯ | ◯ | ◯ | ◯ |
| Abrasion resistance | 1 | 1 | 1 | 1 | 1 | 2 |
| Discharging stability | 2 | 2 | 2 | 3 | 2 | 2 |
| Bleeding resistance | 1 | 1 | 1 | 1 | 1 | 1 |

TABLE 9

Comparative Examples 1 to 11

| Item | Example No. 1 | 2 | 3 | 4 | 5 | 6 | 7 | 8 | 9 | 10 | 11 |
|---|---|---|---|---|---|---|---|---|---|---|---|
| Ink No. | 1 | 1 | 1 | 1 | 1 | 2 | 3 | 3 | 9 | 10 | 3 |
| Peak intensity of first irradiation unit | 500 | 500 | 500 | 500 | 100 | 500 | 500 | 800 | 800 | 800 | 500 |
| Irradiation energy | 450 | 80 | 200 | 50 | 1500 | 200 | 200 | 200 | 200 | 200 | 600 |
| Peak intensity of second irradiation unit | — | 790 | — | — | — | — | — | — | — | — | — |
| Irradiation energy | — | 600 | — | — | — | — | — | — | — | — | — |
| Evaluation results | | | | | | | | | | | |
| Cured wrinkles | X | X | X | ◯ | X | X | ◯ | ◯ | ◯ | ◯ | ◯ |
| Hardenability | ◯ | ◯ | ◯ | X | ◯ | ◯ | X | X | X | X | ◯ |
| Abrasion resistance | 2 | 2 | 2 | 3 | 2 | 2 | 3 | 3 | 3 | 3 | 1 |
| Discharging stability | 1 | 1 | 1 | 1 | 3 | 1 | 1 | 1 | 1 | 2 | 4 |
| Bleeding resistance | 1 | 1 | 1 | 1 | 2 | 1 | 2 | 2 | 2 | 2 | 1 |

According to the results described above, it was clear that the ultraviolet curable ink containing predetermined vinyl ether group-containing (meth)acrylate esters are excellent in hardenability, and the recording method (Examples) including a discharging step of discharging the ink onto the recording medium, and a curing step of curing the ink which is landed on the recording medium by irradiating the ink with ultraviolet light from an ultraviolet light emitting diode in which peak intensity is equal to or more than 800 mW/cm$^2$, can realize the excellent hardenability, efficiently prevent the cured wrinkles, and achieves excellent abrasion resistance, discharging stability, bleeding resistance, and glossiness, compared to the other recording methods (Comparative Examples).

Supposition regarding the results described above are provided. According to Comparative Example 1, it is assumed that the abrasion resistance also tends to be degraded, in a case of the poor result of the cured wrinkles. According to Example 5 and Comparative Example 2, it is assumed that, even in a case of performing the second irradiation, when the irradiation peak intensity of the first irradiation is less than 800 mW/cm$^2$, the results of the cured wrinkles are influenced. It is assumed that the poor result of the bleeding resistance in Comparative Example 5 is because of the delay of the curing by the first irradiation. According to Comparative Examples 3, 7, 8, and 11, it is assumed that the predetermined vinyl ether group-containing (meth)acrylate esters contained in the ink are excellent in hardenability and excellent bleeding resistance is obtained due to increase of the curing speed, and it is also assumed that the cured wrinkles state is excellent as long as the irradiation energy is set to be grate and the printing hardenability is excellent, even in a case of containing the predetermined vinyl ether group-containing (meth)acrylate esters in the ink. In addition, Comparative Example 11 is not preferable since extremely large amount of UV-LEDs to be arranged in the transportation direction of the irradiation unit 42b is necessary, and also it is assumed that the heat generation is great due to the large number of UV-LEDs.

In addition, according to Examples 3 and 11, it is assumed that, when the irradiation peak intensity and the irradiation energy of the first irradiation is extremely great, the discharging stability is degraded since the change occurred in the discharging property with the significant degradation of the viscosity of the ink of the nozzle due to the heat generation of the light source, or the polymerization of the ink of the nozzle occurred due to large amount of light leakage from the light source and accordingly the viscosity of the ink is increased. According to Example 8, it is assumed that the bleeding resistance tends to be degraded in a case of not performing irradiation by the first irradiation unit. According to Examples 9, 10, and 14, it is assumed that, in a case of large amount of predetermined vinyl ether group-containing (meth)acrylate esters contained in the ink, the cured ink tends to be slightly generated, however, it is possible to effectively prevent the generation of the cured wrinkles by setting the irradiation peak intensity of the first irradiation to be relatively large. When comparing Examples 1 and 11, it is assumed that, in a case of using the LED with no lens, since the input current of the light source is necessary to be large and as a result, the heat generation becomes great, the discharging stability tends to be degraded. According to Example 9 and 12, it is assumed that, if the LED with no lens which is the LED with the pulse irradiation is used, it is possible to reduce the heat generation of the LED by increasing the irradiation peak wavelength and decreasing the irradiation energy, and the excellent discharging stability is obtained. In addition, in the ink 6 and 10, the initiators tend to be difficult to be dissolved, and in Example 16 or Comparative Example 10, it is assumed that the discharging stability is degraded due to segregation of the initiator. It is assumed that the degradation of the abrasion resistance in Example 18 is because of the degradation of the abrasion resistance of the ink 8.

What is claimed is:

1. An ink jet recording method comprising:
discharging ultraviolet curable ink containing vinyl ether group-containing (meth)acrylate ester(s) expressed by the following General Formula (I) onto a recording medium, wherein a content of the vinyl ether group-containing (meth)acrylate ester(s) expressed by General Formula (I) is 50% by mass or less with respect to a total content of the ultraviolet curable ink;
wherein the ultraviolet curable ink contains other monofunctional (meth)acrylate other than the vinyl ether group-containing (meth)acrylate ester(s) expressed by General Formula (I), the other monofunctional (meth)acrylate having a content of 30% by mass or more with respect to a total content of the ultraviolet curable ink;
wherein the ultraviolet curable ink further contains bifunctional or more (meth)acrylate having a content of 34.5% by mass or less with respect to a total content of the ultraviolet curable ink; and
curing the ultraviolet curable ink which is landed on the recording medium by irradiating the ink with ultraviolet light from an ultraviolet light emitting diode in which peak intensity of the irradiated ultraviolet light is equal to or more than 800 mW/cm$^2$;

$$CH_2=CR^1-COOR^2-O-CHCH-R^3 \quad (I)$$

(in the formula, R1 represents a hydrogen atom or a methyl group, R2 represents a divalent organic residue having 2 to 20 carbon atoms, and R3 represents a hydrogen atom or a monovalent organic residue having 1 to 11 carbon atoms).

2. The ink jet recording method according to claim 1, wherein an irradiation energy of ultraviolet light emitted from the ultraviolet light emitting diode is 100 mJ/cm$^2$ to 600 mJ/cm$^2$.

3. The ink jet recording method according to claim 1, wherein the irradiation from the ultraviolet light emitting diode is at least any of pulse irradiation and spot irradiation by a condensing lens individually.

4. The ink jet recording method according to claim 1, wherein peak intensity of the irradiated ultraviolet light is in a range of 800 mW/cm$^2$ to 4000 mW/cm$^2$.

5. The ink jet recording method according to claim 1, wherein the ultraviolet light emitting diode has a light emitting peak wavelength in a range of 360 nm to 420 nm.

6. An ultraviolet curable ink used for the ink jet recording method according to claim 1.

7. An ink jet recording apparatus which is used with the ink jet recording method according to claim 1.

8. The ink jet recording method according to claim 1, wherein peak intensity of the irradiated ultraviolet light is in a range of 800 mW/cm$^2$ to 2,000 mW/cm$^2$.

9. The ink jet recording method according to claim 1, wherein a content of the vinyl ether group-containing (meth)acrylate esters expressed by the following General Formula (I) is 35% by mass or less with respect to a total content of the ink.

10. The ink jet recording method according to claim 1, further comprising recording using a line ink jet recording apparatus including a line head having a length equal to or greater than a length corresponding to a width of a recording medium.

11. The ink jet recording method according to claim 1, wherein the content of the vinyl ether group-containing (meth)acrylate ester(s) expressed by the General Formula (I) is 10 to 50% by mass with respect to a total content of the ultraviolet curable ink.

12. The ink jet recording method according to claim 1, wherein the content of the monofunctional (meth)acrylate except for the vinyl ether group-containing(meth)acrylate ester(s) expressed by the General Formula (I) is 30 to 50 by mass with respect to a total content of the ultraviolet curable ink.

13. The ink jet recording method according to claim 1, wherein the content of the bifunctional or more (meth)acrylate is 5 to 34.5 by mass with respect to a total content of the ultraviolet curable ink.

14. The ink jet recording method according to claim 1, wherein the other monofunctional (meth)acrylate includes monofunctional (meth)acrylate including an aromatic skeleton.

* * * * *